(12) United States Patent
Shamoon et al.

(10) Patent No.: US 7,822,201 B2
(45) Date of Patent: *Oct. 26, 2010

(54) METHODS AND APPARATUS FOR PERSISTENT CONTROL AND PROTECTION OF CONTENT

(75) Inventors: Talal G. Shamoon, Palo Alto, CA (US); Ralph D. Hill, Los Gatos, CA (US); Chris D. Radcliffe, Redwood City, CA (US); John P. Hwa, Fremont, CA (US)

(73) Assignee: Intertrust Technologies Corporation, Sunnyvale, CA (US)

( * ) Notice: Subject to any disclaimer, the term of this patent is extended or adjusted under 35 U.S.C. 154(b) by 433 days.

This patent is subject to a terminal disclaimer.

(21) Appl. No.: 11/747,781

(22) Filed: May 11, 2007

(65) Prior Publication Data
US 2007/0211891 A1    Sep. 13, 2007

Related U.S. Application Data

(63) Continuation of application No. 10/715,597, filed on Nov. 19, 2003, which is a continuation of application No. 09/276,233, filed on Mar. 25, 1999, now Pat. No. 7,233,948, which is a continuation-in-part of application No. 09/270,022, filed on Mar. 16, 1999, now abandoned.

(60) Provisional application No. 60/078,053, filed on Mar. 16, 1998.

(51) Int. Cl.
*H04N 7/167* (2006.01)

(52) U.S. Cl. .......................... 380/201; 380/229; 726/26; 726/30; 713/189

(58) Field of Classification Search .................. 713/193; 380/201, 202, 203, 229, 232; 705/51, 52; 726/26, 27, 28, 29, 30, 31, 32, 33
See application file for complete search history.

(56) References Cited

U.S. PATENT DOCUMENTS 4,649,233 A    3/1987   Bass et al.

5,247,575 A    9/1993   Sprague et al.
5,586,937 A    12/1996  Menashe (Continued)

FOREIGN PATENT DOCUMENTS

CN    1137723 A    12/1996

(Continued)

OTHER PUBLICATIONS

Office Action dated Sep. 11, 2003 issued in related issued U.S. Appl. No. 09/276,233, filed Mar. 25, 1999, Shamoon et al.

(Continued)

*Primary Examiner*—Kimyen Vu
*Assistant Examiner*—April Y Shan
(74) *Attorney, Agent, or Firm*—Finnegan, Henderson, Farabow, Garrett & Dunner, LLP

(57) ABSTRACT

A novel method and apparatus for protection of streamed media content is disclosed. In one aspect, the apparatus includes control means for governance of content streams or content objects, decryption means for decrypting content streams or content objects under control of the control means, and feedback means for tracking actual use of content streams or content objects. The control means may operate in accordance with rules received as part of the streamed content, or through a side-band channel. The rules may specify allowed uses of the content, including whether or not the content can be copied or transferred, and whether and under what circumstances received content may be "checked out" of one device and used in a second device. The rules may also include or specify budgets, and a requirement that audit information be collected and/or transmitted to an external server. In a different aspect, the apparatus may include a media player designed to call plugins to assist in rendering content. A "trust plugin" is disclosed, along with a method of using the trust plugin so that a media player designed for use with unprotected content may render protected content without the necessity of requiring any changes to the media player. In one aspect, the streamed content may be in a number of different formats, including MPEG-4, MP3, and the RMFF format.

14 Claims, 32 Drawing Sheets

U.S. PATENT DOCUMENTS

| | | | |
|---|---|---|---|
| 5,694,332 A | 12/1997 | Maturi et al. | |
| 5,719,937 A | 2/1998 | Warren et al. | |
| 5,771,334 A | 6/1998 | Yamauchi et al. | |
| 5,794,038 A | 8/1998 | Stutz et al. | |
| 5,799,081 A * | 8/1998 | Kim et al. | 380/203 |
| 5,852,664 A | 12/1998 | Iverson et al. | |
| 5,872,588 A | 2/1999 | Aras et al. | |
| 5,875,303 A | 2/1999 | Huizer et al. | |
| 5,905,797 A * | 5/1999 | McRae | 705/57 |
| 5,915,018 A | 6/1999 | Aucsmith | |
| 5,963,909 A * | 10/1999 | Warren et al. | 705/1 |
| 6,011,761 A | 1/2000 | Inoue | |
| 6,070,198 A | 5/2000 | Krause et al. | |
| 6,104,813 A | 8/2000 | McRae | |
| 6,188,799 B1 | 2/2001 | Tan et al. | |
| 6,205,180 B1 | 3/2001 | Dutey | |
| 6,240,185 B1 | 5/2001 | Van Wei et al. | |
| 6,324,519 B1 | 11/2001 | Eldering | |
| 6,377,530 B1 | 4/2002 | Burrows | |
| 6,445,797 B1 | 9/2002 | McGough et al. | |
| 6,470,085 B1 | 10/2002 | Uranaka et al. | |
| 6,546,555 B1 | 4/2003 | Hjelsvold et al. | |
| 6,868,403 B1 | 3/2005 | Wiser et al. | |
| 7,162,642 B2 | 1/2007 | Schumann et al. | |
| 7,167,897 B2 | 1/2007 | Riddle | |
| 2002/0188570 A1 | 12/2002 | Holliman et al. | |
| 2008/0216149 A1 | 9/2008 | Rhoads | |

FOREIGN PATENT DOCUMENTS

| | | |
|---|---|---|
| CN | 1150738 A | 5/1997 |
| EP | 0652677 A | 5/1995 |
| EP | 0714204 A | 5/1996 |
| EP | 0715247 A1 | 6/1996 |
| EP | 0763936 A | 3/1997 |
| EP | 0800312 A | 10/1997 |
| WO | WO 97/14087 A | 4/1997 |
| WO | WO 97/46017 A | 12/1997 |
| WO | WO 98/46006 A | 10/1998 |

OTHER PUBLICATIONS

Office Action dated Feb. 10, 2005 issued in related issued U.S. Appl. No. 09/276,233, filed Mar. 25, 1999, Shamoon et al.

Office Action dated Jul. 1, 2005 issued in related issued U.S. Appl. No. 09/276,233, filed Mar. 25, 1999, Shamoon et al.

Office Action dated Jul. 25, 2006 issued in related issued U.S. Appl. No. 09/276,233, filed Mar. 25, 1999, Shamoon et al.

Notice of Allowance dated Aug. 10, 2006, issued in related issued U.S. Appl. No. 09/276,233, filed Mar. 25, 1999, Shamoon et al.

Notice of Allowability dated Jan. 22, 2007 issued in related issued U.S. Appl. No. 09/276,233, filed Mar. 25, 1999, Shamoon et al.

Interview Summary dated Apr. 25, 2007 issued in related issued U.S. Appl. No. 09/276,233, filed Mar. 25, 1999, Shamoon et al.

Notice of Allowance dated Apr. 27, 2007 issued in related issued U.S. Appl. No. 09/276,233, filed Mar. 25, 1999, Shamoon et al.

Office Action dated Jan. 29, 2007 issued in related U.S. Appl. No. 10/715,597, filed Nov. 19, 2003, Shamoon et al.

Office Action dated Dec. 12, 2007 issued in related U.S. Appl. No. 10/715,597, filed Nov. 19, 2003, Shamoon et al.

Interview Summary dated Feb. 26, 2008 issued in related U.S. Appl. No. 10/715,597, filed Nov. 19, 2003, Shamoon et al.

Advisory Action dated Apr. 24, 2008 issued in related U.S. Appl. No. 10/715,597, filed Nov. 19, 2003, Shamoon et al.

Office Action dated Jul. 24, 2008 issued in related U.S. Appl. No. 10/715,597, filed Nov. 19, 2003, Shamoon et al.

Notice of Allowance dated Jun. 23, 2009 issued in related U.S. Appl. No. 10/715,597, filed Nov. 19, 2003, Shamoon et al.

Notice of Allowance dated Jan. 8, 2010 issued in related U.S. Appl. No. 10/715,597, filed Nov. 19, 2003, Shamoon et al.

Office Action dated Jul. 9, 2009 issued in related issued U.S. Appl. No. 11/927,370, filed Oct. 29, 2007, Shamoon et al.

Armati Intellectual Property Rights Management for MPEG-4: The Intertrust Commerce Architecture. pp. 1-52., 1997.

Lacy et al., "MPEG-4 Intellectual Property Management and Protection (IPMP) Overview & Applications Document," MPEGIF, p. 1-8, Dec. 1998.

Schneier, "Applied Cryptography," John Wiley and Sons, p. 176-177 and 270-278.

Spanos et al., "Performance Study of a Selective Encryption Scheme for the Security of Networked, Real-Time Video," Proceedings of the Fourth ACM International Conference on Computer Communications and Network, p. 2-10, Sep. 1995.

Office Action dated Sep. 16, 2009 issued in related issued U.S. Appl. No. 11/927,856, filed Jul. 13, 2007, Shamoon et al.

International Search Report mailed Jul. 9, 1999 in International Application No. PCT/US99/05734.

International Preliminary Examination Report completed May 12, 2000 in International Application No. PCT/US99/05734.

Examination Report dated Sep. 19, 2002 in European Patent Application No. 99912582.6.

Summons to Attend Oral Proceedings dated Jan. 28, 2004 in European Application No. 99912582.6.

Result of Consultation dated Sep. 16, 2004 in European Application No. 99912582.6.

Notice of Opposition dated Feb. 23, 2006 in European Application No. 99912582.6.

Excerpt from MPEG Industry Forum website: "MPEG-4 'ISO/IEC 14496', was finalized in Oct. 1998 and became an International Standard in the first months of 1999" http://www.m4if.org/mpeg4/.

Excerpt from Berkeley University website: "The MPEG-4 standard was initiated in 1995 and reached a committee draft status in Mar. 1998 (ISO 14496) and was finalized by the end of 1998" http://www.sims.berkeley.edu:8000/courses/is224/s99/GroupG/report1.html.

European Search Report dated Feb. 24, 2005 in European Application No. 03076224.9.

Examination Report dated Sep. 28, 2009 in European Patent Application No. 03076224.9.

European Search Report dated Feb. 24, 2005 in European Application No. 04078395.3.

Examination Report dated Nov. 16, 2005 in European Application No. 04078395.3.

Canadian Examination Report dated Oct. 16, 2002 issued in Canadian Application No. 2,323,781.

Chinese Office Action dated Mar. 28, 2003 issued in Chinese Application No. 99806248.0.

Japanese Office Action mailed Feb. 24, 2009 in Japanese Application No. 2000-537377.

Japanese Office Action mailed Sep. 15, 2009 in Japanese Application No. 2000-537377.

Canadian Examination Report dated Jul. 31, 2003 issued in Canadian Application No. 2,425,741.

Brown, "How Plug-Ins Plug In," WWW Plug-ins Companion, 15-21, 1996.
Canadian Examination Report dated Oct. 28, 2004 issued in Canadian Application No. 2,425,741.
Chinese Office Action dated Dec. 2, 2005 issued in Chinese Application No. 03155920.4.
Japanese Office Action mailed Mar. 20, 2009 in Japanese Application No. 2005-199949.
Chinese Office Action dated Oct. 24, 2008 in Chinese Application No. 200610086687.0.
Japanese Office Action mailed Mar. 10, 2009 in Japanese Application No. 2005-199916.
Japanese Office Action mailed Mar. 2, 2010 in Japanese Application No. 2005-199949.
Japanese Office Action mailed Mar. 2, 2010 in Japanese Application No. 2005-199916.
Office Action dated Apr. 13, 2010 issued in related U.S. Appl. No. 11/827,856, filed Jul. 13, 2007, Shamoon et al.

* cited by examiner

| 301 | 302 | 303 | 304 | 305 | 306 | 307 | 308 |
|---|---|---|---|---|---|---|---|
| Header | Packet ID | Packet ID | Packet ID | Packet ID | Header | Packet ID | Packet ID |
| Organization Stream | ES_ID | ES_ID | ES_ID | ES_ID | Audio Stream | ES_ID | ES_ID |
| ES_ID | Time Stamp | Time Stamp | Time Stamp | Time Stamp | ES_ID | Time Stamp | Time Stamp |
| Time Stamp | Data | Data | Data | Data | Time Stamp | Data | Data |
| 4 Packets | | | | | 2 Packets | | |

Fig. 3

IPMP Table

| 1 | | | | |
| 2 | | | | |
| 3 | | | | |
| 4 | | | | |
| ... | | | | |
| 256 | | | | |

Protected MP3 Format

METHODS AND APPARATUS FOR PERSISTENT CONTROL AND PROTECTION OF CONTENT

RELATED APPLICATIONS

This application is a continuation of U.S. application Ser. No. 10/715,597, filed Nov. 19, 2003, which is a continuation of U.S. application Ser. No. 09/276,233, filed Mar. 25, 1999 now U.S. Pat. No. 7,233,948, which is a continuation-in-part of U.S. application Ser. No. 09/270,022, filed Mar. 16, 1999 (abandoned), which claims the benefit of U.S. Provisional Application No. 60/078,053, filed Mar. 16, 1998, all of which are incorporated herein by reference.

FIELD OF THE INVENTION

This invention relates generally to computer and/or electronic security. More particularly, this invention relates to systems and methods for protection of information in streamed format.

BACKGROUND

Streaming digital media consists generally of sequences of digital information received in a "stream" of packets, and designed to be displayed or rendered. Examples include streamed audio content, streamed video, etc.

Digital media streams are becoming an increasingly significant means of content delivery, and form the basis for several adopted, proposed or de facto standards. The acceptance of this format, however, has been retarded by the ease with which digital media streams can be copied and improperly disseminated, and the consequent reluctance of content owners to allow significant properties to be distributed through streaming digital means. In addition, the lack of a common format for carrying security and rights management information that is flexible enough to accommodate arbitrary content formats and functions has made interoperability more difficult. For these reasons, there is a need for a methodology by which digital media streams can be protected.

SUMMARY OF THE INVENTION

Consistent with the invention, this specification describes new architectures for protection of information provided in streamed format. One such architecture is described in the context of a generic system which resembles a system to render content encoded pursuant to the MPEG-4 specification (ISO/IEC 14496.1), though with certain modifications, and with the proviso that the described system may differ from the MPEG-4 standard in certain respects. A variety of different architecture embodiments are also described, including an MPEG-4 embodiment, a system designed to render content encoded pursuant to the MP3 specification (ISO/IEC TR 11172), and an embodiment which is advantageous in the context of limited resource content devices.

According to aspects of the invention, these architectures involve system design aspects and information format aspects. System design aspects include the incorporation of content protection functionality, control functionality, and feedback enabling control functionality to monitor the activities of the system. Information format aspects include the incorporation of rule/control information into information streams, and the protection of content through mechanisms such as encryption and watermarking.

Systems and methods consistent with the present invention perform content protection and digital rights management. A streaming media player consistent with the present invention includes a port designed to accept a digital bit stream. The digital bit stream includes content, which is encrypted at least in part, and a secure container including control information designed to control use of the content, including at least one key suitable for decryption of at least a portion of the content. The media player also includes a control arrangement including a means for opening secure containers and extracting cryptographic keys, and means for decrypting the encrypted portion of the content.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

FIG. 3 shows a general encoding format consistent with the present invention;

FIG. 10 illustrates an IPMP table consistent with the present invention;

DETAILED DESCRIPTION

Reference will now be made in detail to implementations consistent with the principles of the present invention as illustrated in the accompanying drawings.

The following U.S. patents and applications, each of which is assigned to the assignee of the current application, are hereby incorporated in their entirety by reference: Ginter, et al., "Systems and Methods for Secure Transaction Management and Electronic Rights Protection," U.S. patent application Ser. No. 08/964,333, filed on Nov. 4, 1997 ("Ginter '333"); Ginter, et al., "Trusted Infrastructure Support Systems, Methods and Techniques for Secure electronic commerce, Electronic Transactions, Commerce Process Control Automation, Distributed Computing, and Rights Management," U.S. patent application Ser. No. 08/699,712, filed on Aug. 12, 1996 ("Ginter '712"); Van Wie, et al, "Steganographic Techniques for Securely Delivering Electronic Digital Rights Management Information Over Insecure Communications Channels, U.S. patent application Ser. No. 08/689,606, filed on Aug. 12, 1996 ("Van Wie"); Ginter, et al "Software Tamper Resistance and Secure Communication," U.S. patent application Ser. No. 08/706,206, filed on Aug. 30, 1996 ("Ginter, '206"); Shear, et al, "Cryptographic Methods, Apparatus & Systems for Storage Media Electronic Rights Management in Closed & Connected Appliances," U.S. patent application Ser. No. 08/848,077, filed on May 15, 1997 ("Shear"); Collberg et al, "Obfuscation Techniques for Enhancing Software Security," U.S. patent application Ser. No. 09/095,346, filed on Jun. 9, 1998 ("Collberg"); Shear, "Database Usage Metering and Protection System and Method," U.S. Pat. No. 4,827,508, issued on May 2, 1989 ("Shear patent").

Figure 1:
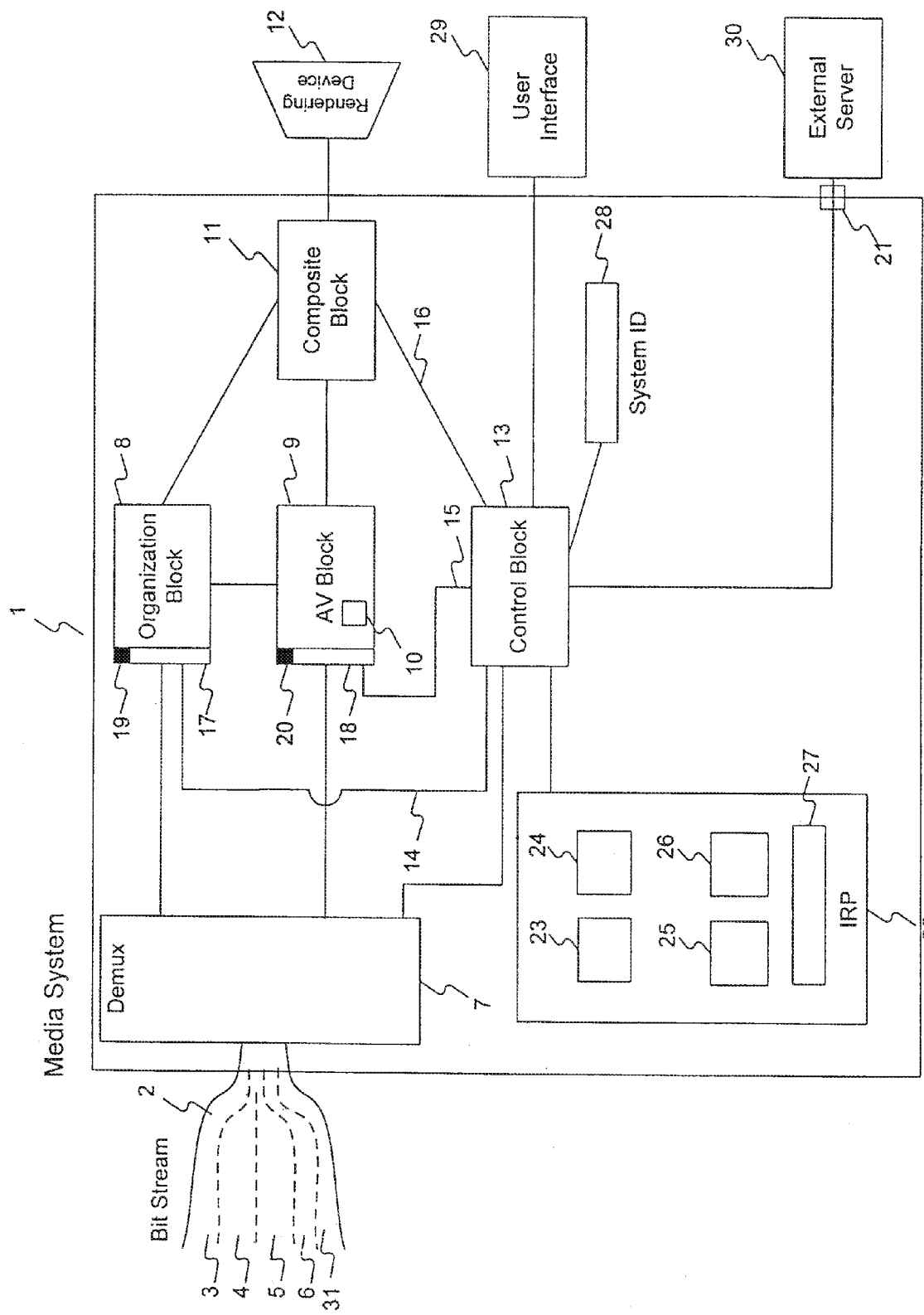
FIG. 1 shows a generic system consistent with the present invention.

FIG. 1 illustrates Media System 1, which is capable of accepting, decoding, and rendering streamed multimedia content. This is a generic system, though it includes elements based on the MPEG-4 specification. Media System 1 may include software modules, hardware (including integrated circuits) or a combination. In one embodiment, Media System 1 may include a Protected Processing Environment (PPE) as described in the Ginter '333 application.

In FIG. 1, Bit Stream 2 represents input information received by System 1. Bit Stream 2 may be received through a connection to an external network (e.g., an Internet connection, a cable hookup, radio transmission from a satellite broadcaster, etc.), or may be received from a portable memory device, such as a DVD player.

Bit Stream 2 is made up of a group of related streams of information, including Organization Stream 3, Audio Stream 4, Video Stream 5, Control Stream 6, and Info Stream 31. Each of these streams is encoded into the overall Bit Stream 2. Each of these represents a category of streams, so that, for example, Video Stream 5 may be made up of a number of separate Video Streams.

These streams correspond generally to streams described in the MPEG-4 format as follows:

Organization Stream 3 corresponds generally to the BIFS stream and the OD ("Object Descriptor") stream.

Audio Stream 4 and Video Stream 5 correspond generally to the Audio and Video streams.

Control Stream 6 corresponds generally to the IPMP stream.

Audio Stream 4 includes compressed (and possibly encrypted) digital audio information. This information is used to create the sound rendered and output by Media System 1. Audio Stream 1 may represent multiple audio streams. These multiple streams may act together to make up the audio output, or may represent alternative audio outputs.

Video Stream 5 includes compressed (and possibly encrypted) digital video information. This information is used to create the images and video rendered and output by Media System 1. Video Stream 5 may represent multiple video streams. These multiple streams may act together to make up the video output, or may represent alternative video outputs.

Organization Stream 3 includes organizational information and metadata related to the work to be rendered. This information may include a tree or other organizational device which groups audio and video streams into objects. This information may also include metadata associated with the entire work, the objects, or the individual streams.

Control Stream 6 includes control information, divided generally into header information and messages. The header information includes an identifier for each discrete message. The content of the messages, which will be described further below, may include cryptographic keys and rules governing the use of content.

Info Stream 31 carries additional information associated with the content in other components of Bit Stream 2, including but not limited to graphics representing cover art, text for lyrics, coded sheet music or other notation, independent advertising content, concert information, fan club information, and so forth. Info Stream 31 can also carry system management and control information and/or components, such as updates to software or firmware in Media System 1, algorithm implementations for content-specific functions such as watermarking, etc.

Each of these streams is made up of packets of information. In one exemplary embodiment, each packet is 32 bytes in length. Since a single communications channel (e.g., a cable, a bus, an infrared or radio connection) contains packets from each of the streams, packets need to be identified as belonging to a particular stream. In a preferred embodiment, this is done by including a header which identifies a particular stream and specifies the number of following packets which are part of that stream. In another embodiment, each packet may include individual stream information.

Figure 2:
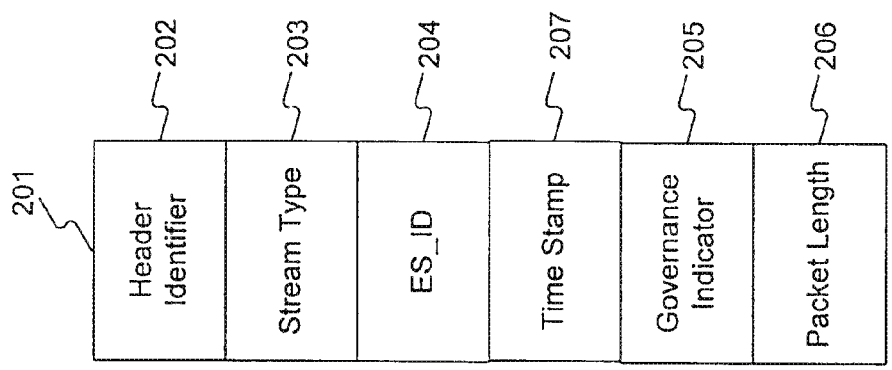
FIG. 2 shows an exemplary Header 201 consistent with the present invention.

Exemplary Header 201 is shown in FIG. 2. This header may generally be used for the Organization, Audio and Video Streams. A header for the Control Stream is described below. Header 201 includes Field 202, which includes a bit pattern identifying Header 201 as a header. Field 203 identifies the particular type of stream (e.g., Audio Stream, Organization Stream, Control Stream, etc.) Field 204 contains an Elementary Stream Identifier (ES_ID), which is used to identify the particular stream, and may be used in cases where multiple streams of a particular stream type may be encountered at the same time. Field 207 contains a time stamp, which is used by the system to synchronize the various streams, including rendering of the streams. Composite Block 11 may, for example, keep track of the elapsed time from the commencement of rendering. Time Stamp 207 may be used by Composite Block 11 to determine when each object is supposed to be rendered. Time Stamp 207 may therefore specify an elapsed time from commencement of rendering, and Composite Block 11 may use that elapsed time to determine when to render the associated object.

Field 205 contains a Governance Indicator. Field 206 identifies the number of following packets which are part of the identified stream. In each case, the relevant information is encoded in a binary format. For example, Field 202 might include an arbitrary sequence of bits which is recognized as indicating a header, and Field 203 might include two bits, thereby allowing encoding of four different stream types.

Returning to FIG. 1, System 1 includes Demux 7, which accepts as input Bit Stream 2 and routes individual streams (sometimes referred to as Elementary Streams or "ESs") to appropriate functional blocks of the system.

Bit Stream 2 may be encoded in the format illustrated in FIG. 3. In this figure, Header 301 is encountered in the bit stream, with Packet 302 following, and so on through Packet 308.

When Demux 7 encounters Header 301, Demux 7 identifies Header 301 as a header and uses the header information to identify Packets 302-305 as organization stream packets. Demux 7 uses this information to route these packets to Organization Block 8. Demux 7 handles Header 306 in a similar manner, using the contained information to route Packets 307 and 308 to AV ("Audio Video") Block 9.

AV Block 9 includes Decompressor 10, which accepts Elementary Streams from Audio Stream 4 and Video Stream 5 and decompresses those streams. As decompressed, the stream information is placed in a format which allows it to be manipulated and output (through a video display, speakers, etc.). If multiple streams exist (e.g., two video streams each describing an aspect of a video sequence), AV Block 9 uses the ES_ID to assign each packet to the appropriate stream.

Organization Block 8 stores pointer information identifying particular audio streams and video streams contained in a particular object, as well as metadata information describing, for example, where the object is located, when it is to be displayed (e.g., the time stamp associated with the object), and its relationship to other objects (e.g., is one video object in front of or behind another video object). This organization may be maintained hierarchically, with individual streams represented at the lowest level, groupings of streams into objects at a higher level, complete scenes at a still higher level, and the entire work at the highest level.

Figure 4:
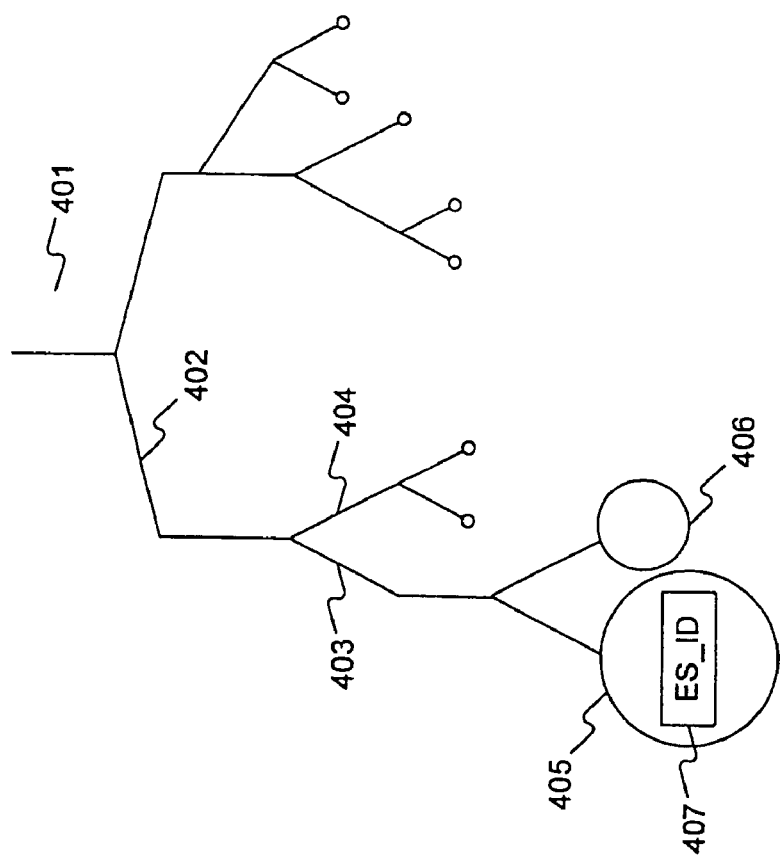
FIG. 4 illustrates one manner for storing a representation of a work consistent with the present invention.

FIG. 4 illustrates one manner in which Organization Block 8 may store a representation of a work. In this Figure, Tree 401 represents an entire audiovisual work. Branch 402 represents a high-level organization of the work. This may include, for example, all of the video or possibly the audio and video associated with a particular scene.

Sub-Branch 403 represents a group of related video objects. Each such object may include an entire screen, or an individual entity within the screen. For example, Sub-Branch 403 may represent a background which does not change significantly from one shot to the next. If the video is moving between two points of reference (e.g., a conversation, with the camera point of view changing from one face to the other), Sub-Branch 404 could represent a second background, used in the second point of view.

Nodes 405 and 406 may represent particular video objects contained within the related group. Node 405 could, for example, represent a distant mountain range, while Node 406 represents a tree immediately behind one of the characters.

Each of the nodes specifies or contains a particular ES_ID, representing the stream containing the information used by that node. Node 405, for example, contains ES_ID 407, which identifies a particular video stream which contains compressed (and possibly encrypted) digital information representing the mountain range.

Composite Block 11 accepts input from Organization Block 8 and from AV Block 9. Composite Block 11 uses the input from Organization Block 8 to determine which specific audiovisual elements will be needed at any given time, and to determine the organization and relationship of those elements. Composite Block 11 accepts decompressed audiovisual objects from AV Block 9, and organizes those objects as specified by information from Organization Block 8. Composite Block 11 then passes the organized information to Rendering Device 12, which might be a television screen, stereo speakers, etc.

Figure 5:
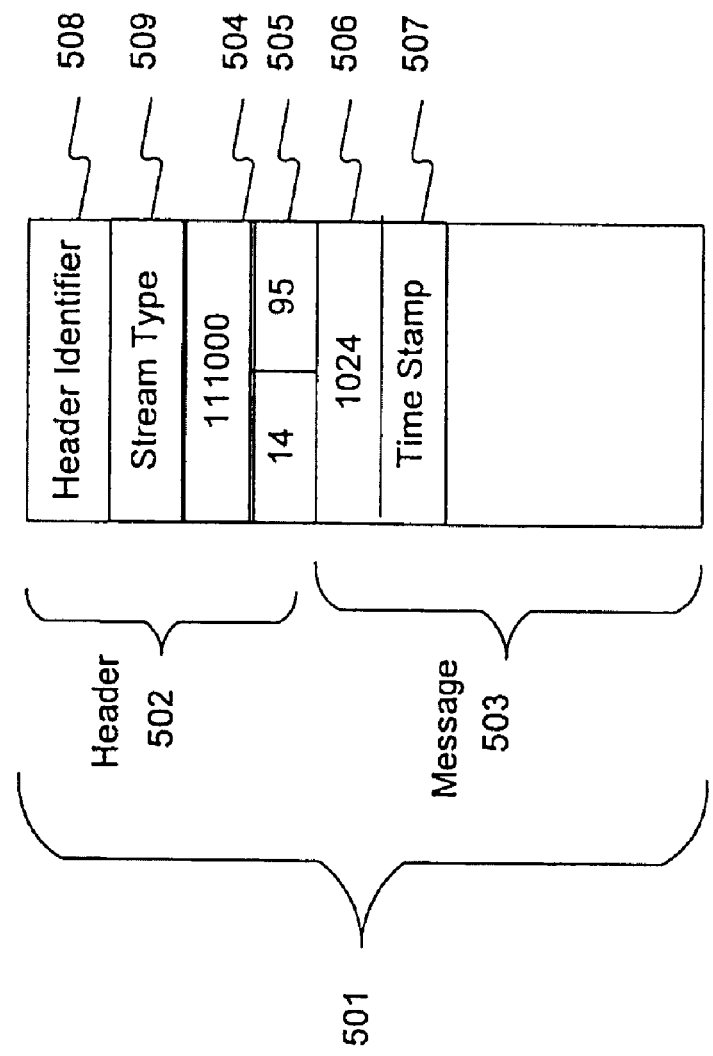
FIG. 5 shows an example of a control message format.

Control Block 13 stores control messages which may be received through Control Stream 6 and/or may be watermarked into or steganographically encoded in other streams, including Audio Stream 4 and Video Stream 5. One control message format is illustrated by FIG. 5, which shows Control Message 501. Control Message 501 is made up of Header 502 and Message 503. Header 502 consists of Field 508, which includes a bit pattern identifying the following information as a header; Stream Type Field 509, which identifies this as a header for the organization stream; ID Field 504, which identifies this particular control message; Pointer Field 505, which identifies those ESs which are controlled by this message; Time Stamp Field 507, which identifies the particular portion of the stream which is controlled by this control message (this may indicate that the entirety of the stream is controlled); and Length Field 506, which specifies the length (in bytes) of Message 503. Message 503 may include packets following Header 502, using the general format shown in FIG. 3. In the example shown, Control Message 501 carries the unique ID 111000, encoded in ID Field 504. This control message controls ESs 14 and 95, as indicated by Pointer Field 505. The associated Message contains 1,024 bytes, as indicated by Length Field 506.

In an alternate embodiment, the association of control to content may be made in Organization Block 8, which may store a pointer to particular control messages along with the metadata associated with streams, objects, etc. This may be disadvantageous, however, in that it may be desirable to protect this association from discovery or tampering by users. Since Control Block 13 will generally have to be protected in any event, storing the association in this block may make protection of Organization Block 8 less necessary.

Control Block 13 implements control over System 1 through Control Lines 14, 15 and 16, which control aspects of Organization Block 8, AV Block 9 and Composite Block 11, respectively. Each of these Control Lines may allow two-way communication.

Control Lines 14 and 15 are shown as communicating with AV Block Stream Flow Controller 18 and with Organization Block Stream Flow Controller 17. These Stream Flow Controllers contain functionality controlled by Control Block 13. In the embodiment illustrated, the Stream Flow Controllers are shown as the first stage in a two-stage pipeline, with information being processed by the Stream Flow Controller and then passed on to the associated functional block. This allows isolation of the control functionality from the content manipulation and display functionality of the system, and allows control to be added in without altering the underlying functionality of the blocks. In an alternate embodiment, the Stream Flow Controllers might be integrated directly into the associated functional blocks.

Stream Flow Controllers 17 and 18 contain Cryptographic Engines 19 and 20, respectively. These Cryptographic Engines operate under control of Control Block 13 to decrypt and/or cryptographically validate (e.g., perform secure hashing, message authentication code, and/or digital signature functions) the encrypted packet streams received from Demux 7. Decryption and validation may be selective or optional according to the protection requirements for the stream.

Cryptographic Engines 19 and 20 may be relatively complex, and may, for example, include a validation calculator that performs cryptographic hashing, message authentication code calculation, and/or other cryptographic validation processes. In addition, as is described further below, additional types of governance-related processing may also be used. In one alternative embodiment, a single Stream Flow Controller may be used for both Organization Stream 3 and Audio/Video Streams 4-5. This may reduce the cost of and space used by System 1. These reductions may be significant, since System 1 may contain multiple AV Blocks, each handling a separate Audio or Video Stream in parallel. This alternative may, however, impose a latency overhead which may be unacceptable in a real-time system.

If the Stream Flow Controllers are concentrated in a single block, they may be incorporated directly into Demux 7, which may handle governance processing prior to routing streams to the functional blocks. Such an embodiment would allow for governed decryption or validation of the entirety of Bit Stream 2, which could occur prior to the routing of streams to individual functional blocks. Encryption of the entirety of Bit Stream 2 (as opposed to individual encryption of individual ESs) might be difficult or impossible without incorporating stream controller functionality into Demux 7, since Demux 7 might otherwise have no ability to detect or read the header information necessary to route streams to functional blocks (that header information presumably being encrypted).

As is noted above, each of the individual streams contained in Bit Stream 2 may be individually encrypted. An encrypted stream may be identified by a particular indicator in the header of the stream, shown in FIG. 2 as Governance Indicator 205.

When a header is passed by Demux 7 to the appropriate functional block, the stream flow controller associated with that block reads the header and determines whether the following packets are encrypted or otherwise subject to governance. If the header indicates that no governance is used, the stream flow controller passes the header and the packets through to the functional blocks with no alteration. Governance Indicator 205 may be designed so that conventionally encoded content (e.g., unprotected MPEG-4 content) is recognized as having no Governance Indicator and therefore passed through for normal processing.

If a stream flow controller detects a set governance indicator, it passes the ES_ID associated with that stream and the time stamp associated with the current packets to Control Block 13 along Control Line 14 or 15. Control Block 13 then uses the ES_ID and time stamp information to identify which control message(s) are associated with that ES. Associated messages are then invoked and possibly processed, as may be used for governance purposes.

Figure 6:
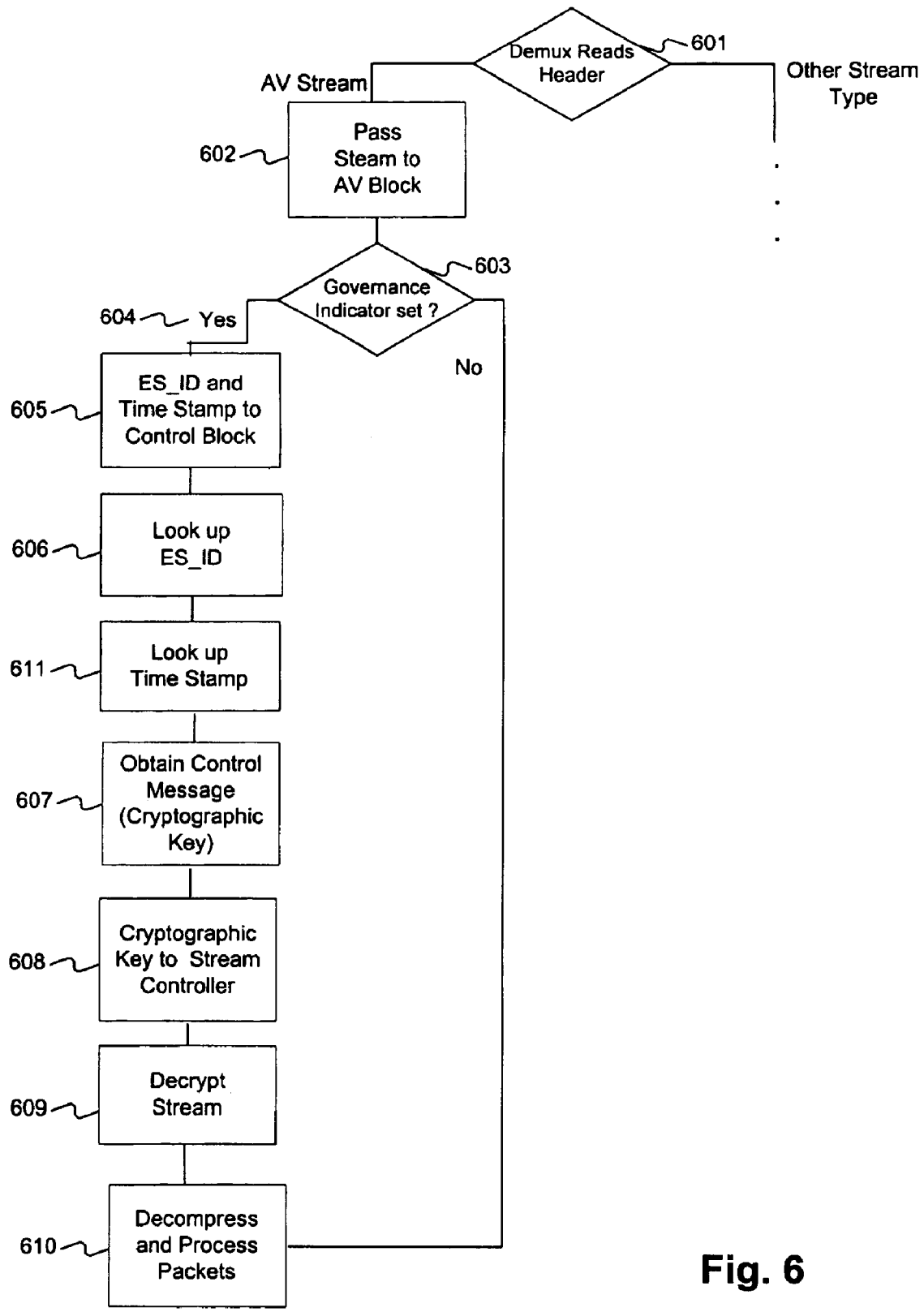
FIG. 6 is a flow diagram illustrating one embodiment of the steps which take place using the functional blocks of FIG. 1.

A simple governance case is illustrated by FIG. 6, which shows steps which take place using the functional blocks of FIG. 1. In Step 601, Demux 7 encounters a header, and determines that the header is part of the AV stream. In Step 602, Demux 7 passes the header to AV Stream Controller 18. In Step 603, AV Stream Controller 18 reads the header and determines that the governance indicator is set, thereby triggering further processing along Path 604. In Step 605, AV Stream Controller 18 obtains the ES_ID and time stamp from the header and transmits these to Control Block 13, along Control Line 15. In Step 606, Control Block 13 looks up the ES_ID and determines that the ES_ID is associated with a particular control message. In Step 611, Control Block 13 uses the time stamp information to choose among control messages, if there is more than one control message associated with a particular ES. In Step 607, Control Block 13 accesses the appropriate control message, and obtains a cryptographic key or keys for decryption and/or validation. In Step 608, Control Block 13 passes the cryptographic key(s) along Control Line 15 to AV Stream Controller 18. In Step 609, AV Stream Controller 18 uses the cryptographic key as an input to Cryptographic Engine 20, which decrypts and/or validates the packets following the header as those packets are received from Demux 7. In Step 610, the decrypted packets are then passed to AV Block 9, which decompresses and processes them in a conventional manner.

Time stamp information may be useful when it is desirable to change the control message applicable to a particular ES. For example, it may be useful to encode different portions of a stream with different keys, so that an attacker breaking one key (or even a number of keys) will not be able to use the content. This can be done by associating a number of control messages with the same stream, with each control message being valid for a particular period. The time stamp information would then be used to choose which control message (and key) to use at a particular time. Alternatively, one control message may be used, but with updated information being passed in through the Control Stream, the updates consisting of a new time stamp and a new key.

In an alternative embodiment, Control Block 13 may proactively send the appropriate keys to the appropriate stream flow controller by using time stamp information to determine when a key will be will be needed. This may reduce overall latency.

Control Line 16 from FIG. 1 comes into play once information has been passed from Organization Block 8 and AV Block 9 to Composite Block 11, and the finished work is prepared for rendering through Rendering Device 12. When Composite Block 11 sends an object to Rendering Device 11, Composite Block 11 sends a start message to Control Block 13. This message identifies the object (including any associated ES_IDs), and specifies the start time of the display (or other rendering) of that object. When an object is no longer being rendered, Composite Block 11 sends an end message to Control Block 13, specifying that rendering of the object has ended, and the time at which the ending occurred. Multiple copies of a particular object may be rendered at the same time. For this reason, start and stop messages sent by Composite Block 11 may include an assigned instance ID, which specifies which instance of an object is being rendered.

Control Block 13 may store information relating to start and stop times of particular objects, and/or may pass this information to external devices (e.g., External Server 30) through Port 21. This information allows Control Block 13 to keep track not only of which objects have been decrypted, but of which objects have actually been used. This may be used, since System 1 may decrypt, validate, and/or decompress many more objects than are actually used. Control Block 13 can also determine the length of use of objects, and can determine which objects have been used together. Information of this type may be used for sophisticated billing and auditing systems, which are described further below.

Control Line 16 may also be used to control the operation of Composite Block 11. In particular, Control Block 13 may store information specifying when rendering of a particular object is valid, and may keep track of the number of times an object has been rendered. If Control Block 13 determines that an object is being rendered illegally (i.e., in violation of rules controlling rendering), Control Block 13 may terminate operation of Composite Block 11, or may force erasure of the illegal object.

In an alternate embodiment, the level of control provided by Control Line 16 may at least in part be provided without requiring the presence of that line. Instead, Control Block 13 may store a hash of the organization information currently valid for Organization Block 8. This hash may be received through Control Stream 6, or, alternatively, may be generated by Control Block 13 based on the information contained in Organization Block 8.

Control Block 13 may periodically create a hash of the information currently resident in Organization Block 8, and compare that to the stored hash. A difference may indicate that an unauthorized alteration has been made to the information in Organization Block 8, thereby potentially allowing a user to render information in a manner violative of the rules associated with that information. In such an event, Control Block 13 may take appropriate action, including deleting the information currently resident in Organization Block 8.

If System 1 is designed so that Organization Block 8 controls the use of content by Composite Block 11, so that content cannot be rendered except as is specified by the organization information, Control Block 13 may be able to control rendering of information through verifying that the current Organization Block contents match the hash which has been received by Control Block 13, thereby eliminating at least one reason for the presence of Control Line 16.

Control Block 13 may also be responsible for securely validating the origin, integrity, authenticity, or other properties of received content, through cryptographic validation means such as secure hashing, message authentication codes, and/or digital signatures.

System 1 may also include an Inter-Rights Point, indicated as IRP 22. IRP 22 is a protected processing environment (e.g., a PPE) in which rules/controls may be processed, and which may store sensitive information, such as cryptographic keys. IRP 22 may be incorporated within Control Block 13, or may be a separate module. As is illustrated, IRP 22 may include CPU 23 (which can be any type of processing unit), Cryptographic Engine 24, Random Number Generator 25, Real Time Clock 26, and Secure Memory 27. In particular embodiments, some of these elements may be omitted, and additional functionality may be included.

Governance Rules

Figure 7:
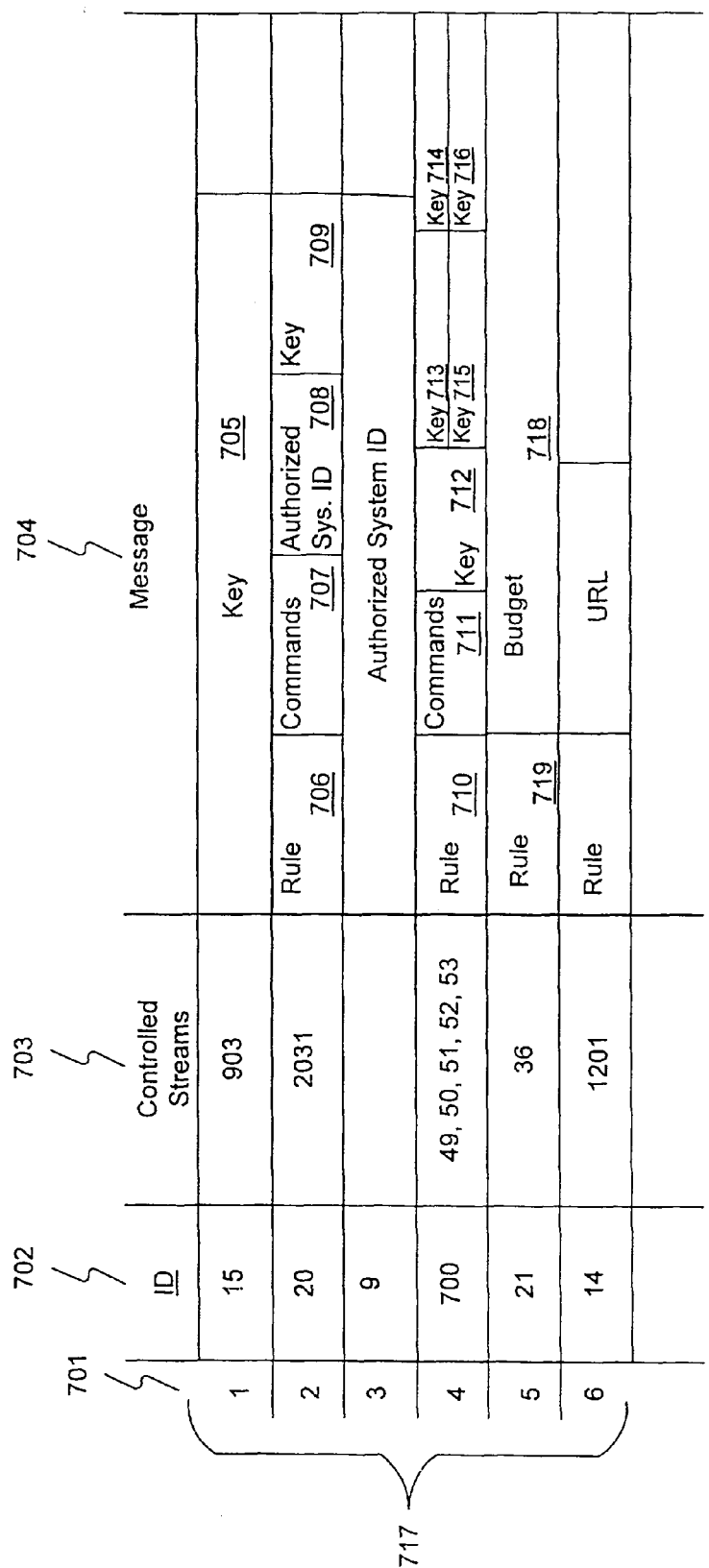
FIG. 7 illustrates a form wherein the control messages may be stored in Control Block 13.

Control messages stored by Control Block 13 may be very complex. FIG. 7 illustrates the form in which the control messages may be stored in Control Block 13, consisting of Array 717. Column 701 consists of the address at which the control messages are stored. Column 702 consists of the identifier for each control message. This function may be combined with that of Column 701, by using the location information of Column 701 as the identifier, or by storing the message in a location which corresponds to the identifier. Column 703 consists of the ES_IDs for each stream controlled by the control message. Column 704 consists of the message itself. Thus, the control message stored at location 1 has the ID 15, and controls stream 903.

In a simple case, the message may include a cryptographic key, used to decrypt the content associated with the stream(s) controlled by the message. This is illustrated by Cryptographic Key 705 from FIG. 7. Cryptographic keys and/or validation values may also be included to permit cryptographic validation of the integrity or origin of the stream.

In a more complex case, the message may include one or more rules designed to govern access to or use of governed content. Rules may fall into a number of categories.

Rules may require that a particular aspect of System 1, or a user of System 1, be verified prior to decryption or use of the governed content. For example, System 1 may include System ID 28, which stores a unique identifier for the system. A particular rule contained in a control message may specify that a particular stream can only be decrypted on a system in which System ID 28 contains a particular value. This is illustrated at row 2 in FIG. 7, in which the message is shown as consisting of a rule and commands. The rule may be implicit, and therefore may not be stored explicitly in the table (e.g. the table may store only the rule, the rule—specific functions (commands) invoked by the rule, or only the functions).

In this case, when Stream Controller 18 encounters a Header for stream 2031 containing a set governance indicator, Stream Controller 18 passes the associated ES_ID (2031) to Control Block 13. Control Block 13 then uses the ES_ID to identify Control Message 20 which governs stream 2031. Control Message 20 includes Rule 706, which includes (or invokes) Commands 707, and an Authorized System ID 708. Authorized System ID 708 may have been received by System 1, either as part of Control Message 20, or as part of another control message (e.g., Control Message 9), which Control Message 20 could then reference in order to obtain access to the Authorized System ID. Such a case might exist, for example, if a cable subscriber had pre-registered for a premium show. The cable system might recognize that registration, and authorize the user to view the show, by sending to the user an ID corresponding to the System ID.

When Rule 706 is invoked, corresponding Commands 707 access System ID 28 and obtain the system ID number. The commands then compare that number to Authorized System ID 708, specified by Rule 706. If the two numbers match, Commands 707 release Cryptographic Key 709 to Stream Controller 18, which uses Cryptographic Key 709 to decrypt the stream corresponding to ES_ID 2031. If the two numbers do not match, Commands 707 fail to release Cryptographic Key 709, so that Stream Controller 18 is unable to decrypt the stream.

In order to carry out these functions, in one embodiment, Control Block 13 includes, or has access to, a processing unit and memory. The processing unit is preferably capable of executing any of the commands which may be included or invoked by any of the rules. The memory will store the rules and association information (ID of the control message and IDs of any governed ESs).

Since the functions being carried out by Control Block 13 are sensitive, and involve governance of content which may be valuable, Control Block 13 may be partially or completely protected by a barrier which resists tampering and observation. As is described above, the processing unit, secure memory, and various other governance-related elements may be contained in IRP 22, which may be included in or separate from Control Block 13.

Control Block 13 may also carry out somewhat more complex operations. In one example, a control message may require that information from System 1 not only be accessed and compared to expected information, but stored for future use. For example, a control message might allow decryption of a Stream, but only after System ID 28 has been downloaded to and stored in Control Block 13. This would allow a control message to check the stored System ID against System ID 28 on a regular basis, or perhaps on every attempted re-viewing of a particular Stream, thereby allowing the control message to insure that the Stream is only played on a single System.

Control Block 13 may also obtain information dynamically. For example, System 1 may include User Interface 29, which can include any type of user input functionality (e.g., hardware buttons, information displayed on a video screen, etc.) A particular rule from a control message may require that the user enter information prior to allowing decryption or use of a stream. That information may, for example, be a password, which the Rule can then check against a stored password to insure that the particular user is authorized to render the stream.

Information obtained from the user might be more complicated. For example, a rule might require that the user input payment or personal information prior to allowing release of a cryptographic key. Payment information could, for example, constitute a credit card or debit card number. Personal information could include the user's name, age, address, email address, phone number, etc. Entered information could then be sent through Port 21 to External Server 30 for verification. Following receipt of a verification message from External Server 30, the Rule could then authorize release of a cryptographic key. Alternatively, Control Block 13 may be designed to operate in an "off-line" mode, storing the information pending later hookup to an external device (or network). In such a case, Control Block 13 might require that a connection be made at periodic intervals, or might limit the number of authorizations which may be obtained pending the establishment of an external connection.

In a somewhat more complex scenario, a control message may include conditional rules. One particular example is illustrated by row 4 of the table shown in FIG. 7, in which Control Message 700 is shown as controlling streams 49-53. Control Message 700 further consists of Rule 710, Commands 711 and Cryptographic Keys 712-716. There could, of course, be a number of additional cryptographic keys stored with the message.

In this case, Rule 710 specifies that a user who agrees to pay a certain amount (or provide a certain amount of information) may view Stream 49, but all other users are required to view Stream 50, or a combination of Streams 49 and 50. In this case, Stream 49 may represent a movie or television program, while Stream 50 represents advertisements. In one embodiment, different portions of Stream 49 may be decrypted with different keys so that, for example, a first portion is decrypted with Key 712, a second portion is decrypted with Key 713, a third portion is decrypted with Key 714, and so on. Rule 710 may include all keys used to decrypt the entirety of Stream 49. When the user initially attempts to access the video encoded in Stream 49, Rule 710 could put up a message asking if the user would prefer to use pay for view mode or advertising mode. If the user selects pay for view mode, Rule 710 could store (or transmit) the payment information, and pass Cryptographic Key 712 to Stream Controller 18. Stream Controller 18 could use Cryptographic Key 712 to decrypt the first stream until receipt of a header indicating that a different key is needed to decrypt the following set of packets. Upon request by Stream Controller 18, Control Block 13 would then check to determine that payment had been made, and then release Cryptographic Key 713, which would be used to decrypt the following packets, and so on. Rule 710 could additionally release Cryptographic Key 716, corresponding to Organization Stream 52, which corresponds to video without advertisements.

If, on the other hand, the user had chosen the advertising mode, Rule 710 could release Cryptographic Key 712 to Stream Controller 18 to allow decryption of Stream 49. Rule 710 could also authorize decryption of Stream 50 which contains the advertisements. Rule 710 could further release Cryptographic Key 715 to Organization Block 8. Cryptographic Key 715 matches Organization Stream 51. Organization Stream 51 references the video from Stream 49, but also references advertisements from Stream 50. Rule 710 would refuse to release Cryptographic Key 716, which corresponds to Organization Stream 52, which corresponds to the video without advertisements.

In operation, Control Block 13 could monitor information from Composite Block 11 over Control Line 16. That information could include the identity of each object actually rendered, as well as a start and stop time for the rendering. Control Block 13 could use this information to determine that an advertisement had actually been rendered, prior to releasing Cryptographic Key 713 for decryption of the second portion of video from Stream 49. This feedback loop allows Control Block 13 to be certain that the advertisements are not only being decrypted, but are also being displayed. This may be necessary because Composite Block 11 may be relatively unprotected, thereby allowing an unscrupulous user to remove advertisements before viewing.

A variety of additional relatively complex scenarios are possible. For example, rules from Control Block 13 could customize the programming for a particular geographic location or a particular type of viewer, by using information on the location or the viewer to control conditional decryption or use. This information could be stored in System 1 or entered by the user.

In another example, shown at row 5 of Array 717, Rule 719 may specify Budget 718, which may include information relating to the number of uses available to the user, the amount of money the user has to spend, etc. In operation, Rule 719 may require that Budget 718 be securely stored and decremented each time a budgeted activity occurs (e.g., each time the associated work is played). Once the budget reaches zero, Rule 719 may specify that the work may no longer be played, or may display a message to the user indicating that the user may obtain additional budget by, for example, entering a credit card number or password, or contacting an external server.

In another example, a rule may control the ability of a user to copy a work to another device. The rule may, for example, specify that the user is authorized to use the governed work on more than one device, but with only one use being valid at any time. The rule may specify that an indication be securely stored regarding whether the user has "checked out" the work. If the user copies the work to another device (e.g., through Port 21), the rule may require that the work only be transmitted in encrypted form, and that the relevant control messages be transmitted along with it. The rule can further require that an indicator be securely set, and that the indicator be checked each time the user attempts to use or copy the work. If the indicator is set, the rule might require that the work not be decrypted or used, since the user only has the right to use the work on one device at a time, and the indicator establishes that the work is currently "checked out" to another device and has not been checked back in.

The receiving device may include the same type of indicator, and may allow the user to use the work only as long as the indicator is not set. If the user desires to use the work on the original device, the two devices may communicate, with the indicator being set in the second and reset in the first. This allows the work to be stored in two locations, but only used in one.

In another embodiment, the same result may be reached by copying the relevant control message from one device to the other, then erasing it from the original device. Because the control message includes keys used for decryption, this would insure that the work could only be used in one device at a time.

In one embodiment, this technique may be used to communicate digital media files (e.g., music, video, etc.) from a personal computer to a consumer electronics device without allowing the user to make multiple choices for simultaneous use. Thus, a larger, more sophisticated device (e.g., a personal computer), could download a file, then "check out" the file to a portable device lacking certain functions present in the personal computer (e.g., a hand-held music player).

Rules may also be used to specify that an initial user may transfer the file to another user, but only by giving up control over the file. Such rules could operate similarly to the technique described above for transferring a file from one device to another, or could require that the original file be entirely erased from the original device after the transfer.

Rules in Control Block 13 may be added or updated through at least two channels. New rules may be obtained through Control Stream 6. If a control message contains an identifier corresponding to a control message already present in Control Block 13, that control message (including contained rules) may overwrite the original control message. A new rule may, for example, be identical to an existing rule, but with a new time stamp and new keys, thereby allowing decryption of a stream which had been encrypted with multiple keys. System 1 may be designed so that certain rules may not be overwritable. This may be enforced by designating certain positions in Array 717 as non-overwritable, or by providing a flag or other indicator to show that a particular rule cannot be overwritten or altered. This would allow for certain types of superdistribution models, including allowing a downstream distributor to add rules without allowing the downstream distributor to remove or alter the rules added by upstream distributors.

In addition, new rules may be encoded into Organization Stream 3, Audio Stream 4, or Video Stream 5, in the form of a watermark or steganographic encoding.

New rules may also be obtained through Port 21. Port 21 may connect to an external device (e.g., a smart card, portable memory, etc.) or may connect to an external network (e.g., External Server 30). Rules may be obtained through Port 21 either in an ad hoc manner, or as a result of requests sent by Control Block 13. For example, Control Message 14 (FIG. 7, row 6) may include a rule specifying that a new rule be downloaded from a particular URL, and used to govern Stream 1201.

Control messages, including rules, may be encoded using secure transmission formats such as DigiBoxes. A DigiBox is a secure container means for delivering a set of business rules, content description information, content decryption information and/or content validation information. One or more DigiBoxes can be placed into the headers of the media content or into data streams within the media.

Figure 12:
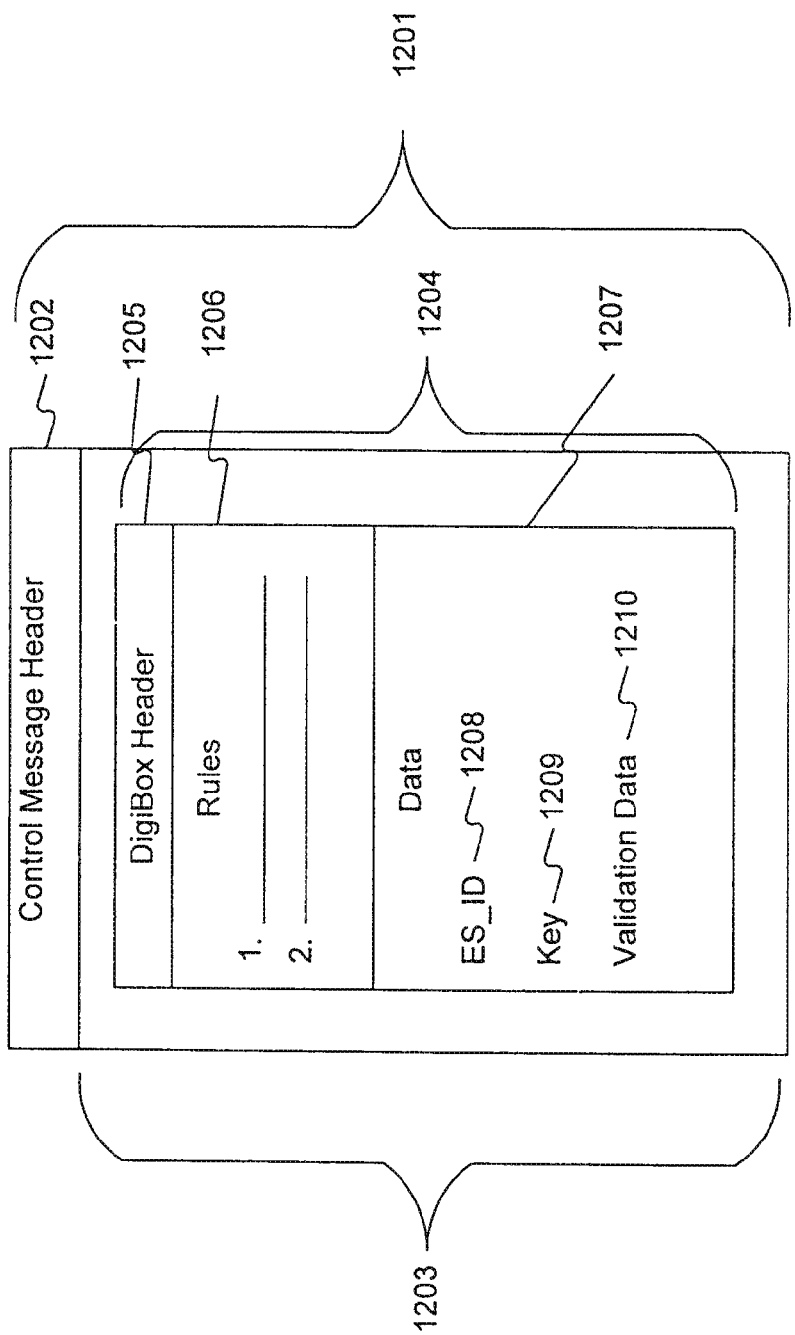
FIG. 12 illustrates one embodiment of the DigiBox format.

FIG. 12 illustrates one embodiment of the DigiBox format and the manner in which that format is incorporated into a control message. Control Message 1201 is made up of Control Message Header 1202 and Control Message Contents 1203. As is described elsewhere, Control Message Header 1202 may include information used by Demux 7 (FIG. 1) to appropriately route the message to Control Block 13.

Control Message Contents 1203 of Control Message 1201 consists of DigiBox 1204, and may also include additional information. DigiBox 1204 consists of DigiBox Header 1205, Rules 1206 and Data 1207. Rules 1206 may include one or more rules. Data 1207 may include various types of data, including ES_ID 1208, Cryptographic Key 1209, and Validation Data 1210. Data 1207 may also include cryptographic information such as a specification of the encryption algorithm, chaining modes used with the algorithm, keys and initialization vectors used by the decryption and chaining.

Initialization vectors contained within Data 1207 are similar to cryptographic keys, in that they constitute input to the original encryption process and therefore are necessary for decryption. In one well-known prior art embodiment, the initialization vectors may be generated by starting with a base initialization vector (a 64 bit random number) and xor'ing in the frame number or start time for the content item.

Validation Data 1210 contained within Data 1207 may include cryptographic has or authentication values, cryptographic keys for calculating keyed authentication values (e.g., message authentication codes), digital signatures, and/or public key certificates used in validating digital certificates.

Thus, the DigiBox may incorporate the information described above as part of the control message, including the rules, the stream ID and the cryptographic keys and values.

In an alternative embodiment, DigiBox Header 1205 may be designed so that it can be read by Demux 7 and routed to Control Block 13. In such an embodiment, DigiBox 1204 would itself constitute the entirety of the control message, thus obviating the need to nest DigiBox 1204 within Control Message 1201.

Some or all of the contents of DigiBox 1204 will generally be encrypted. This may include Rules 1206, Data 1207, and possibly some or all of Header 1205. System 1 may be designed so that a DigiBox may only be decrypted (opened) in a protected environment such as IRP 22. In an alternate embodiment, Control Block 13 may directly incorporate the functionality of IRP 22, so that the DigiBox may be opened in Control Block 13 without the necessity of routing the DigiBox to IRP 22 for processing. In one embodiment, the cryptographic key used to decrypt DigiBox 1204 may be stored in IRP 22 (or Control Block 13), so that the DigiBox can only be opened in that protected environment.

Rules 1206 are rules governing access to or use of DigiBox Data 1207. In one embodiment, these rules do not directly control the governed streams. Since Cryptographic Key 1209 can only be accessed and used through compliance with Rules 1206, however, Rules 1206 in fact indirectly control the governed streams, since those streams can only be decrypted through use of the key, which can only be obtained in compliance with the rules. In another embodiment, Data 1207 may include additional rules, which may be extracted from the DigiBox and stored in a table such as Array 717 of FIG. 7.

The rules governing access to or use of a DigiBox may accompany the DigiBox, (as shown in FIG. 12) or may be separately transmitted, in which event Rules 1206 would contain a pointer or reference to the rules used to access Data 1207. Upon receipt of a DigiBox, Control Block 13 may receive rules separately through Control Stream 6, or may request and receive rules through Port 21.

Pipelined Implementation

One potential drawback to the system illustrated in FIG. 1 consists of the fact that the system introduces complexity and feedback into a pipelined system designed to render content in real time. The rendering pipeline generally consists of Demux 7, Organization Block 8 and AV Block 9, Composite Block 11 and Rendering Device 12. Because content is received in a streamed fashion, and must be rendered in real time, pipelined processing must occur in a highly efficient manner, under tight time constraints. A failure to process within the time available may mean that output to Rendering Device 12 may be interrupted, or that incoming Bit Stream 2 may overflow available buffers, thereby causing the loss of some portion of the incoming data.

Figure 11:
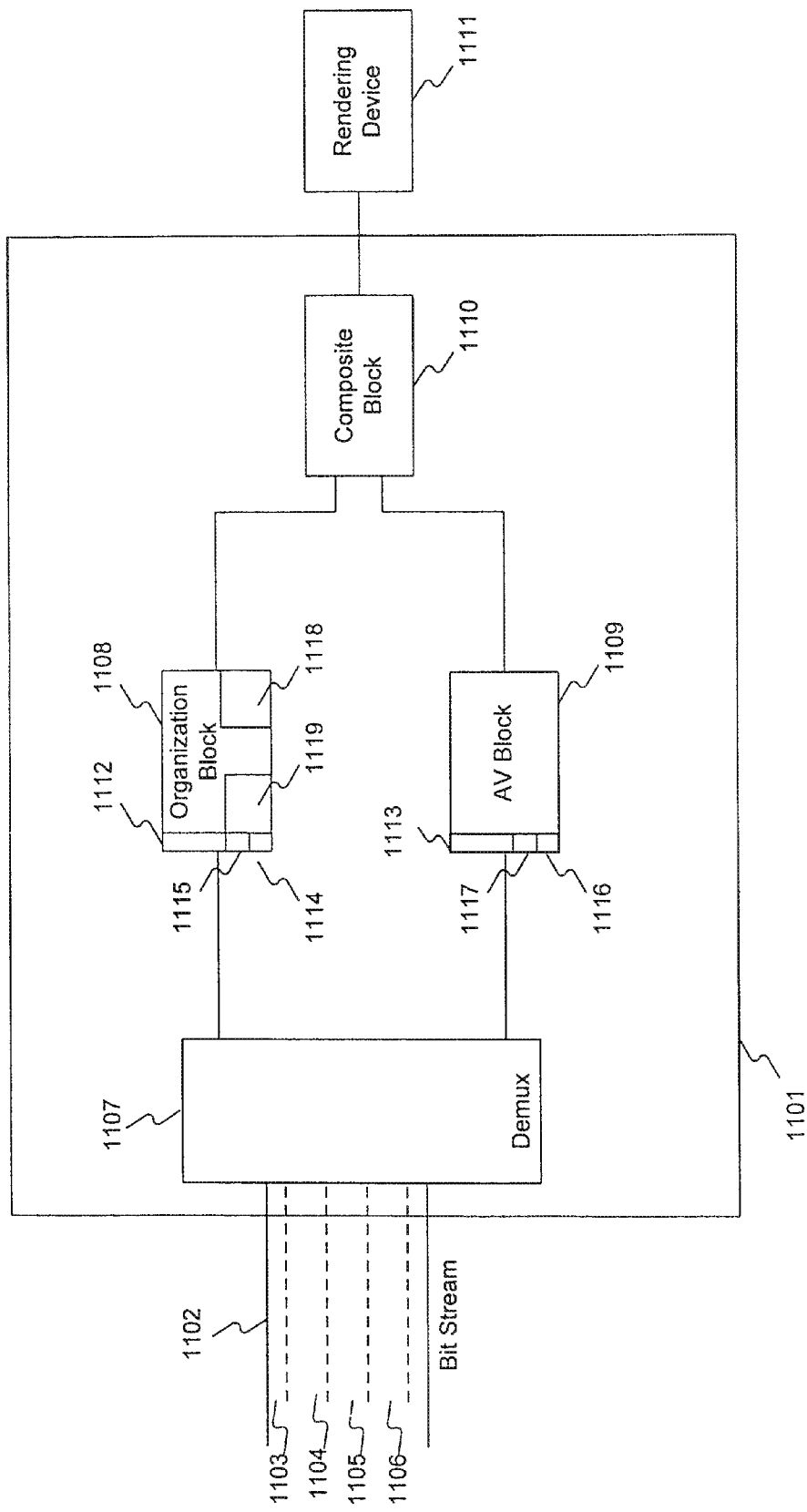
FIG. 11 illustrates a system consistent with the present invention.

An alternative embodiment of System 1 is designed to address these problems, although at a possible cost in the ability to use standard system components and a possible cost in overall system security. This alternative embodiment is illustrated in FIG. 11, which shows System 1101.

System 1101 is similar to System 1 from FIG. 1 in many respects. It receives Bit Stream 1102, which consists of Organization Stream 1103, Audio Stream 1104, Video Stream 1105 and Control Stream 1106. These streams are received by Demux 1107, which passes Organization Stream 1103 to Organization Block and passes Audio Stream 1104 and Video Stream 1105 to AV Block 1109. Organization Block 1108 and AV Block 1109 operate similarly to their counterparts in FIG. 1, and pass information to Composite Block 1110, which organizes the information into a coherent whole and passes it to Rendering Device 1111. Streams sent to Organization Block 1108 are decrypted and/or validated by Stream Flow Controller 1112, and streams sent to AV Block 1109 are decrypted and/or validated by Stream Flow Controller 1113.

System 1101 differs from System 1, however, in that control and feedback are distributed, and integrated directly into the processing and rendering pipeline. System 1101 thus lacks a separate control block, and also lacks a feedback path back from the Composite Block 1110.

In System 1101, control is exercised directly at Organization Block 1108 and AV Block 1109. As in System 1, cryptographic keys are received through Control Stream 1106 (in an alternative embodiment, the keys could be incorporated directly into header or other information in Organization Stream 1103 or Audio/Video Streams 1104 and 1105). Those keys are included in a data format which includes information regarding the stream type of the encrypted content and, if multiple stream types are possible, an identifier for the particular controlled stream.

When Demux 1107 encounters a key in Control Stream 1106, it reads the information relating to the stream type, and routes the key to the appropriate stream flow controller. If Demux 1107 encounters a key designated for decryption or validation of Organization Stream 1103, for example, it routes that key to Stream Flow Controller 1112.

Stream Flow Controller 1112 stores received keys in Storage Location 1114. Storage Location 1114 stores the keys and also stores an indicator of the controlled stream ID.

Stream Flow Controller 1112 includes Cryptographic Engine 1115, which uses the received keys to decrypt and/or validate encrypted and/or protected portions of Organization Stream 1103. The keys may themselves be received in an encrypted manner, in order to provide some degree of security. In such a case, Stream Flow Controller may use a variety of techniques to decrypt the key, including using stored information as a key, or as a key seed. That stored information could, for example, constitute a "meta-key" provided earlier through Bit Stream 1102 or through a separate port.

Stream Flow Controller 1113, associated with AV Block 1109, contains a corresponding Storage Location 1116 and Cryptographic Engine 1117, and operates in a manner similar to the operation described for Stream Flow Controller 1112.

This implementation avoids the latency penalty which may be inherent in the necessity for communication between stream flow controllers and a separate control block.

This alternate implementation may also eliminate the feedback channel from the composite block (FIG. 1, Control Line 16). This feedback channel may be used in order to insure that the content being passed from Composite Block 11 to Rendering Device 12 is content that has been authorized for rendering. In the alternate embodiment shown in FIG. 11, this feedback channel does not exist. Instead, this implementation relies on the fact that Composite Block 1110 depends upon information from Organization Block 1108 to determine the exact structure of the information being sent to Rendering Device 1111. Composite Block 1110 cannot composite information in a manner contrary to the organization dictated by Organization Block 1108.

In one embodiment, this control by Organization Block 1108 may be sufficient to obviate the need for any feedback, since Organization Block 1108 may be designed so that it accepts information only through Stream Controller 1112, and Stream Controller 1112 may be designed so that it only decrypts or validates information under the control of rules stored in Storage Location 1114.

In such an embodiment, security may be further increased by incorporating Secure Memory 1118 into Organization Block 1108. Secure Memory 1118 may store a copy or hash of the organization tree validly decrypted by Stream Controller 1112, and in current use in Main Organization Block Memory 1119. Organization Block 1108 may be used to periodically compare the organization tree stored in Main Organization Block Memory 1119 to the tree stored in Secure Memory 1118. If a discrepancy is spotted, this may indicate that an attacker has altered the organization tree stored in Main Organization Block 1119, thereby possibly allowing for the rendering of content in violation of applicable rules. Under such circumstances, Organization Block 1108 may be used to take protective measures, including replacing the contents of Main Organization Block Memory 1119 with the contents of Secure Memory 1118.

MPEG4 Implementation

Figure 8:
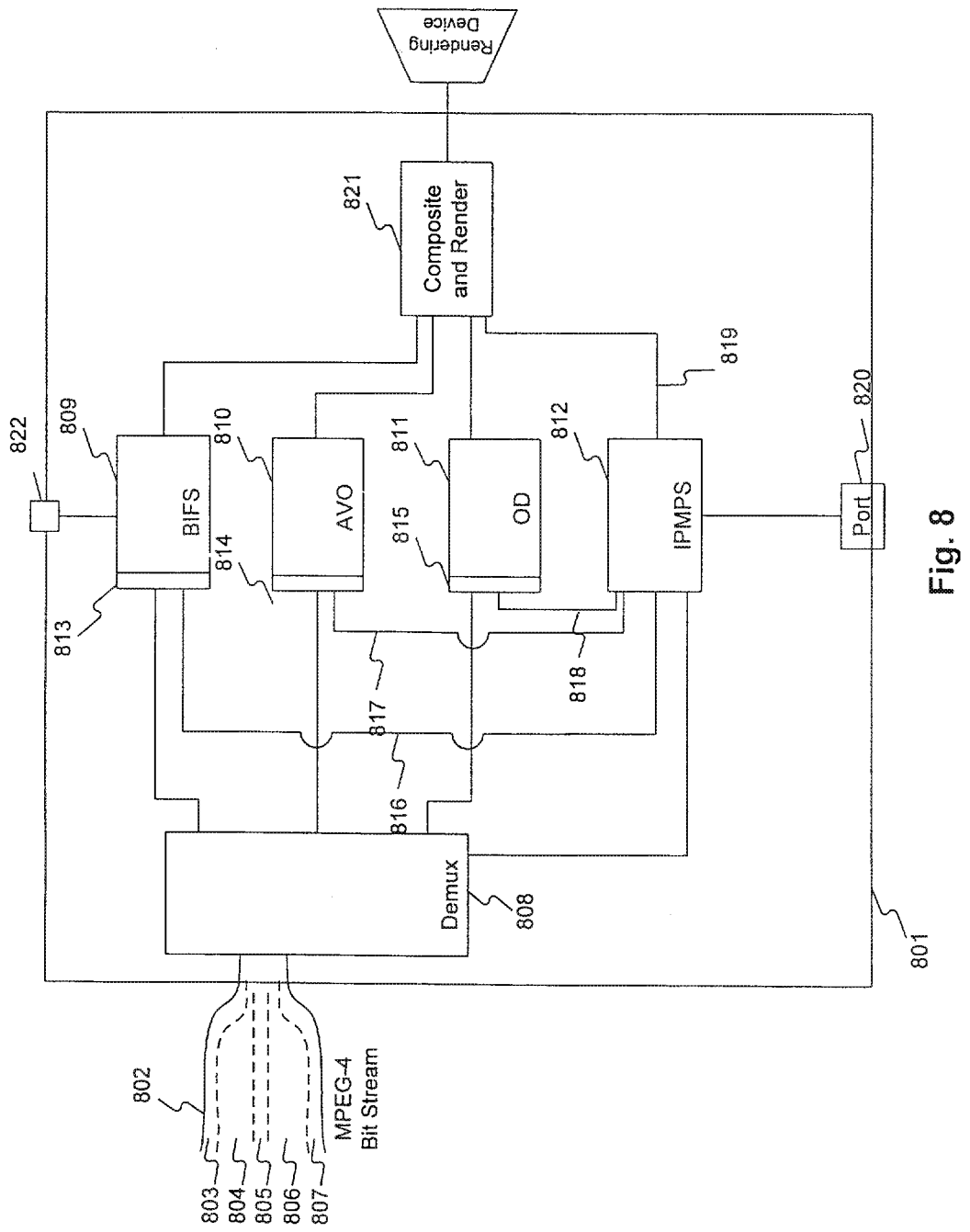
FIG. 8 shows MPEG-4 System 801 consistent with the present invention.

The generic system described above may be embodied in an MPEG-4 system, as illustrated in FIG. 8, which shows MPEG-4 System 801.

MPEG-4 System 801 accepts MPEG-4 Bit Stream 802 as input. MPEG-4 Bit Stream 802 includes BIFS Stream 803, OD Stream 804, Audio Stream 805, Video Stream 806 and IPMP Stream 807. These streams are passed to Demux 808, which examines header information and routes packets as appropriate, to BIFS 809, AVO 810, OD 811 or IPM System 812.

IPMP System 812 receives IPMP messages through IPMP Stream 807. Those messages may include header information identifying the particular message, as well as an associated IPMP message. The IPMP message may include control information, which may include a cryptographic key, validation information, and/or may include complex governance rules, as are described above.

Stream Controllers 813, 814 and 815 act to decrypt, validate, and/or govern streams passed to BIFS 809, AVO 810 and OD 811, respectively.

OD 811 holds object descriptors, which contain metadata describing particular objects. This metadata includes an identifier of the particular Elementary Stream or streams which include the object, and may also include a pointer to a particular IPMP message which governs the object. Alternatively, the relationship between IPMP messages and particular objects or streams may be stored in a table or other form within IPMP System 812.

IPMP System 812 may exercise control over other functional blocks through Control Lines 816, 817, 818 and 819, each of which may transmit control/governance signals from IPMP System 812 and information or requests from other functional blocks to IPMP System 812. The information requests may include an ES_ID and a time stamp, which IPMP System 812 may use to determine which particular message (e.g., key) should be used and when.

In an alternative embodiment, IPMP System 812 may exercise control over Composite and Render 821 by receiving a hash of the currently valid BIFS tree (possibly through IPMP stream 807), and periodically checking the hash against the BIFS tree stored in BIFS 809. Because BIFS 809 controls the manner in which Composite and Render 821 renders information, if IPMP System 812 confirms that the current BIFS tree is the same as the authorized tree received through BIFS Stream 803, IPMP System 812 can confirm that the proper content is being rendered, even without receiving feedback directly from Composite and Render 821. This may be necessary, since BIFS 809 may communicate with Port 822, which may allow a user to insert information into BIFS 809, thereby creating a possibility that a user could insert an unauthorized BIFS tree and thereby gain unauthorized access to content.

When a stream controller receives encrypted or otherwise governed information, it may send the ES_ID and time stamp directly to IPMP System 812. Alternatively, it may send this information to OD 811, which may reply with the ID of the IPMP message which governs that object or stream. The stream controller can then use that IPMP message ID to request decryption, validation, and/or governance from IPMP System 812. Alternatively, OD 811 can pass the IPMP ID to IPMP System 812, which can initiate contact with the appropriate stream controller.

IPMP System 812 may obtain IPMP information through two channels other than IPMP Stream 807. The first of these channels is Port 820, which may be directly connected to a device or memory (e.g., a smart card, a DVD disk, etc.) or to an external network (e.g., the Internet). An IPMP message may contain a pointer to information obtainable through Port 812, such as a URL, address on a DVD disk, etc. That URL may contain specific controls needed by the IPMP message, or may contain ancillary required information, such as, for example, information relating to the budget of a particular user.

Figure 9:
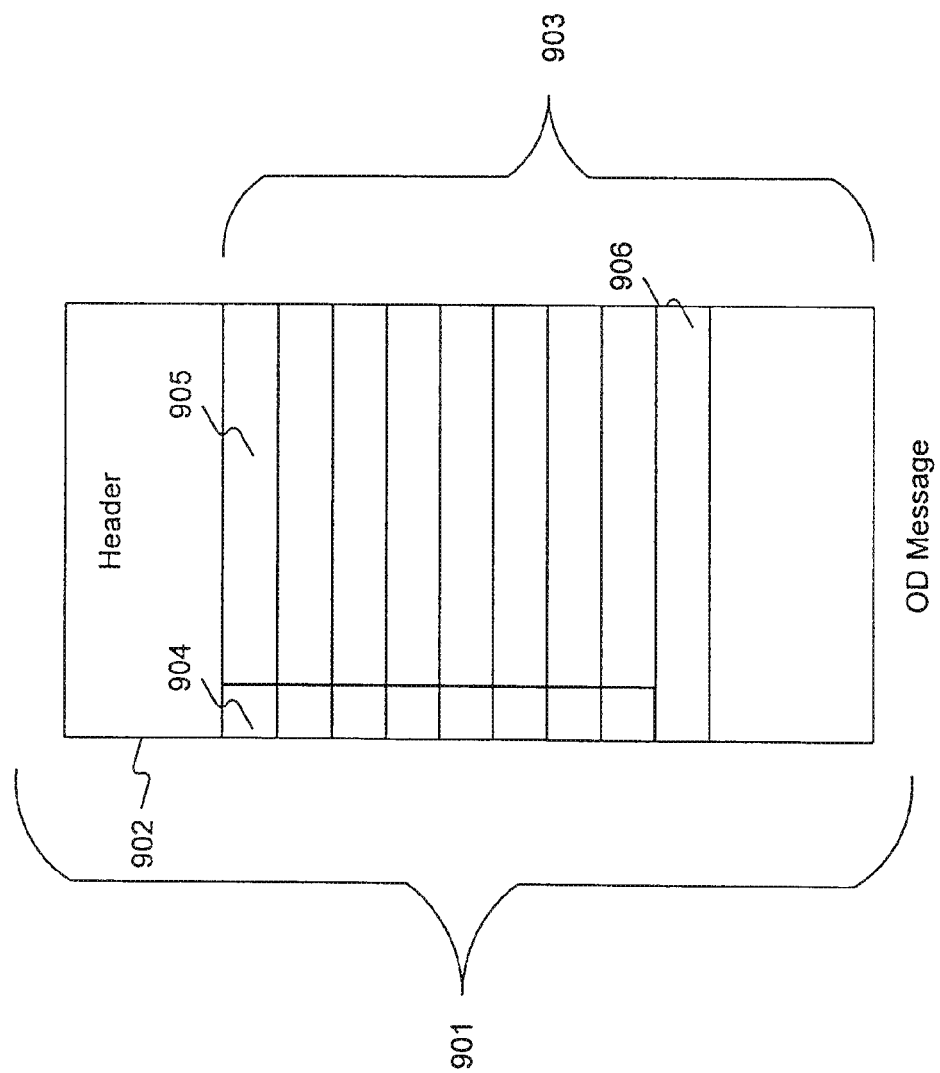
FIG. 9 shows an example of a message format.

IPMP System 812 may also obtain IPMP information through OD updates contained in OD Stream 804. OD Stream 804 contains metadata identifying particular objects. A particular OD Message may take the format shown in FIG. 9. In this figure, OD Message 901 includes Header 902, which identifies the following packets as part of the OD stream, and indicates the number of packets. OD Message 901 further consists of Message 903, which includes a series of Pointers 904 and associated Metadata 905. Each Pointer 904 identifies a particular Elementary Stream, and the associated metadata is applicable to that stream. Finally, OD Message 901 may contain an IPMP Pointer 906, which identifies a particular IPMP message.

In aggregate, the information contained in OD Message 901 constitutes an object descriptor, since it identifies and describes each elementary stream which makes up the object, and identifies the IPMP message which governs the object. OD Message 901 may be stored in OD 811, along with other messages, each constituting an object descriptor.

Object descriptors stored in OD 811 may be updated through OD Stream 804, which may pass through a new object descriptor corresponding to the same object. The new object descriptor then overwrites the existing object descriptor. This mechanism may be used to change the IPMP message which controls a particular object, by using a new object descriptor which is identical to the existing object descriptor, with the exception of the IPMP pointer.

OD Stream 804 can also carry IPMP_DescriptorUpdate messages. Each such message may have the same format as IPMP messages carried on the IPMP stream, including an IPMP ID and an IPMP message.

IPMP_DescriptorUpdate messages may be stored in a table or array in OD 811, or may be passed to IPMP System 812, where they may overwrite existing stored IPMP messages, or may add to the stored messages.

Since IPMP information may be separately conveyed through the OD stream or the IPMP stream, MPEG-4 System 801 may be designed so that it only accepts information through one or the other of these channels.

In another embodiment, the existence of the two channels may be used to allow multi-stage distribution, with governance added at later stages, but with no risk that later alterations may override governance added at an earlier stage.

Such a system is illustrated in FIG. 10. In this Figure, IPMP System 812 includes IPMP Table 1002, which has slots for 256 IPMP messages. This table stores the IPMP_ID implicitly, as the location at which the information is stored, shown in Column 1003. The IPMP message associated with IPMP_ID 4, for example, is stored at slot 4 of IPMP Table 1002.

Each location in IPMP Table 1002 includes Valid Indicator 1004 and Source Indicator 1005. Valid Indicator 1004 is set for a particular location when an IPMP message is stored at that location. This allows IPMP System 812 to identify slots which are unfilled, which otherwise might be difficult, since at start-up the slots may be filled with random information. This also allows IPMP System 812 to identify messages which are no longer valid and which may be replaced. Valid Indicator 1004 may store time stamp information for the period during which the message is valid with IPMP System 812 determining validity by checking the stored time stamp information against the currently valid time.

Source Indicator 1005 is set based on whether the associated IPMP message was received from IPMP Stream 807 or from OD Stream 804.

These indicators allow IPMP System 812 to establish a hierarchy of messages, and to control the manner in which messages are added and updated. IPMP System 812 may be designed to evaluate the indicators for a particular location once a message is received corresponding to that location. If the valid indicator is set to invalid, IPMP System 812 may be designed to automatically write the IPMP message into that slot. If the valid indicator is set to valid, IPMP System 812 may then be designed to check the source indicator. If the source indicator indicates that the associated message was received through OD Stream 804, IPMP System 1812 may be designed to overwrite the existing message with the new message. If, however, the source indicator indicates that the associated message was received through IPMP Stream 807, IPMP System 812 may be designed to check the source of the new message. That check may be accomplished by examining the header associated with the new message, to determine if the new message was part of OD Stream 804 or part of IPMP Stream 807. Alternatively, IPMP System 812 may derive this information by determining whether the message was received directly from Demux 808 or through OD 811.

If the new message came through IPMP Stream 807, IPMP System 812 may be designed to store the new message in Table 1002, overwriting the existing message. If the new message came through OD Stream 804, on the other hand, IPMP System 812 may be designed to reject the new message.

This message hierarchy can be used to allow for a hierarchy of control. A studio, for example, may encode a movie in MPEG-4 format. The studio may store IPMP messages in the IPMP stream. Those messages may include a requirement that IPMP System 812 require that a trailer for another movie from the same studio be displayed prior to the display of the feature movie. IPMP System 812 could be used to monitor the beginning and end of rendering of the trailer (using feedback through Control Line 819) to ensure that the entire trailer plays, and that the user does not fast-forward through it.

The movie studio could encrypt the various elementary streams, including the IPMP stream. The movie studio could then provide the movie to a distributor, such as a cable channel. The movie studio could provide the distributor with a key enabling the distributor to decrypt the OD stream (or could leave the OD stream unencrypted), and the ability to insert new messages in that stream. The cable channel could, for example, include a rule in the OD stream specifying that the IPMP system check to determine if a user has paid for premium viewing, decrypt the movie if premium viewing has been paid for, but insert advertisements (and require that they be rendered) if premium viewing has not been paid for).

The cable channel would therefore have the ability to add its own rules into the MPEG-4 Bit Stream, but with no risk that the cable channel would eliminate or alter the rules used by the movie studio (e.g., by changing the trailer from a movie being promoted by the studio to a rival movie being promoted by the cable channel). The studio's rules could specify the types of new rules which would be allowed through the OD stream, thereby providing the studio a high degree of control.

This same mechanism could be used to allow superdistribution of content, possibly from one user to another. A user could be provided with a programming interface enabling the insertion of messages into the OD stream. A user might, for example, insert a message requiring that a payment of $1.00 be made to the user's account before the movie can be viewed. The user could then provide the movie to another user (or distribute it through a medium whereby copying is uncontrolled, such as the Internet), and still receive payment. Because the user's rules could not overrule the studio's rules, however, the studio could be certain that its rules would be observed. Those might include rules specifying the types of rules a user would be allowed to add (e.g., limiting the price for redistribution).

MPEG-4 System 801 may also be designed to include a particular type of IPMP system, which may be incompatible with IPMP systems that may be designed into other MPEG-4 systems. This may be possible because the MPEG-4 standard does not specify the format of the information contained in the IPMP stream, thereby allowing different content providers to encode information in differing manners.

IPMP System 812 in MPEG-4 System 801 may be designed for an environment in which differing IPMP formats exist. That system may scan the IPMP stream for headers that are compatible with IPMP System 812. All other headers (and associated packets) may be discarded. Such a mechanism would allow content providers to incorporate the same IPMP message in multiple formats, without any concern that encountering an unfamiliar format would cause an IPMP system to fail. In particular, IPMP headers can incorporate an IPMP System Type Identifier. Those identifiers could be assigned by a central authority, to avoid the possibility that two incompatible systems might choose the same identifier.

IPMP System 801 might be designed to be compatible with multiple formats. In such a case, IPMP System 801 might scan headers to locate the first header containing an IPMP System Identifier compatible with IPMP System 801. IPMP System 801 could then select only headers corresponding to that IPMP System Identifier, discarding all other headers, including headers incorporating alternate IPMP System Identifiers also recognized by the IPMP system.

Such a design would allow a content provider to provide multiple formats, and to order them from most to least preferred, by including the most preferred format first, the second most preferred format second, and so on. Since IPMP System 801 locks onto the first compatible format it finds, this ordering in IPMP Stream 801 would insure that the IPMP system chose the format most desired by the content provider.

Even if different IPMP formats are used, content will probably be encoded (and encrypted) using a single algorithm, since sending multiple versions of content would impose a significant bandwidth burden. Thus, ordinarily it will be necessary for content to be encrypted using a recognized and common encryption scheme. One such scheme could use the DES algorithm in output feedback mode.

This method of screening IPMP headers, and locking onto a particular format may also be used to customize an MPEG-4 bit Stream for the functional capabilities of a particular MPEG-4 system. Systems capable of rendering MPEG-4 content may span a considerable range of functionality, from high-end home theaters to handheld devices. Governance options suitable for one type of system may be irrelevant to other systems.

For example, MPEG-4 System 801 may include a connection to the Internet through Port 820, whereas a second MPEG-4 system (for example a handheld Walkman-like device) may lack such a connection. A content provider might want to provide an option to a viewer, allowing the viewer to see content for free in return for providing information about the viewer. The content provider could insert a rule asking the user whether the user wants to view the content at a cost, or enter identification information. The rule could then send the information through a port to the Internet, to a URL specified in the rule. A site at that URL could then evaluate the user information, and download advertisements targeted to the particular user.

Although this might be a valuable option for a content provider, it obviously makes no sense for a device which is not necessarily connected to the Internet. It would make no sense to present this option to the user of a non-connected device, since even if that user entered the information, the rule would have no way to provide the information to an external URL or download the advertisements. In such a case, the content provider might prefer to require that the user watch preselected ads contained in the original MPEG-4 bit stream.

Header information in the IPMP stream could be used to customize an MPEG-4 bit stream for particular devices. As with the IPMP System Type information, IPMP Header information could include MPEG-4 System Types. These could include 8 or 16-bit values, with particular features represented by bit maps. Thus, the presence of a bit at position 2, for example, could indicate that a device includes a persistent connection to the Internet.

An IPMP system could then evaluate the headers, and lock on to the first header describing functionality less than or equal to the functionality contained in the MPEG-4 device in which the IPMP system is embedded. If the header constituted a complete match for the functionality of the MPEG-4 device, the IPMP system could then cease looking. If the header constitutes less than a complete match (e.g., a header for a system which has an Internet connection, but lacks a digital output port, when the system includes both), the IPMP system can lock on to that header, but continue to scan for closer matches, locking on to a closer match if and when one is found.

The IPMP messages identified by a particular header would be those suited for the particular functionality of the MPEG-4 device, and would allow for customization of the MPEG-4 bit stream for that functionality. In the context of the example given above, the IPMP system for an MPEG-4 device containing an Internet connection would lock on to a particular header, and would download the IPMP messages characterized by that header. Those messages would prompt the user for information, would provide that information to the URL, and would authorize decryption and rendering of the movie, with the advertisements inserted at the appropriate spot.

In the case of an MPEG-4 device without an Internet connection, on the other hand, the IPMP system would lock onto a set of headers lacking the bit indicating an Internet connection, and would download the rules associated with that header. Those rules might not provide any option to the user. The rules might allow decryption of the content, but would also specify decryption of an additional ES from the MPEG-4 stream. That additional ES would contain the advertisements, and the IPMP system would require decryption and rendering of the advertisements, checking Control Line 819 to make certain that this had occurred. In the case of the system with the Internet connection, however, the rules allowing decryption and requiring rendering of the ES containing the advertisements would never be loaded, since those rules would be contained within messages identified by the wrong type of header. The advertisement ES would therefore never be decrypted and would be ignored by the MPEG-4 device.

Figure 21:
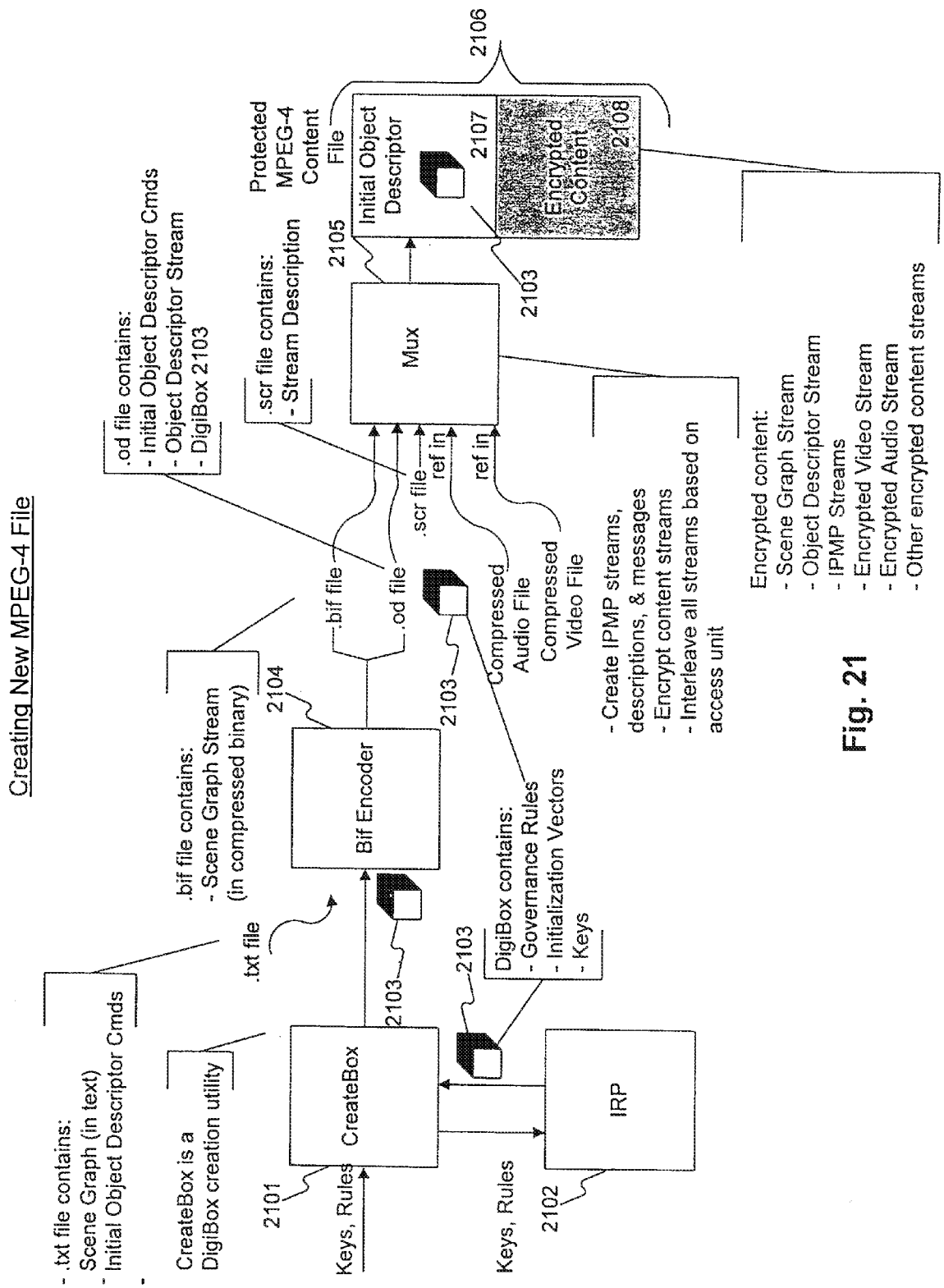
FIG. 21 illustrates the flow of data in one embodiment in which a protected MPEG-4 file may be created consistent with the present invention.

FIG. 21 illustrates one manner in which a protected MPEG-4 file may be created. In this figure, CreateBox 2101 represents a DigiBox creation utility, which accepts keys and rules. In one embodiment, CreateBox 2101 may pass these keys and rules to IRP 2102 and receive DigiBox 2103 from IRP 2102. In another embodiment, IRP 2102 may be incorporated into CreateBox 2101, which accepts keys and rules and outputs DigiBox 2103.

DigiBox 2103 contains governance rules, initialization vectors and keys. DigiBox 2103 is passed from CreateBox 2101 to Bif Encoder 2104. Bif Encoder 2104 may be conventional, with the exception that it is designed to accept and process DigiBoxes such as DigiBox 2103. Bif Encoder 2104 also accepts a .txt file containing a scene graph, and initial object descriptor commands.

Bif Encoder 2104 outputs a .bif file, containing the scene graph stream (in compressed binary form) and a .od file, containing the initial object descriptor commands, the object descriptor stream, and DigiBox 2103.

Bif Encoder 2104 passes the bif file and the .od file to Mux 2105. Mux 2105 also accepts compressed audio and video files, as well as a .scr file that contains the stream description. Mux 2105 creates IPMP streams, descriptors and messages, encrypts the content streams, interleaves the received streams, and outputs Protected MPEG-4 Content File 2106, consisting of Initial Object Descriptor 2107 and Encrypted Content 2108. Initial Object Descriptor 2107 contains DigiBox 2103, as well as other information. Encrypted Content 2108 may include a scene graph stream (i.e., a BIFS stream), an object descriptor stream, IPMP streams, and encrypted content streams.

If DigiBox 2103 contains all keys and rules necessary to render all of the content, it may be unnecessary for Mux 2105 to create any IPMP streams. If additional keys or rules may be necessary for at least a portion of the content, Mux 2105 may incorporate those rules and keys into one or more additional DigiBoxes, and incorporate those. DigiBoxes either in the IPMP stream or in the OD update stream.

Figure 22:
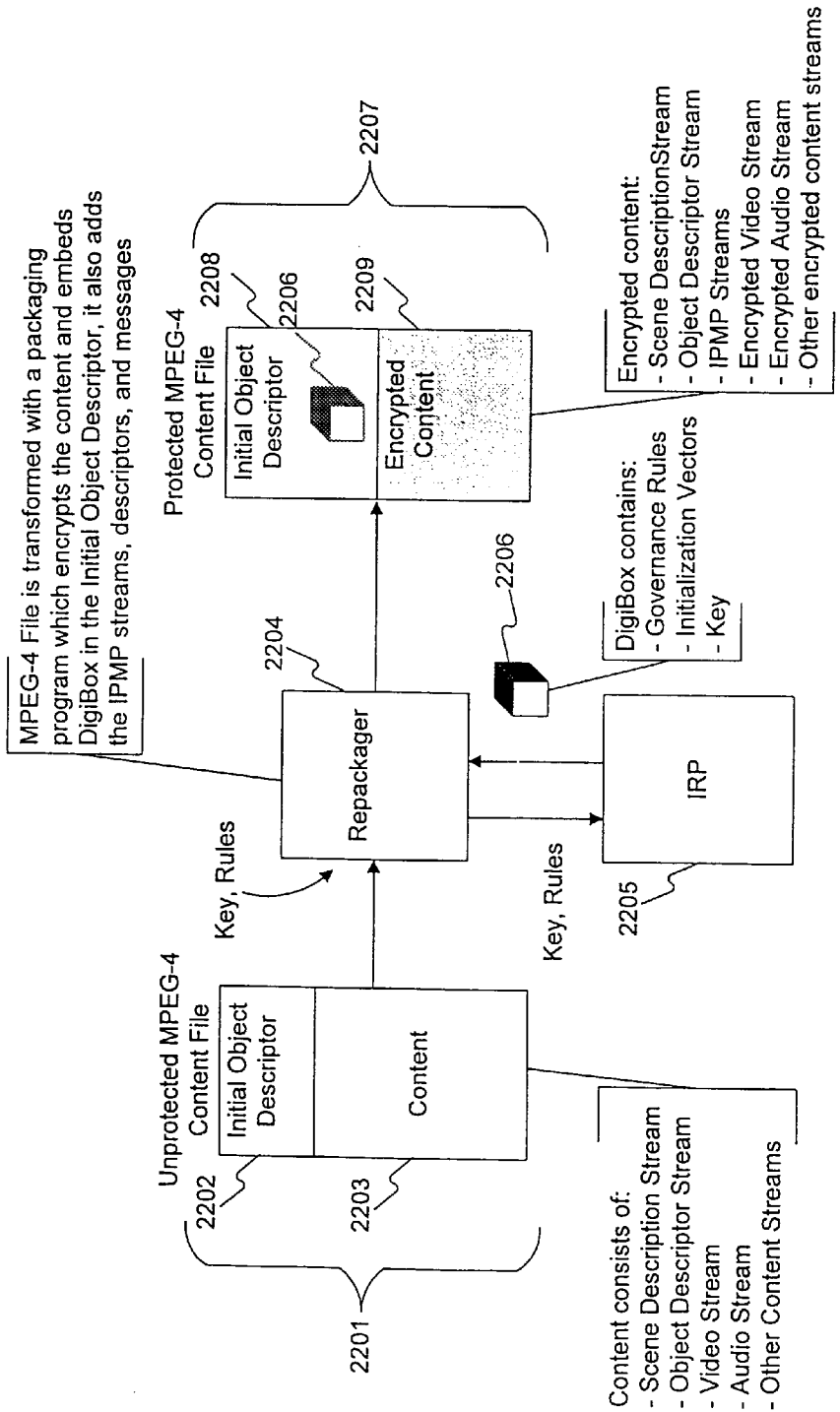
FIG. 22 illustrates the flow of data in one embodiment in which control may be incorporated into an existing MPEG-4 stream consistent with the present invention.

FIG. 22 illustrates one manner in which control may be incorporated into an existing MPEG-4 stream. In this figure, Unprotected MPEG-4 Content File 2201 includes Initial Object Descriptor 2202 and Content 2203. The content may include a scene description stream (or BIF stream), an object descriptor stream, a video stream, an audio stream, and possibly additional content streams.

Unprotected MPEG-4 Content File 2201 is passed to Repackager 2204, which also accepts keys and rules. Repackager 2204 passes the keys and rules to IRP 2205, and receives DigiBox 2206 in return, containing keys, rules and initialization vectors. In an alternate embodiment, IRP 2205 may be incorporated directly into Repackager 2204.

Repackager 2204 demuxes Unprotected MPEG-4 Content File 2201. It inserts DigiBox 2206 into the Initial Object Descriptor and encrypts the various content streams. Repackager 2204 also adds the IPMP stream, if this is necessary (including if additional DigiBoxes are necessary).

Repackager 2204 outputs Protected MPEG-4 Content File 2207, consisting of Initial Object Descriptor 2208 (including DigiBox 2206) and Encrypted Content 2209 (consisting of various streams, including the IPMP streams, if necessary).

Real Networks Implementation

In one embodiment, the elements described above may be used in connection with information encoded in compliance with formats established by Real Networks, Inc.

Figure 13:
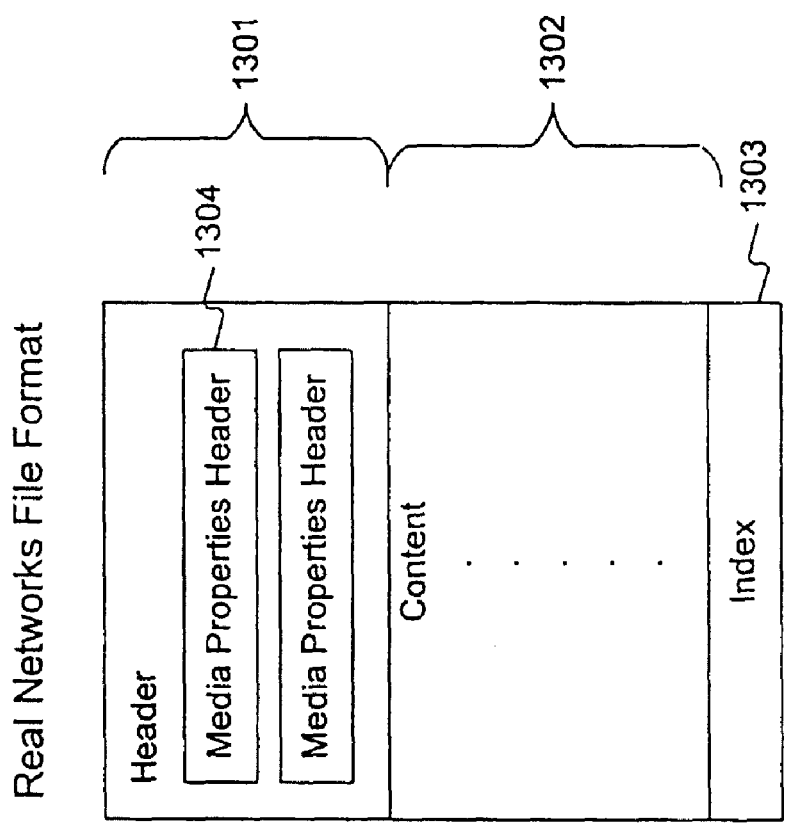
FIG. 13 shows an example of a Real Networks file format (RMFF)

The Real Networks file format (RMFF) is illustrated in FIG. 13. This format includes a block of headers at the beginning (Header 1301), followed by a collection of content packets (Content 1302), followed by an index used for seek and goto operations (Index 1303). Each file can contain several streams of different types. For each stream, there is a "Media Properties Header" (1304) used to describe the format of the media content (e.g., compression format) and provide stream specific information (e.g., parameters for the decompressor).

Figure 14:
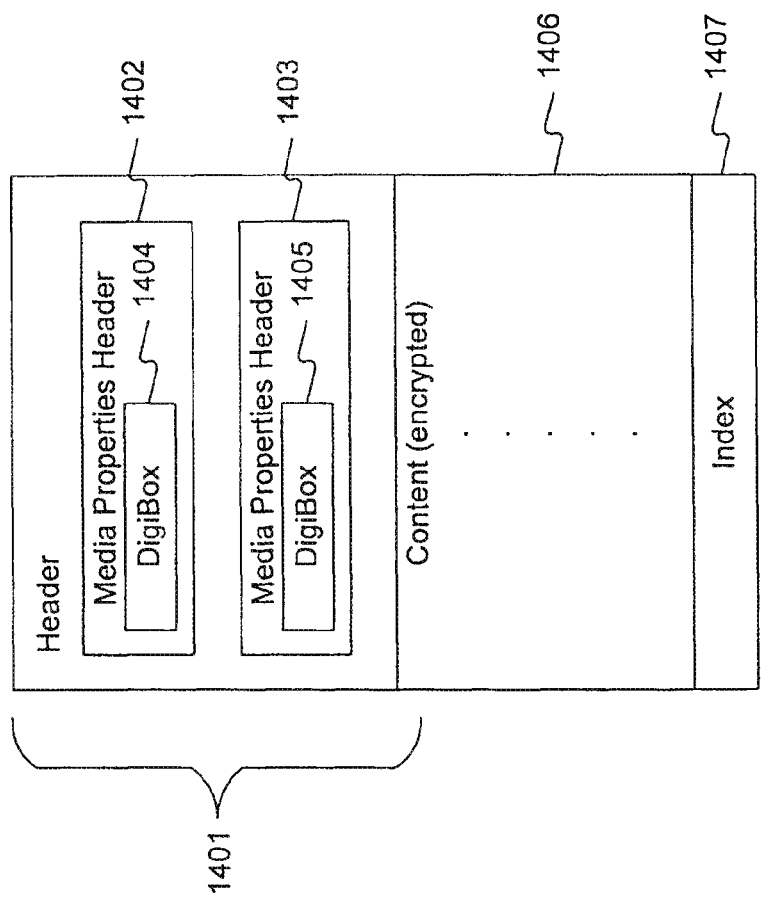
FIG. 14 shows an RNPFF format consistent with the present invention.

Real Networks streams can be protected by inserting a DigiBox into Header 1301 and encrypting the data packets contained in Content 1302. The altered format is illustrated in FIG. 14, which shows Header 1401, including Media Properties Headers 1402 and 1403, which in turn contain DigiBoxes 1404 and 1405, respectively. The format also includes encrypted Content 1406 and Index 1407.

In one embodiment, the declared type of the data is changed from the standard Real Networks format to a new type (e.g., RNWK_Protected.) The old type is then saved. Changing the type forces the Real Networks player to load a "Trust Plugin," since this Plugin is registered as the only decoder module that can process streams of type "RNWK-Protected." The Trust Plugin opens the DigiBox, gets approval from the user, if it is needed, determines the original content type, loads a decoder plugin for the original content, and then decrypts and/or validates the content, passing it to the content decoder plugin to be decompressed and presented to the user.

In one embodiment, the specific alterations made to the Real Networks file format are the following:

Increase the preroll time to force larger buffers on playback. In a current embodiment, an increase of 3 seconds is used. Larger buffers are needed because of the extra steps needed to decrypt the content.

Modify each stream-specific header by changing the mime type to "RNWK-Protected", saving the old mime type in the decoder specific information and adding a content identifier and DigiBox to the decoder specific information. The DigiBox contains the key, initialization vector (IV), version information, and watermarking instructions. The key, IV and content identifier are generated automatically, or can be provided as command-line parameters. The same key, IV and content identifier are used for every stream.

Content packets are selectively encrypted. In one embodiment, content packets whose start time in milliseconds is in the first half-second of each 5 seconds (i.e., starttime % 5000<500) are encrypted. This encrypts approximately one-tenth of the content reducing encryption and decryption costs, and damages the content, sufficiently to prevent resale. The encryption algorithm can be DES using output-feedback mode or any similar algorithm. The initialization vector is computed for each packet by xoring the stream's IV with the packet's start time in milliseconds. Some information unique to the stream should also be xored into the IV. In one embodiment, the same IV is used for multiple packets whenever two or more streams have packets with the same start time. This usually happens for the first packet in each stream since they usually have start time 0. Other than the first packet, it is rare to have two packets have the same start time.

Figure 15:
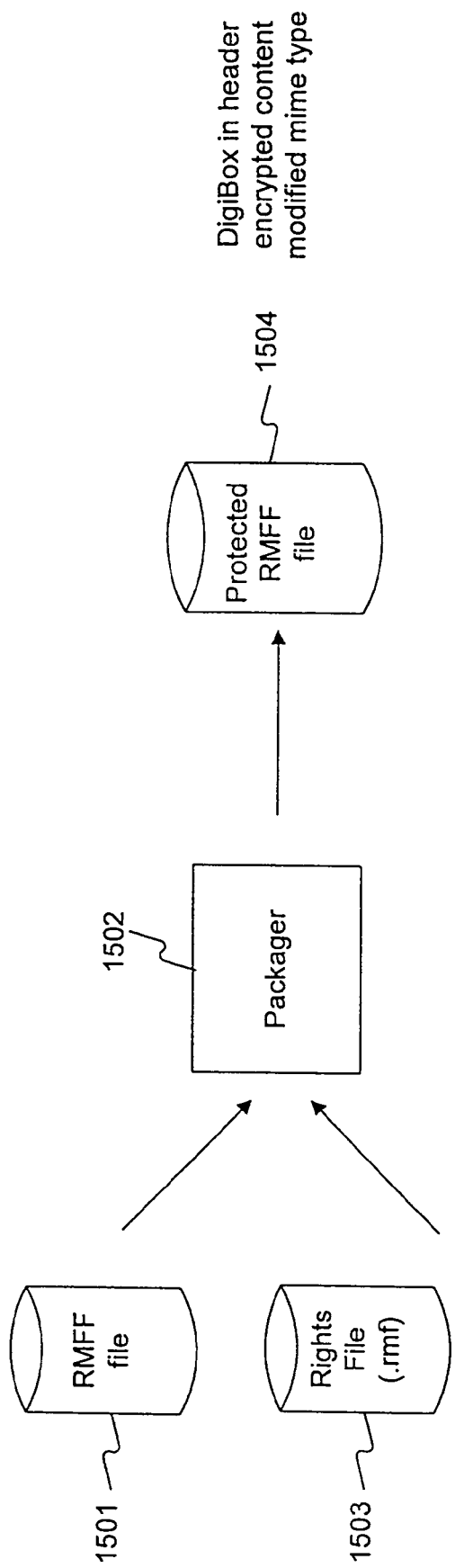
FIG. 15 illustrates the flow of changes to data in the Real Networks file format in an architecture consistent with the present invention.

In one embodiment, these changes to the Real Networks file format are accomplished as is shown in FIG. 15. As is illustrated, RMFF file 1501 is formatted in the standard Real Networks RMFF format. This file is passed to Packager 1502. Also passed to Packager 1502 is Rights File 1503. Packager 1503 generates Protected RMFF File 1504, which includes various alterations as described above and as listed in FIG. 15, including the incorporation of one or more DigiBoxes in the header, encryption of the content, modification of the mime type, etc.

Figure 16:
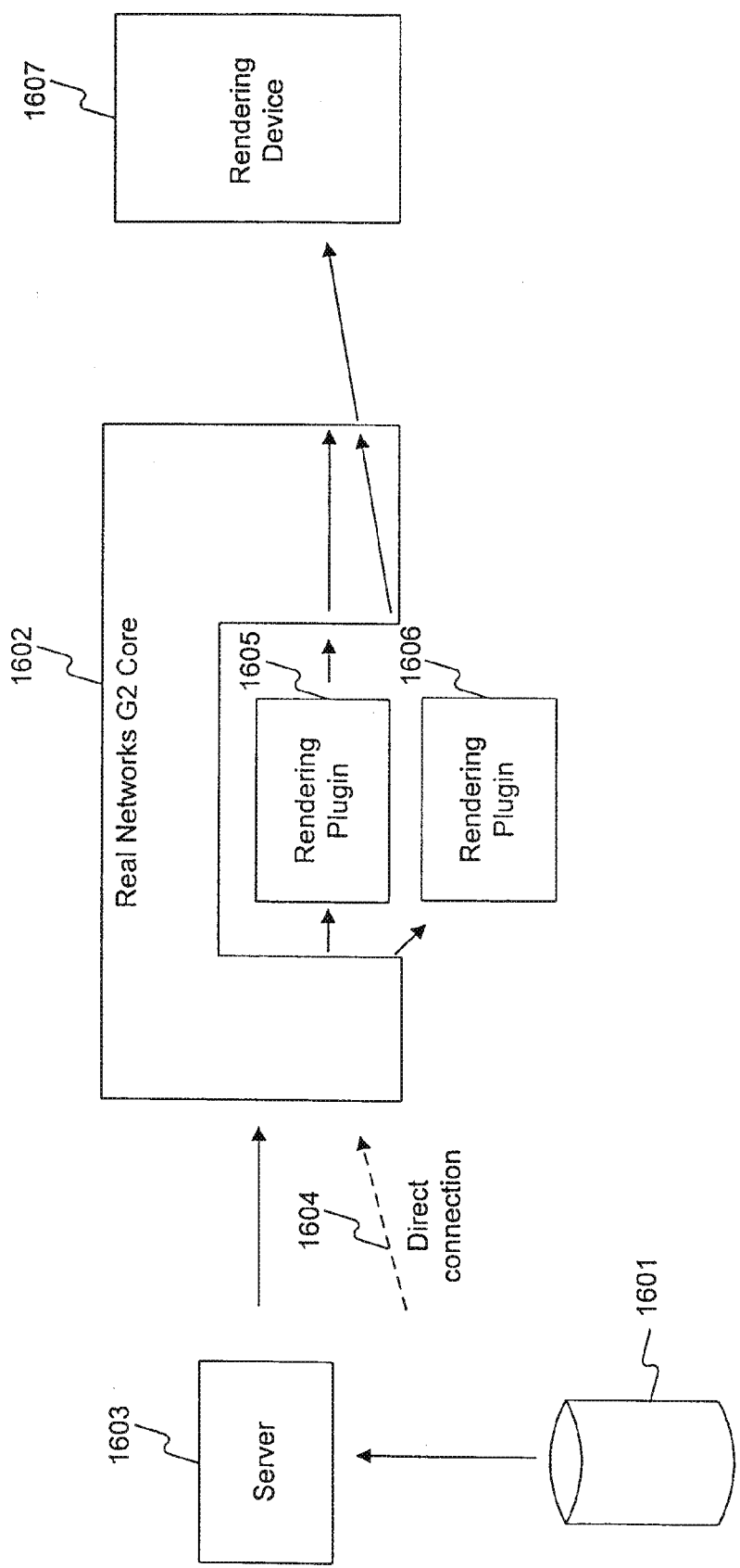
FIG. 16 illustrates a standard Real Networks architecture.

In one embodiment, the trust plugin described above is illustrated in FIGS. 16 and 17. FIG. 16 illustrates the standard Real Networks architecture. File 1601 (e.g., a streaming audio file in Real Networks format) is provided to Real Networks G2 Client Core 1602. File 1601 may be provided to RealNetworks G2 Client Core 1602 from Server 1603, or through Direct Connection 1604.

Upon receipt of File 1601, Real Networks G2 Client Core 1602 accesses a rendering plugin appropriate to File 1601, based on information which is obtained from the header associated with File 1601. Rendering Plugins 1605 and 1606 are shown. If File 1601 is of a type which cannot be rendered by either Rendering Plugin 1605 or Rendering Plugin 1606, Real Networks G2 Client Core 1602 may attempt to access an appropriate plugin, e.g., by asking for the user's assistance or by accessing a site associated with the particular file type.

Rendering Plug-In 1605 or 1606 processes File 1601 in a conventional manner. This processing most likely includes decompression of File 1601, and may include other types of processing useful for rendering the content. Once this processing is complete (keeping in mind that the content is streamed, so that processing may be occurring on one set of packets at the same time that another set of packets is being rendered), File 1601 is passed back to Real Networks G2 Client Core 1602, which then passes the information to Rendering Device 1607. Rendering Device 1607 may, for example, be a set of stereo speakers, a television receiver, etc.

Figure 17:
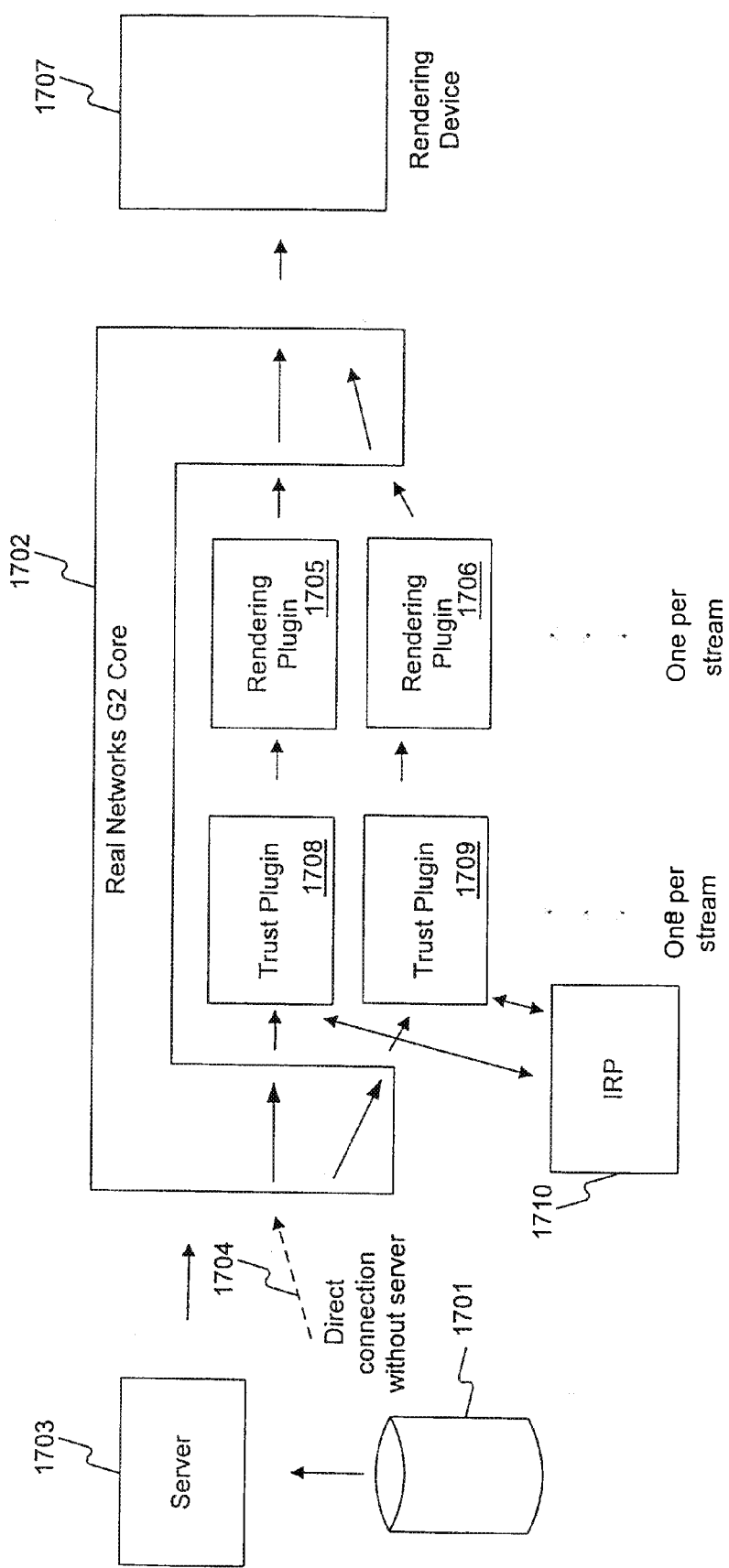
FIG. 17 shows an exemplary architecture in which a trust plugin operates within the overall Real Networks architecture.

FIG. 17 illustrates the manner in which a trust plugin operates within the overall Real Networks architecture. Much of the architecture illustrated in FIG. 17 is the same as that illustrated in FIG. 16. Thus, File 1701 is provided to Real Networks G2 Client Core 1702 through Server 1703 or through Direct Connection 1704. The file is processed by Real Networks G2 Client Core 1702, using plugins, including Rendering Plugins 1705 and 1706, and is then passed to Rendering Device 1707.

FIG. 17 differs from FIG. 16 in its incorporation of Trust Plugins 1708 and 1709, and IRP 1710. When initially registered with Real Networks G2 Client Core 1702, Trust Plugins 1708 and 1709 inform Real Networks G2 Client Core 1702 that they can process content of type RNWK-Protected. Whenever Real Networks G2 Client Core 1702 encounters a stream of this type, it is then enabled to create an instance of the trust plugin to process the stream, e.g., Trust Plugin 1708. It then passes the stream to the trust plugin.

The stream passed to Trust Plugin 1708 may be in the format shown in FIG. 14. In such a case, Trust Plugin 1708 extracts DigiBox 1404 from Media Properties Header 1402. It also extracts the content id and original mime type from Media Properties Header 1402. The Trust Plugin first checks to see if any other stream with the same content identifier has been opened. If so, then DigiBox 1404 is not processed further. Instead, the key and IV from the box for this other stream are used. This avoids the time cost of opening a second box. Also, this ensures that a user is only asked to pay once even if there are multiple protected streams. By sharing content ids, keys, and IVs, several files can be played with the user only paying once. This is useful when SMIL is used to play several RMFF files as a single presentation.

In an alternate and possibly more secure embodiment, this check is not performed, and the key and IV from the current DigiBox are used even if another stream with the content identifier has already been opened.

If no other stream has been identified with the same content identifier, Trust Plugin 1708 passes DigiBox 1404 to IRP 1710. IRP 1710 may be a software process running on the same computer as Real Networks G2 Client Core and Trust Plugin 1708. IRP 1710 may run in a protected environment or may incorporate tamper resistance techniques designed to render IRP 1710 resistant to attack.

IRP 1708 may process DigiBox 1404 and extract a cryptographic key and an IV, which may then be passed to Trust Plugin 1708. Trust Plugin 1708 may then use this information to decrypt Encrypted Contents 1406.

Trust Plugin 1708 uses the original mime type information extracted from Media Properties Header 1402 to create an instance of the rendering plugin to be used for the content (e.g., Rendering Plugin 1705). Once this is done, Trust Plugin 1708 behaves like an ordinary rendering plugin to the Real Networks G2 Client Core 1702, in that Real Networks G2 Client Core 1702 passes streamed information to Trust Plugin 1708, which decrypts that information and passes it to Rendering Plugin 1705. From the perspective of Real Networks G2 Client Core 1702, Trust Plugin 1708 constitutes the appropriate rendering plugin, and the core is not aware that the information is being passed by Trust Plugin 1708 to a second plugin (e.g., Rendering Plugin 1705).

Similarly, from the point of view of Rendering Plugin 1705, Trust Plugin 1708 behaves like Real Networks G2 Client Core 1702. Thus although Rendering Plugin 1705 receives decrypted stream information from Trust Plugin 1708, Rendering Plugin 1705 operates exactly as if the information had been received directly from Real Networks G2 Client Core 1702. In this manner, content formatted for Rendering Plugin 1705 may instead be first processed by Trust Plugin 1708, without requiring any alteration to Real Networks G2 Client Core 1702 or Rendering Plugin 1705.

Trust Plugin 1708 may also perform other processing that may be helpful for security purposes. For example, Trust Plugin 1708 may watermark the decrypted file prior to passing it to Rendering Plugin 1705, keeping in mind that the watermark algorithm must be such that it will survive decompression of the file by Rendering Plugin 1705.

MP3 Embodiment

The techniques described above can also be applied to MP3 streaming content.

Figure 18:
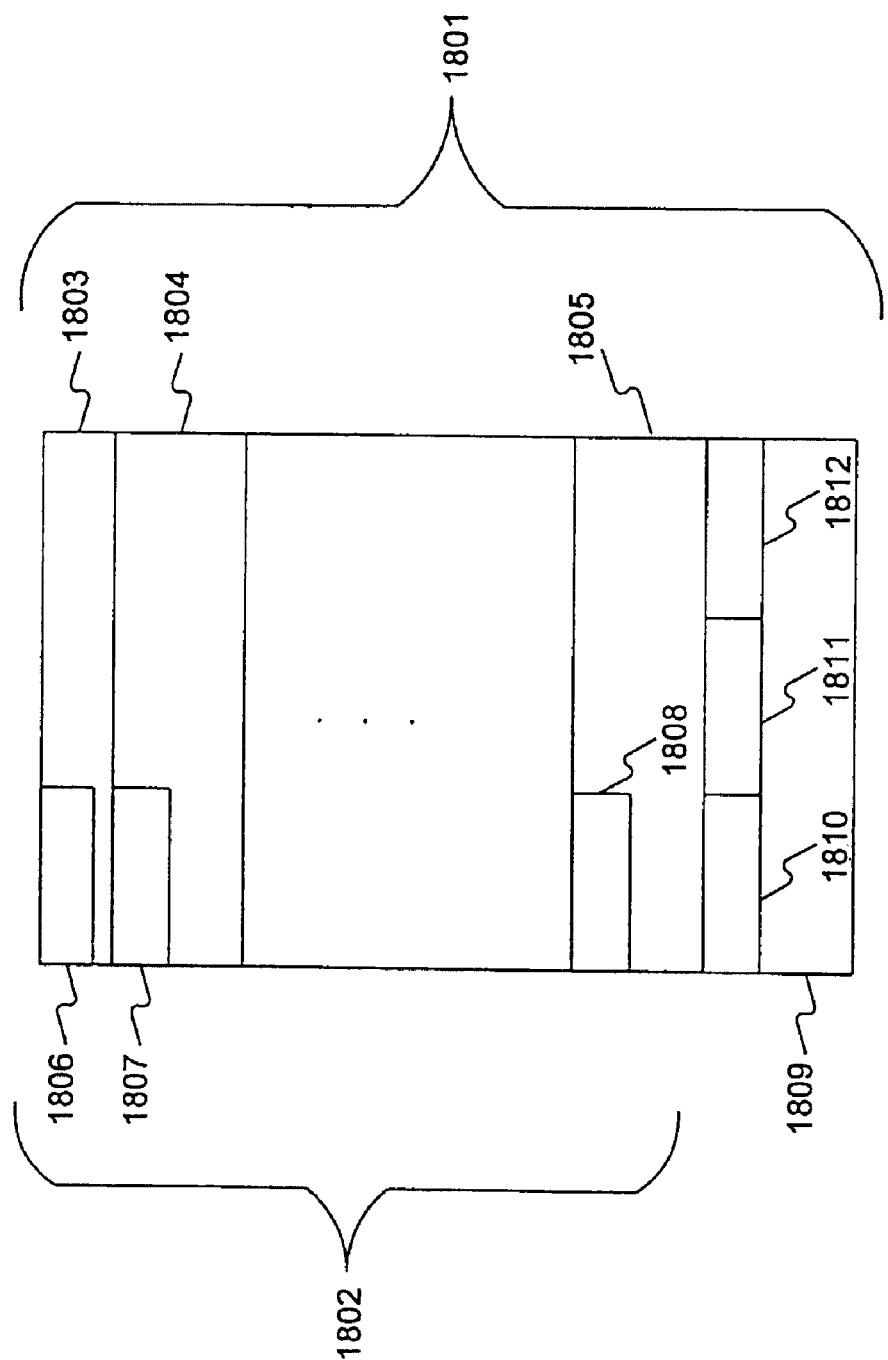
FIG. 18 shows a bit stream format consistent with the principles of the present invention.

The MP-3 specification does not define a standard file format, but does define a bit stream, which is illustrated in FIG. 18. In FIG. 18, MP-3 Bit Stream 1801 includes Content 1802. Content 1802 is divided into frames, shown as Frame 1803, Frame 1804 and Frame 1805. The dots between Frame 1804 and 1805 symbolize the fact that Content 1802 may include a large number of frames.

Each frame includes its own small header, shown in FIG. 18 as Headers 1806, 1807 and 1808.

Many MP3 players support a small trailer defined by the ID3 V1 specification, shown as Trailer 1809. This is a 128 byte trailer for carrying fields like artist, title and year, shown as Fields 1810, 1811 and 1812. The ID3 V1 trailer is ignored by players not designed to read such trailers, since it does not appear to be valid MP3 data.

Figure 19:
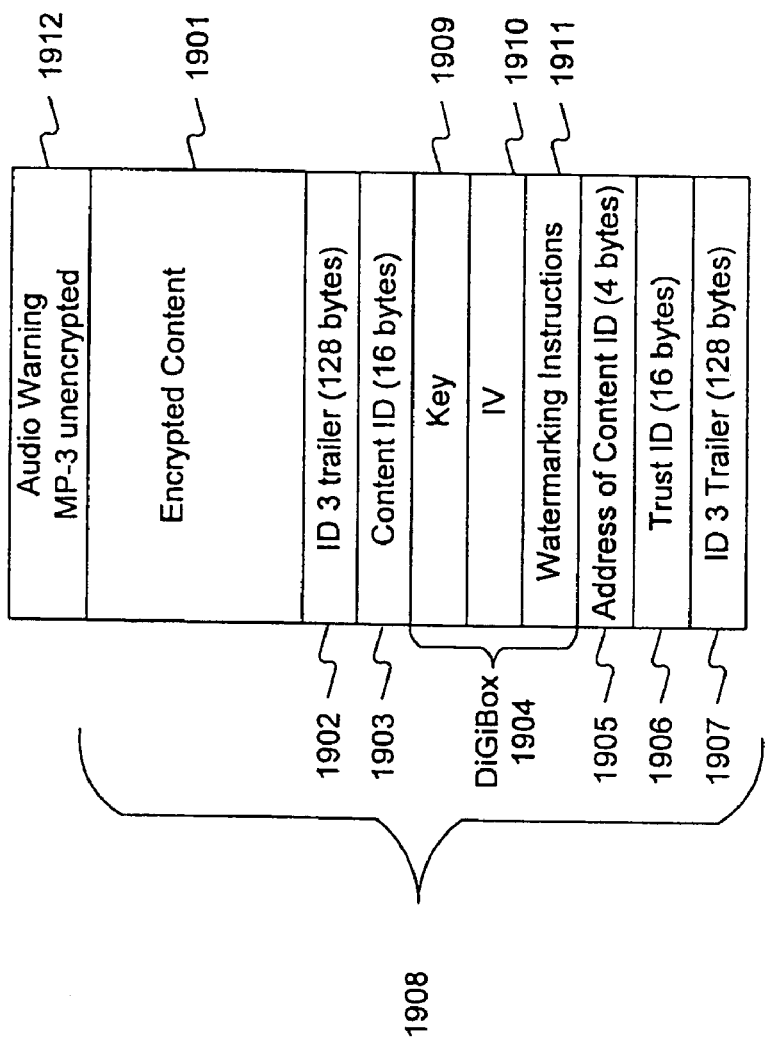
FIG. 19 shows one embodiment of protection applied to the MP3 format.

FIG. 19 shows one embodiment of protection applied to the MP3 format. This protected format constitutes File 1908 and includes the following items:

Unencrypted MP3 Content 1912. This is the first information encountered by a player, and will be rendered by any standard MP3 player. It can include a message to the user indicating that the content is protected and providing instructions as to how the content can be accessed (e.g., a URL for a trust plugin, instructions on payment mechanisms, etc.) Unencrypted MP3 Content 1912 may include a "teaser," consisting of an initial portion of the content (e.g., 30 seconds), which is rendered at no cost, thereby allowing a user to sample the content prior to making a decision to purchase it.

Encrypted MP-3 Content 1901, which may include thousands of MP-3 frames. In one embodiment, the first eight frames out of every 32 frames are encrypted. Thus, one-quarter of the frames are rendered unusable unless a player is able to decrypt them. In practice, this may render the content un-sellable or unusable, without imposing excessive encryption or decryption costs. To further reduce encryption and decryption costs, only 32 bytes in each frame are encrypted. In a current embodiment, these are the first 32 bytes after the header and CRC information. In a different embodiment, a different 32 bytes may be encrypted in every frame. In a current embodiment, the content is encrypted with the DES using algorithm output-feedback mode. The initial IV for the file is randomly generated and then xored with the frame number to generate a unique IV for each frame.

Many alternate embodiments may exist, including encrypting more or less information, and using different encryption algorithms.

ID3 V1 Trailer 1902, including 128 bytes.

Content ID 1903, including 16 bytes. This is used by the player application to avoid opening DigiBoxes which it has already opened.

DigiBox 1904, which may comprise approximately 18K bytes. It includes Key 1909, IV 1910 and Watermarking Instructions 1911. Watermarking Instructions 1911 may be used in a process of watermarking the associated content.

Address 1905, which contains the address in the file of Content ID 1903 and consists of 4 bytes.

Trust ID 1906, which identifies this trusted MP-3 file and consists of 16 bytes.

ID3 V1 Trailer 1907, which is a copy of Trailer 1902.

A conventional MP3 player encountering File 1908 would be unable to render Content 1901, since at least a portion of that content is encrypted. Such a player would most likely read through to Trailer 1902 and cease processing at that point. A conventional player looking for the ID3 trailer information will seek to the end and find it.

Figure 20:
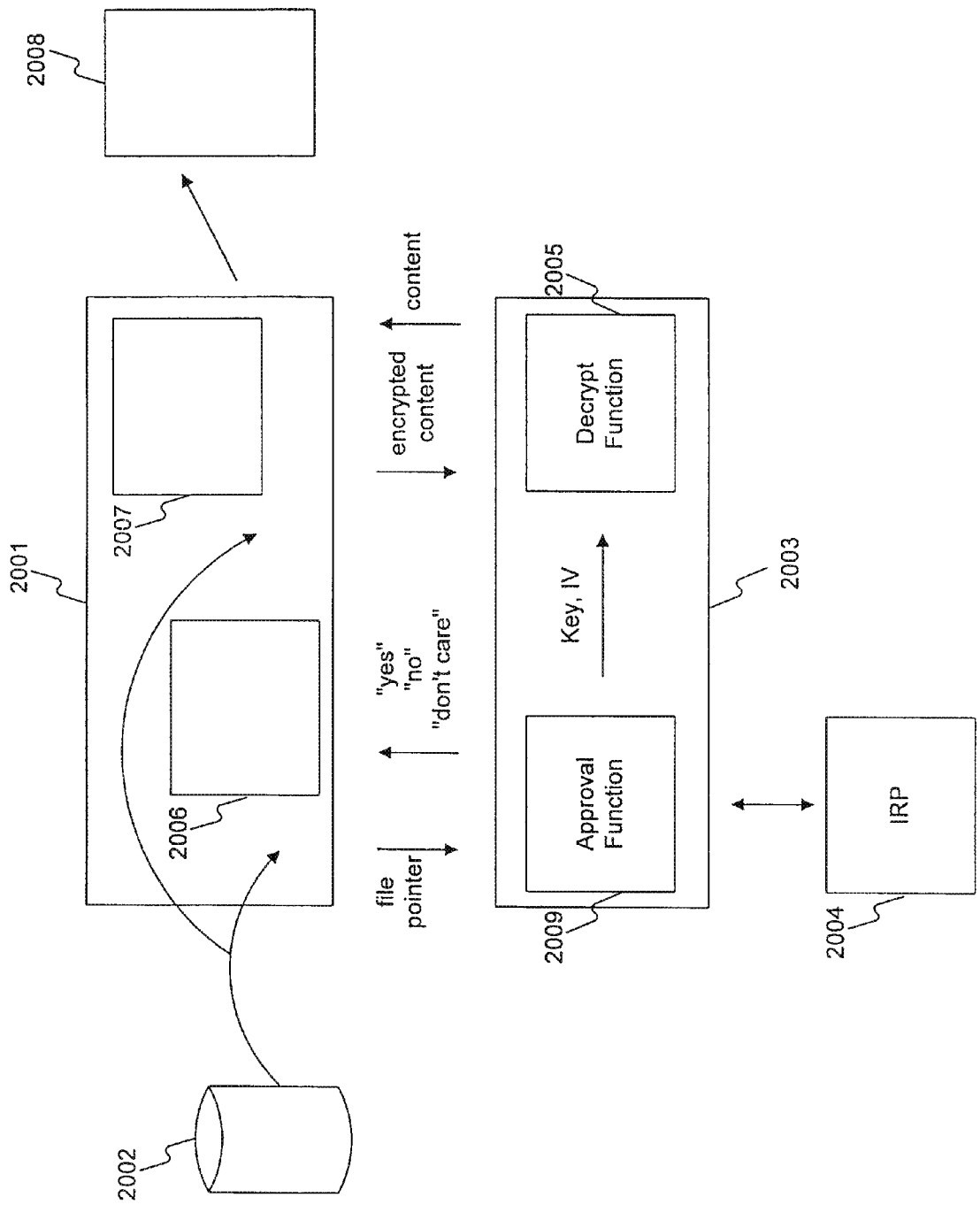
FIG. 20 illustrates one embodiment of an MP3 player designed to process and render protected content.

FIG. 20 illustrates one embodiment of an MP3 player designed to process and render protected content. This figure shows MP3 Player 2001, which includes Buffer 2006 and Decompressor 2007, and renders content to Rendering Device 2008. In one embodiment, this is a modified version of a player distributed by Sonique.

Player 2001 obtains Protected MP3 File 2002 through any standard interface. Protected MP3 File 2002 may have the format illustrated in FIG. 19.

When Player 2001 is asked to play Protected MP3 File 2002, Player 2001 first calls Trust Plug-In 2003, which includes Approval Function 2009 and Decrypt Function 2005. Trust Plugin 2003 calls Approval Function 2009 to determine if Protected MP3 File 2002 is protected and whether authorization exists to play the file. Approval Function 2009 is first given a pointer to Protected MP3 File 2002. It then checks Protected MP3 File 2002 for the presence of Trust ID 1906. If Trust ID 1906 is not found, Approval Function 2009 returns an indicator that the file is not protected. Player 2001 then proceeds to render the file as a normal MP3 file.

If Trust ID 1906 is found, Approval Function 2009 checks Content ID 1903 to see if it matches the Content ID of a file that has already been opened.

If Protected MP3 File 2002 has not been previously opened, DigiBox 1904 is retrieved by Approval Function 2009, and is passed to IRP 2004, which may include software running in a protected environment, or incorporating tamper resistance. IRP 2004 attempts to open DigiBox 1904 in compliance with the rules associated with that DigiBox. One such rule may require, for example, that the user indicate assent to pay for use of the content. If DigiBox 1904 cannot be opened (e.g., the user refuses to pay) a value is returned to Approval Function 2009 indicating that the file is protected and may not be played.

If DigiBox 1904 is opened in compliance with applicable rules, the key and IV are retrieved and passed to Decrypt Function 2005. The key and IV are stored with the content id for later re-use and Decrypt Function 2005 is initialized. This may improve overall system performance, since it reduces the number of times a DigiBox must be opened. Each such action may introduce significant latency.

On the other hand, storing this information in unprotected memory may reduce overall system security. Security may be enhanced either by not storing this information (thereby requiring that each DigiBox be opened, even if the corresponding file has already been opened through another DigiBox), or by storing this information in a protected form or in a secure location.

The stored key, IV and content id are referenced when Approval Function 2009 first checks Content ID 1903 to determine if it matches the Content ID of an already opened file. If the new Content ID matches a stored Content ID, Decrypt Function 2005 is reinitialized using the stored key and IV corresponding to the matching content id and a value indicating that this is a protected file for which play is authorized is returned to Approval Function 2009.

Once Protected MP3 File 2002 has been opened, each time Player 2001 needs a packet, Player 2001 reads it into Buffer 2006, strips off the header and CRC and passes the remaining data and a frame number to Decrypt Function 2005, which decrypts the frame if necessary, and returns it to Player 2001.

In a current embodiment, although audio content is encrypted, headers or trailers are not encrypted. This allows the Player 2001 to process information in headers or trailers without intervention from Approval Function 2009 or Decrypt Function 2005. This allows Player 2001 to place information such as playing time, artist and title into a playlist display, and initialize Decompressor 2007, without any action required from Trust Plugin 2003.

Commerce Appliance Embodiment

This section will describe an embodiment, comprising a Commerce Appliance architecture designed to allow persistent control of digital works in consumer electronics devices. Although this is described as a separate embodiment, it should be understood that the features of this embodiment may be combined with, or supplant, the features of any of the embodiments provided elsewhere in this description.

In one embodiment, this section will describe modifications to the MPEG-4 standard designed to support the association of persistent rules and controls with MPEG-4 content, as well as elements necessary for a Commerce Appliance to use such content. This is intended, however, merely as an example.

Figure 23:
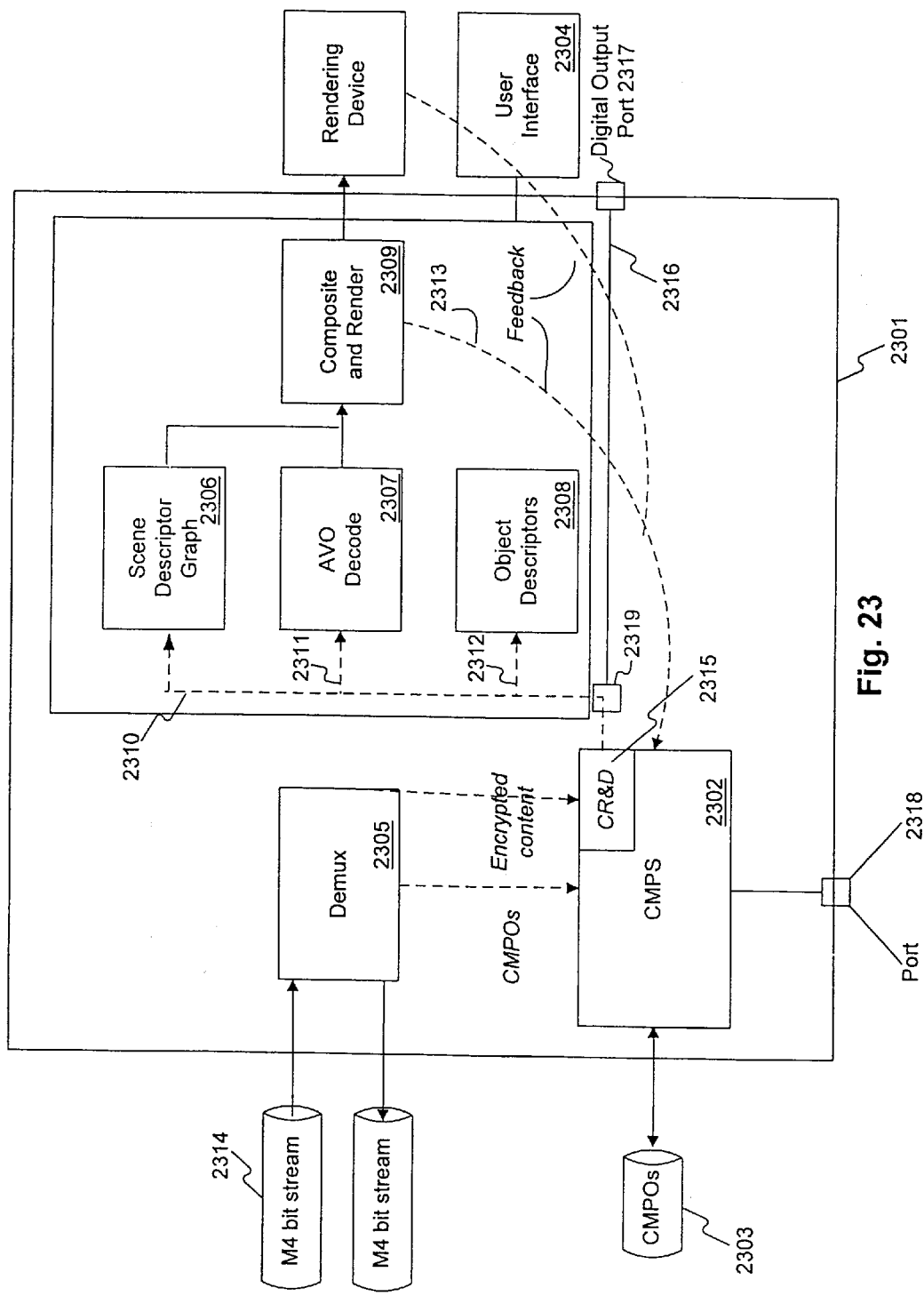
FIG. 23 shows a system consistent with the principles of the present invention.

In one embodiment, shown in FIG. 23, each Commerce Appliance 2301 includes a CMPS ("Content Management and Protection System") 2302. Each CMPS is responsible for governing the use of controlled content, including decrypting the content and ensuring that the content is only used as permitted by associated rules.

Each governed digital work is associated with one or more CMPOs (Content Management Protection Object), e.g., CMPOs 2303. Each CMPO may specify rules governing the use of the digital work, and may include keys used to decrypt the work.

CMPOs may be organized in an hierarchical fashion. In one embodiment, a content aggregator (e.g., a cable channel, a web site, etc.) may specify a Channel CMPO ("CCMPO") used to associate certain global rules with all content present on that channel. Each independent work may in turn have an associated Master CMPO ("MCMPO") used to associate rules applicable to the work as a whole. Each object (or Elementary Stream, in MPEG-4) may have associated with it a CMPO containing rules governing the particular object.

In one exemplary application, Commerce Appliance 2301 may be an MPEG-4 player containing CMPS 2302. Upon receipt of a user command to play a particular work, CMPS 2302 may download a MCMPO associated with the work and obtain rules, which may include conditions required for decryption and viewing of the work. If the rules are satisfied, CMPS 2302 may use keys from the MCMPO to decrypt any Elementary Streams ("ES"), and may pass the decrypted ESs into the buffers. Composition and rendering of the MPEG-4 work may thereafter proceeds according to the MPEG-4 standard, except that any storage location or bus which may contain the work in the clear must be secure, and CMPS 2302 may have the ability to govern downstream processing, as well as to obtain information regarding which AVOs were actually released for viewing.

In a variation, the process of obtaining and governing the work may include downloading a CCMPO which applies rules governing this and other works. If rules contained in the CCMPO are satisfied, CMPS 2302 may obtain a key used to decrypt the MCMPO associated with the particular work to be viewed.

In another variation, a CMPO may be associated with each ES. In this variation, the MCMPO supplies one or more keys for decryption of each CMPO, and each CMPO may in turn supply a key for decryption of the associated ES.

Commerce Appliance 2301 is a content-rendering device which includes the capability of supporting distributed, peer management of content related rights by securely applying rules and controls to govern the use of content. Commerce Appliance 2301 may include general-purpose functions devoted to acquisition and managed rendering of content (e.g., a DVD (and/or any other optical disk format) player is able to play a DVD (and/or any other optical disk format) disk and output content to a television.) Commerce Appliance 2301 may make use of any of the means for protecting and using digital content on high capacity optical disk, in one non-limiting example, a DVD disk, as described in the aforementioned Shear patent application.

Commerce Appliance 2301 also includes special-purpose functions relating to other management and protection of content functions. These special-purpose functions may be supported by one or more embedded or otherwise included CMPS 2302 in the form of a single CMPS or a cooperative CMPS arrangement, and may include a user interface (e.g., User Interface 2304) designed to display control-related information to the user and/or to receive control-related information and directions from the user. Commerce Appliance 2301 may also be designed so that it is networkable with other Commerce Appliances (e.g., a set-top box connected to a DVD player and a digital television) and/or with other devices, such as a computer arrangement, which may also include one or more CMPSs.

An important form of Commerce Appliance specifically anticipates secure coupling on a periodic or continual fashion with a computer managed docking environment (e.g., a standalone computer or other computer managed device which itself may be a Commerce Appliance) where the one or more CMPSs of the Commerce Appliance interoperate with the docking environment to form a single user arrangement whose performance of certain functions and/or certain content usage events is enabled by such inter-operation through, at least in part, cooperation between CMPSs and content usage management information of the Commerce Appliance and the trust environment capabilities of the docking environment, (e.g., further one or more CMPSs and content usage management information, such as, for example, information provided by use of CI).

An exemplary Commerce Appliance may be designed to comply with the emerging MPEG-4 standard for the formatting, multiplexing, transmission, compositing, and rendering of video and other types of information.

Commerce Appliance 2301 may be any computing device, one non-limiting example of which is a Personal Computer (PC) that includes MPEG-4 software (and/or hardware) for rendering content. In accordance with the present invention, the PC may also use one or more CMPSs as described herein.

The commerce appliance function is not restricted to streamed channel content but may include various browser-type applications consisting of aggregated composite content such as still imagery, text, synthetic and natural video and audio and functional content such as applets, animation models and so on. these devices include browsers, set-top boxes, etc.

Content Management and Protection System (CMPS)

Each commerce appliance includes one or more CMPS (e.g., CMPS 2302). The CMPS is responsible for invocation and application of rules and controls, including the use of rules and controls to govern the manner in which controlled content is used.

Particular functions of CMPS 2302 include the following:

(a) Identification and interpretation of rules.

CMPS 2302 must determine which rules are to be applied, and must determine how those rules are to be interpreted in light of existing state information. In one embodiment, this requires that CMPS 2302 obtain and decrypt one or more CMPOs 2303 associated with a work.

(b) Identification of content associated with particular rules.

CMPS 2302 must determine which content is governed by particular one or more rules. This may be accomplished by obtaining information from one or more CMPOs 2303 and/or other CI. In one embodiment, a CCMPO may identify a set of works, a MCMPO may identify a particular work and a CMPO may identify a particular ES or Audio Visual Object ("AVO").

(c) Decryption of content as allowed by the rules.

CMPS 2302 may be designed so that all content is routed through CMPS 2302 for decryption, prior to reinsertion into the data flow required by the relevant standard. In the case of MPEG-4, for example, the output from Demux 2305 may be fed into CMPS 2302. CMPS 2302 may then decrypt the content and, if relevant rules and controls are satisfied, feed the content into the MPEG-4 buffers. From that point, the data flow associated with the content may be as described by MPEG-4.

(d) Control of content based on rules.

CMPS 2302 may be used to control usage of content after the initial decryption, for example, through the use of secure event management as described in the incorporated Ginter '333 patent application. In the case of MPEG-4 systems, this may require that CMPS 2302 exercise control over hardware and/or software which performs the following functions: demuxing (performed by Demux 2305), decompression/buffering/decode into AVOs (performed by Scene Descriptor Graph 2306, AVO Decode 2307 and Object Descriptors 2308), scene rendering (performed in Composite and Render 2309).

CMPS 2302 may also be used to control use and consequences according to: (1) generational copy protection rules such as the CGMS and/or SGMS standards; (2) various Conditional Access control methods, such as those proposed and/or implemented by NDS as described in MPEG-4 document M2959, DAVIC "Copyright Control Framework" document, and in other publications; (3) a Rights Management Language, such as those proposed in the Ginter '333 patent application and/or as described by U.S. Pat. No. 5,638,443 to Stefik, et al.; (4) use policies described in accordance with AT&T's Policy Maker, as described by Blaze, Feigenbaum, and Lacy; (5) the CCI layer bits for IEEE 1394 serial bus transmission as specified by the DTDG subgroup of the DVD Copy Protection Technical Working Group and/or as implemented by the Hitachi, Intel, Matsushita, Sony and Toshiba proposed standard (hereafter "the five company proposal"); (6) controls transmitted using any secure container technology such as, for example, IBM Cryptolope; (7) any other means for specifying use rules and consequences.

(e) Monitoring use of content.

CMPS 2302 may be used to monitor content to: (i) ensure that rules are being complied with; (ii) ensure that no attempts are being made to tamper with the system or protected content; and (iii) record information used by rules, including usage information needed for payment purposes.

(f) Updating user budgets.

CMPS 2302 may be used to update user or other budgets to reflect usage.

(g) Exhaust information.

CMPS 2302 may be used to output payment and usage information ("exhaust information") to external processes, including one or more Commerce Utility Systems.

(h) Hardware identification and configuration.

(i) Obtaining new, additional, and/or augmented rules from an external process, one non-limiting example of which is a Rights and Permission Clearinghouse as described in the incorporated Shear patent application.

(j) Receiving keys, digital credentials, such as certificates, and/or administrative information, from certifying authorities, deployment managers, clearinghouses, and/or other trusted infrastructure services.

(k) Securely sending and/or receiving user and/or appliance profiling and/or attribute information.

(l) Securely identifying a user or a member of a class of users who requests content and/or CMPO and/or CMPS usage.

(m) Securely certifying or otherwise guaranteeing the authenticity of application code, for example certifying within CMPO 2301 and/or CMPS 2302 that application code containing rules and/or other application information, such as information written in Java code for conditional execution within a Commerce Appliance, and/or that executes at least in part outside of CMPO 2301 and/or CMPS 2302, has not been altered and/or has been delivered by a guaranteed (e.g., trusted) party.

(n) Securely processing independently delivered CI, such as described in the incorporated Ginter '333 patent application, to perform content usage control that protects the rights of plural, independent parties in a commerce value chain.

(o) Securely performing watermarking (including, for example fingerprinting) functions, for example as described in the Ginter '333 patent application and as incorporated herein, for example including interpreting watermarking information to control content usage and/or to issue an event message, wherein such event message may be reported back to a remote authority, such as, for example, a MCMPO rights clearinghouse management location.

CMPS 2302 may be used to identify and record the current hardware configuration of the Commerce Appliance and any connected devices (e.g., which loudspeakers are available, identification of attached monitors, including whether particular monitors have digital output ports, etc.) If attached devices (such as loudspeakers) also include CMPSs, the CMPSs may be used to communicate for purposes of coordination (e.g., a CMPS in a set-top box and/or loudspeaker arrangement may communicate with a CMPS in a downstream digital television or other display device to establish which CMPS will be responsible for governance or the nature of cooperative governance through a virtual rights process, said process optionally involving a rights authority server that may find, locate, provide, aggregate, distribute, and/or manage rights processes, such as described in the aforementioned Shear patent application, for employing plural CMPSs, for example, for a single user content processing and usage arrangement).

The present invention includes arrangements comprising plural Commerce Appliances and/or CMPSs in one or more user locations, non-limiting examples of which include a home, apartment, loft, office, and/or vehicle, such as a car, truck, sports utility vehicle, boat, ship, or airplane, that may communicate among themselves at least occasionally and may comprise a virtual network that operates in a logically cooperative manner, through at least in part the use of such CMPSs, to ensure optimal commercial flexibility and efficiency and the enforcement of rights of commerce value chain participants, including financial and copyright rights of providers, infrastructure rights of appliance providers, societal rights of government and/or societal bodies, and privacy rights of all parties, including consumers. Information related to interaction among such a network of value chain participants, including content usage auditing, content usage consequence, and CI specification, can be securely, variably reported to parties having right to such information, through, at least in part, use of such CMPSs, for example, as described in the aforementioned Ginter '712 patent application regarding the information reporting functioning of VDE nodes.

Figure 24:
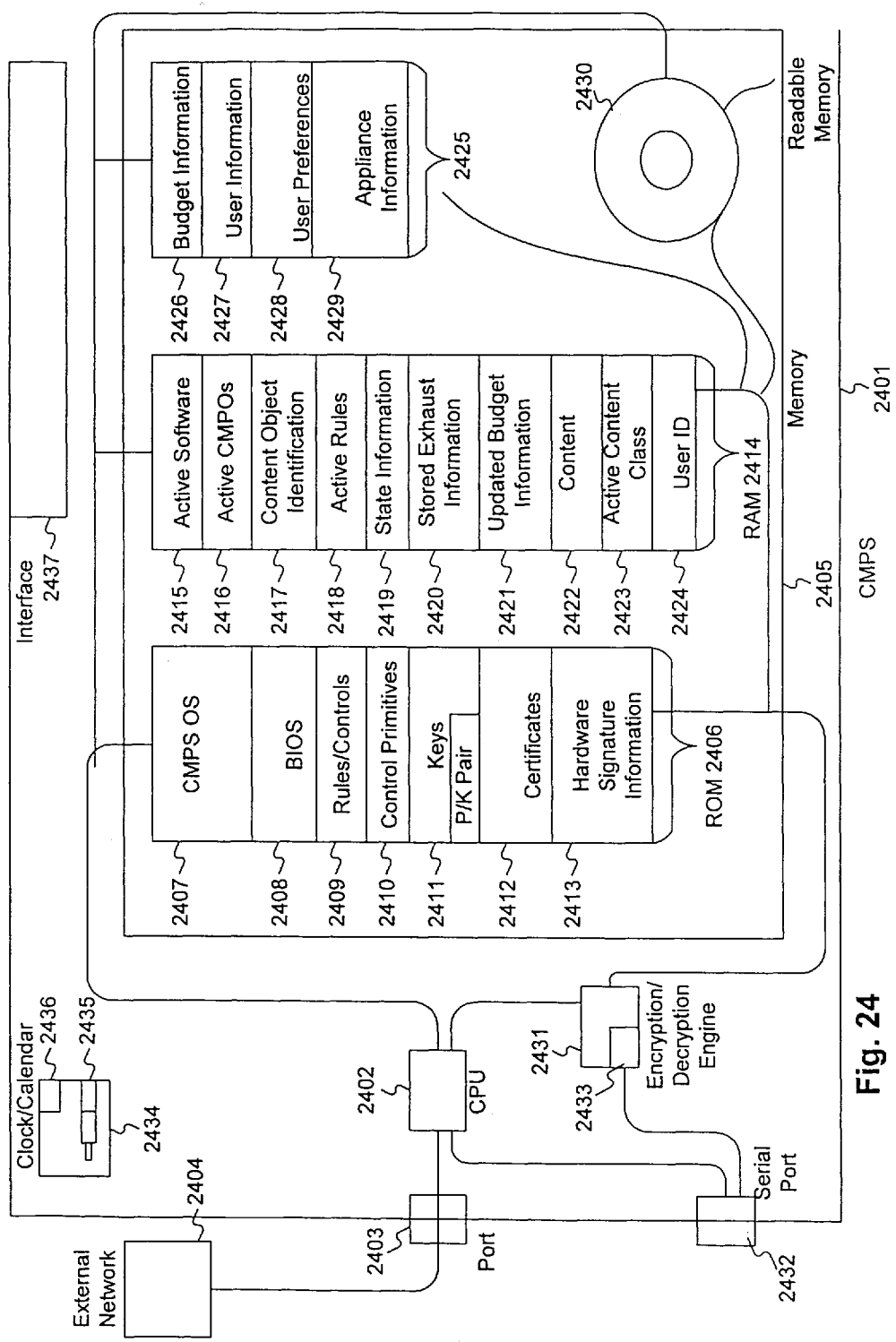
FIG. 24 shows a system consistent with the principles of the present invention.

In one embodiment, shown in FIG. 24, CMPS 2401 consists of special-purpose hardware and resident software or firmware. These include the following:

(a) One or more processors or microcontrollers e.g. CPU 2402. CPU 2402 controls the overall processing of CMPS 2401, including execution of any necessary software.

(b) One or more external communications ports, e.g., Port 2403. Port 2403 communicates with External Network 2404, which may include LANs, WANs or distributed networks such as the Internet. External communications ports may also include one or more IEEE 1394 serial bus interfaces.

(c) Memory 2405. Types of memories which may be included in Memory 2405—and examples of the information they may store—are the following:

i. ROM 2406. ROM 2406 may include any information which is permanently stored in CMPS 2401, such as (1) CMPS Operating System 2407 and/or CMPS BIOS 2408, (2) Rules/Controls 2409 which are permanently stored in the CMPS; (3) Control Primitives 2410 which may be used to build rules or controls; (4) Keys 2411 associated with the CMPS, including a Public/Private Key Pair; (5) one or more Certificates 2412 designed to identify CMPS 2401 and/or the device, including version information; (6) Hardware Signature Information 2413 used to check for tampering (e.g., a hashed signature reflecting the expected hardware state of the device).

ii. RAM 2414. RAM 2414 may hold current state information needed by CMPS 2401, as well as information temporarily stored by CMPS 2401 for later use. Information stored in RAM 2414 may include the following: (1) Software 2415 currently executing in CPU 2402; (2) CMPOs 2416 which are currently active; (3) Content Object Identification 2417 of those content objects which are currently active (in an MPEG 4 system this would constitute, for example, an identification of active AVOs); (4) Rules 2418 which are currently active; (5) State Information 2419 regarding the current state of use of content, including an identification of any higher-order organization (in an MPEG-4 system this would constitute an identification of the scene descriptor tree and the current state of composition and rendering); (6) Stored Exhaust Information 2420 relating to use and/or the user, designed for external transmission; (7) Updated Budget Information 2421; (8) Content 2422; (9) Active Content Class Information 2423; and (10) Active User Identification 2424, including identification characteristic information.

iii. NVRAM 2425 (e.g., flash memory). This type of memory may hold information which is persistent but changeable, including at least some: (1) Budget Information 2426; (2) User Information 2427, such as identification, credit card numbers; preferred clearinghouses and other Commerce Utility Systems; (3) User Preferences 2428, such as preferences, profiles, and/or attribute information; and (4) Appliance Information 2429, such as attribution and/or state information.

The types of information described above and stored in CMPS Memory 2405 may be stored in alternative of the above memory types, for example, certain budget information may be located in ROM, information regarding specific one or more clearinghouses may be stored in ROM, certain active information may be moved into NVRAM, etc.

Budget information may include stored budgets made up of, for example:

(1) electronic cash;
(2) pre-authorized uses (e.g., based on a prepayment, the user has the right to watch 12 hours of programming).
(3) Security budgets related to patterns reflecting abnormal and/or unauthorized usage, for example, as described in the incorporated Shear patent, wherein such budgets restrict and/or report certain cumulative usage conduct.
(4) electronic credit, including credit resulting from usage events such as attention to promotional material and/or the playing of multiple works from one or more classes of works (e.g., certain publisher's works) triggering a credit or cash refund event and/or a discount on future playing of one or more of such publisher's works, such as other works provided by such publisher.

User information may include the following types of information for one or more authorized users of the Commerce Appliance:

(1) Name, address, telephone number, social security number or other identifier
(2) Information used to authenticate the user, which may include a user selected password and/or biometric data, such as fingerprints, retinal data, etc.
(3) User public/private key pair
(4) User attribute and/or profiling information.

iv. Removable Memory 2430. This may include any type of removable memory storage device, such as smart cards, floppy disks or DVD disks. If the commerce appliance is designed to play content received on removable memory devices (e.g., a DVD player), that capability may be used for purposes of the CMPS.

Memory 2405 may include a protected database, in which certain control, budget, audit, security, and/or cryptographic information is stored in secure memory, with complete information stored in an encrypted fashion in unsecure memory.

(d) Encryption/Decryption Engine 2431. CMPS 2401 must include a facility for decrypting received information, including content and CMPOs and/or other. CMPS 2401 may also include a facility for encrypting information if such information is to be transmitted outside the secure boundaries of CMPS 2401. This may include exhaust sent to clearinghouses or other external repositories; and content sent across unsecured buses for usage, such as content sent across IEEE 1394 Serial Bus 2432 to a computer central processing arrangement or to a viewing device such as a monitor, wherein a receiving CMPS may be employed to control such content's usage, including, for example, decrypting such content, as appropriate. Encryption/Decryption Engine 2431 may include a Random Number Generator 2433 used for the creation of keys or key pairs that can be used to identify and assure the uniqueness of CMPSs and support the opening of secure communication channels between such secure content control secure encryption/decryption arrangements.

(e) Secure Clock/Calendar 2434. CMPS 2401 may include Secure Clock/Calendar 2434 designed to provide absolute information regarding the date and time of day, information regarding elapsed absolute time, and/or relative timing information used to determine the elapsed time of operations performed by the system. Secure Clock/Calendar 2434 may include Battery Back Up 2435. It may further include Sync Mechanism 2436 for synchronization with outside timing information, used to recover the correct time in the event of a power loss, and/or to check for tampering.

(f) Interface 2437 to blocks used for content rendering and display. This interface is used for controlling rendering and display, based on rules, and for obtaining feedback information, which may be used for budgeting purposes or for providing information to outside servers (e.g., information on which content was actually displayed, which choices the user invoked, etc.) In the case of an MPEG-4 player such as is shown in FIG. 23, this may include control over Commerce Appliance circuitry which handles, for example, buffering, the scene descriptor graph, AVO decode, object descriptors and composite and rendering (e.g., Control Lines 2310, 2311 and 2312).

Feedback Path 2313 from Composite and Render block 2309 may allow CMPS 2302 to determine whether and when content has actually been released to the viewer. For example, Composite and Render block 2309 can issue a start event to CMPS 2302 when an AVO object is released for viewing, and can issue a stop event to CMPS 2302 when the AVO object is no longer being viewed.

Feedback from Composite and Render block 2309 may also be used to detect tampering, by allowing CMPS 2302 to match the identification of the objects actually released for viewing with the identification of the objects authorized for release. Start and end time may also be compared with the expected elapsed time, with a mismatch possibly indicative of the occurrence of an unauthorized event.

In one embodiment, the following protocol may be used for feedback data:

start <id>, T, <instance number><clock time><rendering options>

Sent if elementary stream <id> is reachable in the SD-graph at time T, but not at time T-1.

end <id>, T, <instance number><clock time><rendering options>

T constitutes presentation time, clock time constitutes the wall clock time, including day and date information, and rendering options may include such information as QoS and rate of play (e.g., fast forward).

Sent if elementary stream <id> is reachable in the SD-graph at time T-1 but not at time T. A SD-graph stream is reachable if, during traversal of the SD-graph for display update, the renderer encounters a node that the SD-graph update stream <id> created or modified. This implies that all nodes in the tree need an update history list. This list need not be as large as the number of streams. Further, it can be labeled to indicate if the CMPS will be watching for stream, if not labeled it will not record them. An AV elementary stream is reachable if the stream's content was rendered.

For SD-graph update streams, the object instance number is ignored. For AV streams, the instance number can be used to disambiguate the case where the display shows two or more instances of the same data stream simultaneously. Instance numbers do not have to count up. In this case, they are simply a unique id that allows the CMPS to match a start event with an end event.

In a second embodiment, CMPS 2302 may include some special purpose hardware in combination with general purpose hardware which is also used for other functions of the device. In this embodiment, care must be taken to ensure that commercially trusted CMPS functions are performed in a secure and tamper-resistant manner, despite the use of general purpose hardware. Each of the elements recited above may include dedicated CMPS functions and general purpose device functions:

(a) CPU/microcontroller. This may include one or more devices. If more than one device is included (e.g., a CPU and a DSP, a math coprocessor or a commerce coprocessor), these devices may be included within the same package, which may be rendered tamper-resistant, or the devices may communicate on a secure bus. The CPU may include two modes: a secure CMPS mode, and an unsecure general purpose mode. The secure CMPS mode may allow addressing of secure memory locations unavailable to the processor in general purpose mode. This may be accomplished, for example, by circuitry which remaps some of the available memory space, so that, in unsecure mode, the CPU cannot address secure memory locations.

(b) External communications ports. If the device, for example, a Commerce Appliance, is capable of receiving content or other information through a communications port (e.g., a cable connection, an Internet connection), this communications port can be used for CMPS purposes. In such a case, CMPS accesses to the external communications port is preferably designed to avoid or minimize interference with the use of such port for receipt of content.

(c) Memory. In some applications and embodiments, it is possible to operate a Commerce Appliance without NVRAM, wherein information that may be needed for CMPS operation that would employ NVRAM would be loaded into RAM, as required. ROM, RAM and NVRAM may be shared between CMPS uses and general uses. This can be accomplished in any of the following ways, or in a combination of these ways: (1) Some memory space may be rendered off-limits to general purpose uses, for example by remapping; (2) the entirety of the memory may be rendered secure, so that even portions of the memory being used for non-secure purposes cannot be observed or changed except in a secure and authorized manner; (3) CMPS information may be stored in an encrypted fashion, though this requires at least some RAM to be secure, since the CMPS will require direct access to unencrypted information stored in RAM.

(d) Encryption/decryption engine. Encryption and decryption functions, including key generation, may be handled by special purpose software running on a general purpose processor arrangement, particularly, for example, a floating point processor or DSP arrangement. That processor arrangement may also be used for purposes of decompressing and displaying content and/or for handling watermarking/fingerprinting insertion and/ or reading. Alternatively, the device may include native encryption and decryption functions. For example, various emerging standards may require at least some degree of encryption and decryption of content designed to be passed across unsecure buses within and among devices such as DVD players, such as the "five company proposal" and other IEEE 1394 related initiatives. Circuitry designed to perform such encryption and decryption may also be usable for CMPS applications.

(e) Secure clock/calendar. The underlying device may already require at least some clock information. MPEG-4, for example, requires the use of clock information for synchronization of Elementary Streams. A secure CMPS clock can also be used for such purposes.

In a third embodiment, CMPS 2302 can be primarily software designed to run on a general purpose device which may include certain minimal security-related features. In such a case, CMPS 2302 may be received in the same channel as the content, or in a side-band channel. An I-CMPO and/or other CI may specify a particular type of CMPS, which Commerce Appliance 2301 must either have or acquire (e.g., download from a location specified by the I-CMPO), or CMPS 2302 may be included, for example, with an I-CMPO.

A software CMPS runs on the CPU of the Commerce Appliance. This approach may be inherently less secure than the use of dedicated hardware. If the Commerce Appliance includes secure hardware, the software CMPS may constitute a downloadable OS and/or BIOS which customizes the hardware for a particular type of commerce application.

In one embodiment, a software CMPS may make use of one or more software tamper resistance means that can materially "harden" software. These means include software obfuscation techniques that use algorithmic means to make it very difficult to reverse engineer some or all of a CMPS, and further make it difficult to generalize from a reverse engineering of a given one or more CMPS. Such obfuscation is preferably independent of source code and object code can be different for different CMPSs and different platforms, adding further complexity and separation of roles. Such obfuscation can be employed "independently" to both CI, such as an CMPO, as well as to some or all of the CMPS itself, thus obscuring both the processing environment and executable code for a process. The approach is also applicable for integrated software and hardware implementation CMPS implementations described above. Other tamper resistance means can also be employed, including using "hiding places" for storing certain state information in obscure and unexpected locations, such as locations in NV memory used for other purposes, and data hiding techniques such as watermarking/fingerprinting.

Association of CMPS With a Commerce Appliance

A CMPS may be permanently attached to a particular device, or may be partially or fully removable. A removable CMPS may include software which is securely loaded into a Commerce Appliance, and/or removable hardware. A removable CMPS may be personalized to one or more particular users, including user keys, budget information, preferences, etc., thereby allowing different users to use the same Commerce Appliance without commingling budgets and/or other rights, etc.

A CMPS may be designed for operation with certain types of content and/or for operation with certain types of business models. A Commerce Appliance may include more than one type of CMPS. For example, a Commerce Appliance designed to accept and display content pursuant to different standards may include one CMPS for each type of format. In addition, a Commerce Appliance may include a CMPS provided by a particular provider, designed to preferentially display certain types of content and to preferentially bill for such content through a particular channel (e.g., billing to one or more particular credit cards and/or using a particular one or more clearinghouses).

Source of Rules

The CMPS must recognize those rules which are to be applied to particular content. Such rules may be received by the CMPS from a variety of sources, depending on the particular embodiment used:

(a) CMPO. The rules may be included within a CMPO (e.g., CMPO 2303) and/or other CI. The CMPO and/or other CI may be incorporated within a content object or stream (as, e.g., a header on an MPEG-4 ES), and/or may be contained within a dedicated content object or stream encoded and received as per the underlying standard (e.g., an MPEG-4 CMPO ES), and/or may be received outside the normal content stream, in which event it may not be encoded as per the underlying standard (e.g., a CMPS received as an encrypted object through a side-band channel).

(b) CMPS. Rules may be permanently and/or persistently stored within a CMPS, e.g., Rules 2409. A CMPS may include default rules designed to handle certain situations, for example, where no CMPO and/or other necessary CI is received (e.g., content encoded under an earlier version of the standard which did not incorporate CMPOs, including MPEG-4 version 1). Complete rules which are stored within the CMPS may be directly or indirectly invoked by a CMPO and/or other CI. This may occur through the CI identifying particular rules through a pointer, and/or it may occur through the CI identifying itself and the general class of control it requires, with the CMPS then applying particular rules specific to that CMPS.

Rule "primitives" may also be stored within the CMPS (e.g., Control Primitives 2410). The CMPO and/or other CI may invoke these primitives by including a sequence of macro-type commands, each of which triggers a sequence of CMPS primitives.

(c) User. The user may be given the ability to create rules relating to the particular user's preferences. Such rules will generally be allowed to further restrict the use of content, but not to expand the use of content beyond that which would otherwise be allowed. Examples include: (a) rules designed to require that certain types of content (e.g., adult movies) only be accessible after entry of a password and/or only to certain CMPS users (e.g. adults, not children, as, for example, specified by parents and/or a societal body such as a government agency); (b) rules designed to require that only particular users be allowed to invoke operations requiring payment beyond a certain limit and/or aggregate payment over a certain amount.

The user may be allowed to create templates of rules such as described in the aforementioned Ginter '333 patent application (and incorporated herein). In addition, a CMPS arrangement, and/or a particular CMPO and/or other CI, may restrict the rules the user is allowed to specify. For example, a CI may specify that a user can copy a work, but cannot add rules to the work restricting the ability of a recipient to make additional copies (or to be able to view, but only after a payment to the first user). User supplied one or more rules may govern the use of—including privacy restrictions related to—payment, audit, profiling, preference, and/or any other kind of information (e.g., information result as a consequence of the use of a CMPS arrangement, including, for example, use of secured content). Such user supplied one or more rules can be associated with the user and/or one or more Commerce Appliances in a user arrangement, whether or not the information is aggregated according to one or more criteria, and whether or not user and/or appliance identification information is removed during aggregation and/or subsequent reporting, distribution, or any other kind of use.

The ability to allow the user to specify rules allows the CMPS to subsume (and thereby replace) V-chips, since a parent can use content rating information to specify precisely what types of information each viewer will be allowed to watch (e.g., violent content can only be displayed after entry of a certain password and/or other identifier, including, for example, insertion of a removable hardware card (smart or rights card) possessed by a user).

(d) External network source. The rules may be stored on an external server. Rules may be addressed and downloaded by the CMPS if necessary (e.g., either the CMPO and/or other CI and/or the CMPS contains a pointer to certain rules location(s), such as one or more URLs). In addition, content providers and/or clearinghouses may broadcast rules designed for general applicability. For example, a content provider might broadcast a set of rules providing a discount to any user participating in a promotional event (e.g., by providing certain user information). Such rules could be received by all connected devices, could be received by certain devices identified as of interest by the content provider (e.g., all recent viewers of a particular program, as identified by exhaust information provided by the CMPS to a clearinghouse and/or all members having certain identity characteristics such as being members of one or more classes) and/or could be posted in central locations.

Example Embodiment

In one embodiment, a set of MPEG-4 Elementary Streams may make up a work. The Elementary Streams may be encrypted and multiplexed together to form an Aggregate Stream. One or more CMPOs may be present in such stream, or may otherwise be associated with the stream. Options are as follows:

1. Content may be streamed or may be received as static data structures.

2. A Work may be made up of a single stream or data structure, or of many separately addressable streams or data structures, each of which may constitute an Object.

3. If a Work is made up of separately addressable streams or data structures, those streams or data structures may be multiplexed together into an Aggregate Stream, or may be received separately.

4. If streams or data structures are multiplexed together into an Aggregate Stream, the streams or data structures may be encrypted prior to such multiplexing. The Aggregate Stream itself may be encrypted, whether or not the underlying streams or data structures are encrypted. The following possibilities therefore exist: (a) individual streams/data structures are unencrypted (in the clear), the Aggregate Stream is unencrypted; (b) individual streams/data structures are unencrypted prior to multiplexing, the Aggregate Stream is encrypted following multiplexing; (c) individual streams/data structures are encrypted prior to multiplexing, the Aggregate Stream is not encrypted following multiplexing; or (d) individual streams/data structures are encrypted prior to multiplexing, the Aggregate Stream is encrypted following multiplexing.

5. A CMPO may be associated with a channel (CCMPO), a work (MCMPO) or an individual Object (CMPO).

6. A CMPO may be received prior to the controlled data, may be received contemporaneously with the data, or may be received after the data (in which event use of the data must wait until the CMPO has been received).

7. A CMPO may be received as part of an Aggregate Stream or separately.

8. If a CMPO is received as part of the Aggregate Stream, it may be multiplexed together with the individual streams or data structures, or may constitute a separate stream or data structure.

9. If a CMPO is multiplexed within the Aggregate Stream, it may be encrypted or nonencrypted. If encrypted, it may be encrypted prior to multiplexing, and/or encrypted after multiplexing, if the entire Aggregate Stream is encrypted.

10. If a CMPO is received as part of the Aggregate Stream, it may be (a) a part of the stream or data structure which holds the content (e.g., a header); (b) a separate stream or data structure encoded pursuant to the same format as the streams or data structures which hold the content (e.g., an MPEG-4 ES) or (c) a separate stream or data structure encoded under a different format designed for CMPOs.

11. If a CMPO is a part of the stream or data structure which holds the content, it may be (a) a header which is received once and then persistently maintained for control of the content; (b) a header which is received at regular intervals within the stream or data structure; or (c) data distributed throughout the stream or data structure.

Figure 25:
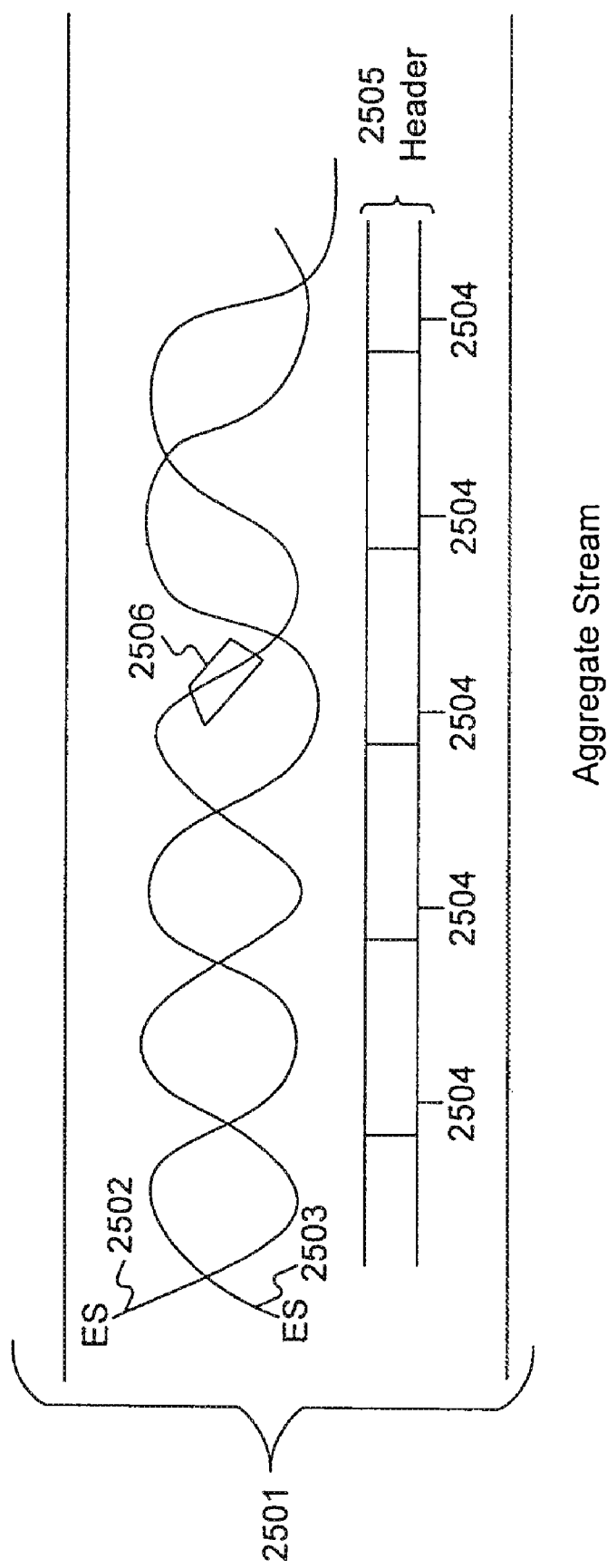
FIG. 25 shows an example of an aggregate stream consistent with the present invention.

These various scenarios give rise to different requirements for demultiplexing and decryption of the CMPOs. FIG. 25 illustrates the following embodiment:

1. Aggregate Stream 2501 is made up of multiplexed ESs (e.g., ES 2502 and 2503). A combination of such ESs makes up a single work. Aggregate Stream 2501 is generated by a cable aggregator and received by a user's set-top box as one of a number of channels.

2. CCMPOs 2504 corresponding to each channel are sent along the cable in Header 2505 at regular intervals (e.g., once per second). When the set-top box is turned on, it polls each channel, and downloads all current CCMPOs. These are stored persistently, and are changed only if a new CCMPO is received which differs from prior CCMPOs.

3. When the user selects a channel, the set-top box addresses the associated CCMPO. The CCMPO may specify, for example, that content in this particular channel may only be accessed by subscribers to the channel. A CMPS within the set-top box accesses a user profile persistently stored in NVRAM and determines that the user is a subscriber. The CMPS deems the CCMPO rule to have been satisfied.

4. The CMPS obtains an identifier for the MCMPO associated with the work (video) currently streaming on the channel and a key for the MCMPO. If works are received serially on the channel (e.g., a television channel in which one work is provided at a time), the received MCMPO identifier may include don't care bits so that it can address any MCMPO currently on the channel.

5. The CMPS begins demuxing of Aggregate Stream 2501 (this may occur in parallel with the preceding step), and obtains the MCMPO, which is encoded into an ES multiplexed within the Aggregate Stream (e.g., MCMPO 2506). Although each ES within Aggregate Stream 2501 has been encrypted, Aggregate Stream 2501 was not encrypted following multiplexing. This allows the CMPS to demultiplex Aggregate Stream 2501 without decrypting the entire Aggregate Stream.

6. The CMPS identifies the ES which constitutes the MCMPO (e.g., ES 2503). The CMPS downloads one complete instance of MCMPO 2506 into an internal buffer, and uses the key received from CCMPO 2504 to decrypt MCMPO 2506.

7. The CMPS determines which rules are applied by MCMPO 2506. MCMPO 2506 might, for example, include a rule stating that the user can view the associated work with advertisements at a low fee, but must pay a higher fee for viewing the work without advertisements.

8. The CMPS generates an options menu, and displays that menu on the screen for the user. The menu specifies the options, including the cost for each option. Additional options may be specified, including payment types.

9. The user uses a remote control pointing device to choose to view the work at a lower cost but with advertisements. The user specifies that payment can be made from an electronic cash budget stored in the CMPS.

10. The CMPS subtracts the specified amount from the budget persistently stored in NVRAM, and generates and encrypts a message to a server associated with the cable. The message transfers the required budget to the server, either by transferring electronic cash, or by authorizing a financial clearinghouse to transfer the amount from the user's account to the cable provider's. This message may be sent immediately, or may be buffered to be sent later (e.g., when the user connects the device to the Internet). This step may be taken in parallel with decryption of the content.)

11. The CMPS obtains from MCMPO 2506 a set of keys used to decrypt the Elementary Streams associated with the work (e.g., ES 2502). The CMPS also obtains identifiers for the specific ESs to be used. Since the user has indicated that advertisements are to be included, the MCMPO identifies ESs associated with the advertisements, and identifies a Scene Descriptor Graph which includes advertisements. A Scene Descriptor Graph which does not include advertisements is not identified, and is not passed through by the CMPS.

12. The CMPS passes the decrypted ESs to the MPEG-4 buffers. The normal process of MPEG-4 decoding, compositing and rendering then takes place. The Composite and Render block outputs Start and Stop events for each object released for viewing. The CMPS monitors this information and compares it to the expected events. In particular, the CMPS confirms that the advertisements have been released for viewing, and that each operation has occupied approximately the expected amount of time.

In another embodiment, a set-top box containing a CMPS (e.g., CMPS 2302 from FIG. 23) may have a cable input (e.g., carrying M4 Bit Streams 2314 and CMPOs 2303). The cable may carry multiple channels, each made up of two sub-channels, with one sub-channel carrying MPEG-4 ESs (e.g., M4 Bit Streams 2314), and the other sub-channel carrying CMPOs (e.g., CMPOs 2303). The sub-channel carrying CMPOs 2303 could be routed directly to CMPS 2302, with the ES channel being routed to a decryption block (operating under control of the CMPS, e.g., CR&D 2315), and then to the MPEG-4 buffers (e.g., buffers associated with Scene Descriptor Graph 2306, AVO Decode 2307 and Object Descriptors 2308). In this case, if the ESs are not encrypted, they proceed unchanged through the decryption block and into the buffers. This may occur, for example, if the ESs are being broadcast for free, with no restrictions, and/or if they are public domain information, and/or they were created prior to inclusion of CMPOs in the MPEG-4 standard.

Such an embodiment might include timing synchronization information in the CMPO sub-channel, so that CMPOs can be synchronized with the associated ESs.

The concept of incorporating two separate streams, one consisting of control information and connected directly to the CMPS, and the other consisting of ESs, may support a high degree of modularization, such that the formats of CMPOs, and particular types of CMPS's, may be changed without alteration to the underlying ES format. For example, it may be possible to change the CMPO format without the necessity for reformatting content ESs. To take another example, it may be possible to upgrade a Commerce Appliance by including a new or different CMPS, without the necessity for any changes to any of the circuitry designed to demultiplex, composite and render the content ESs. A user might obtain a CMPS on a smart card or other removable device, and plug that device into a Commerce Appliance. This could be done to customize a Commerce Appliance for a particular application or for particular content.

CMPS Interface to a CE Device

A CMPS may be designed to present a standardized interface between the general-purpose functionality of a consumer electronics device and any relevant CMPOs and/or other CI and protected content. For example, a CMPS could be designed to accept CI and encrypted ESs, and output decrypted ESs into the devices's buffers. In such a case, the manufacturer of the device would be able to design the device in compliance with the specification (e.g., MPEG-4), without concern about commerce-related extensions to the standard, which extensions might differ from provider to provider. All such extensions would be handled by the CMPS.

Initialization

1. Initialization of the CMPS.

A CMPS may be used to identify the capabilities of the Commerce Appliance in which a CMPS is installed. A CMPS permanently associated with a particular Commerce Appliance may have such information designed-in when the CMPS is initially installed (e.g., stored in ROM 2406 shown in FIG. 24) A CMPS which is removably may be used to run an initialization operation in order to obtain information about the device's capabilities. Such information may be stored in a data structure stored in NVRAM 2425. Alternatively, some or all of such information may be gathered each time the device is turned on, and stored in RAM 2414.

For example, a DVD player may or may not contain a connection to an external server and/or process. A CMPO and/or other CI stored on a DVD (and/or any other format optical disk) inserted into a DVD (or any other format optical disk) player may include rules predicated on the possibility of outputting information to a server (e.g., content is free if user identification information is output), or may require a direct connection in order, for example, to download keys used to decrypt content. In such a case, the CMPS arrangement may determine the hardware functionality which is expected by or required by the CMPO, and compare that to the hardware actually present. If the CMPS determines that the CMPO and/or other CI requires a network connection, and that the DVD player does not include such a connection, the CMPS may take a variety of steps, including: (1) if the network connection is required for some options but not others, causing only those options which are possible to be displayed to the user; (2) informing the user that necessary hardware is missing; or (3) causing a graceful rejection of the disk, including informing the user of the reason for the rejection.

To take another example, a CMPO and/or other CI may include a business model which allows the user to choose among quality levels (or other forms of variations of a given work, for example, longer length and/or quality (e.g., music may be played at low resolution for free, but requires a payment in order to be played at a higher resolution). In such a case, the Commerce Appliance may not include loudspeakers which are capable of outputting sound at the higher resolution. The CMPS arrangement preferably identifies this situation, and either eliminates the higher resolution output as an option for the user, or informs the user that this option costs more but provides no additional benefit given the Commerce Appliance's current functionality or given the Commerce Appliance not being docked in a user arrangement that provides higher quality loudspeakers.

If the Commerce Appliance may be hooked up to external devices (e.g., loudspeakers, display, etc.), the CMPS will require some mechanism for identifying and registering such devices. Each device may be used to make standard ID and capability information available at all times, thereby allowing the CMPS to poll all connected devices at regular intervals, including, for example, authenticating CMPS arrangements within one or more of each such connected devices. Using another approach, all devices could be used to output CMPS identification information upon power-on, with later connected devices being used to output such information upon establishment of the connection. Such identification information may take the form, for example, of authentication information provided under the "five company arrangement", such authentication methods are herein incorporated by reference.

As discussed earlier, a Commerce Appliance may be connected to multiple devices each containing its own CMPS arrangement (e.g., a DVD player may be connected to a digital TV) In such cases, the CMPSs must be able to initiate secure communication (e.g., using a scheme, fro example, like the "five company proposal" for IEEE 1394 serial bus) and determine how the CMPSs will interact with respect to content communication between CMPSs and, in certain embodiments, regarding cooperative governance of such content such as describing in the incorporated Shear patent application. In one embodiment, the first CMPS arrangement to receive content might govern the control process by downloading an initial CMPO and/or other CI, and display one or more of the rules to the user, etc. The second CMPS arrangement might recognize that it has no further role to play, either as a result of a communication between the two CMPS arrangements, or as a result of changes to the content stream created by the first CMPS arrangement (which decrypted the content, and may have allowed demuxing, composition and rendering, etc.)

The relationship between upstream and downstream CMPSs arrangements may be complicated if one device handles certain aspects of MPEG-4 rendering, and the other handles other aspects. For example, a DVD player might handle demuxing and buffering, transferring raw ESs to a digital TV, which then handles composition and rendering, as well as display. In such a case, there might be no back-channel from the composition and rendering block to the upstream CMPS arrangement. CMPS arrangements are preferably designed to handle stand-alone cases (a DVD (or any other optical disk) player with a CMPS arrangement attached to a dumb TV with no CMPS), multiple CMPS arrangement cases in which one CMPS arrangement handles all of the processing (a DVD (or other optical disk) player which handles everything through composition and rendering, with a video stream output to the digital TV (in one non-limiting example, via an IEEE 1349 serial bus) (that output stream would be encrypted as per the "five company proposal" for copy protection using IEEE 1394 serial bus transmission)) and/or shared processing between two or more CMPSs arrangements regarding some, or in certain cases, all, of such processing.

2. Initialization of a Particular Content Stream.

The CMPS may be designed so that it can accept initialization information which initializes the CMPS for a particular content stream or channel. This header, which may be a CMPO and/or other CI, may contain information used by the CMPS to locate and/or interpret a particular content stream as well as CI associated with that stream. This initial header may be received through a sideband channel, or may be received as a CI ES such as a CMPO ES.

Figure 26:
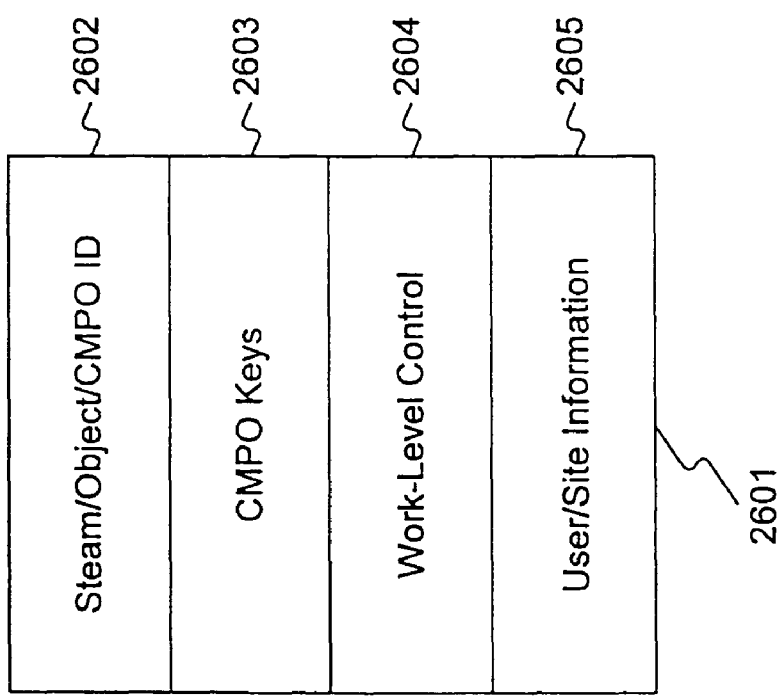
FIG. 26 illustrates a Header CMPO 2601 consistent with the present invention.

In one example, shown in FIG. 26, Header CMPO 2601 may include the following information:

(a) Stream/Object/CMPO ID 2602, which identifies the content streams/objects governed by Header CMPO 2601 and/or identification of CMPOs associated with each such content stream or object.

In one embodiment, Header CMPO 2601 identifies other CMPOs which contain rules and keys associated with particular content streams. In another embodiment, Header CMPO 2601 directly controls all content streams, by incorporating the keys and rules associated with such streams. In the latter case, no other CMPOs may be used.

In one embodiment, Header CMPO 2601 may be one or more CMPOs, CCMPOs, MCMPOs, and/or other CI.

(b) One or CMPO Keys 2603 for decrypting each identified CMPO.

(c) Work-Level Control 2604, consisting of basic control information associated with the work as a whole, and therefore potentially applicable to all of the content streams which make up the work. This basic control information may include rules governing the work as a whole, including options to be presented to the user.

(d) In one embodiment of this embodiment, a header CMPO may be updateable to contain User/Site Information 2605 regarding a particular user or site currently authorized to use certain content, as well as one or more rule sets under which the user has gained such authorization. A header CMPO associated with a work currently being viewed may be stored in RAM or NVRAM. This may include updated information. In one embodiment, the CMPO may also store header CMPOs for certain works viewed in the past. In one embodiment, header CMPOs may be stored in non-secure memory, with information sufficient to identify and authenticate that each header CMPO had not been changed.

In one such header CMPO embodiment of this embodiment, the header CMPO operates as follows:

(a) The header CMPO is received by a CMPS arrangement. In the case of previously unreceived content which has now become available, the header CMPO may be received at an input port. In the case of content which is already available, but is not currently being used (e.g., a set-top box with 500 channels, of which either 0 or 1 are being displayed at any given time), CCMPOs for each channel may be buffered by the CMPS arrangement for possible use if the user invokes particular content (e.g., switches to a particular channel).

In either case, the header CMPO must include information which allows a CMPS arrangement to identify it as a header CMPO.

(b) The CMPS arrangement obtains business-model information held in the clear in the header CMPO. Business-model information may include, for example, a statement that content can be viewed for free if advertisements are included, or if the user authorizes Nielson-type information, user and/or audience measurement information, for example, content may be output to a server or otherwise copied once, but only at a price.

(c) The CMPS arrangement either accepts the business model, if the user has authorized it to accept certain types of models (e.g., the user has programmed the CMPS arrangement to always accept play with advertisements for free), rejects the business model, if the user has instructed that the particular model always be rejected, or displays the business model to the user (e.g., by presenting options on the screen).

(d) If a business model has been accepted, the CMPS arrangement then decrypts the remainder of the header CMPO. If the Commerce Appliance contains a live output connection to an external server (e.g., Internet connection, back-channel on a set-top box, etc.), and if latency problems are handled, decryption of these keys can be handled by communicating with the external server, each side authenticating the other, establishment of a secure channel, and receipt of a key from the server. If the Commerce Appliance is not at least occasionally connected to an external server, decryption may have to be based on one or more keys securely stored in the Commerce Appliance.

(e) Once a header CMPO has been decrypted, the CMPS arrangement acquires information used to identify and locate the streams containing the content, and keys which are used to decrypt either the CMPOs associated with the content, or to directly decrypt the content itself.

(f) In one embodiment of this header embodiment, the header CMPO may contain a data structure for the storage of information added by the CMPS arrangement. Such information may include the following:

(1) Identification of user and/or Commerce Appliance and/or CMPS arrangement. In this embodiment, such information may be stored in a header CMPO in order to provide an audit trail in the event the work (including the header CMPO) is transferred (this only works if the header CMPO is transferred in a writable form). Such information may be used to allow a user to transfer the work to other Commerce Appliances owned by the user without the payment of additional cost, if such transfers are allowed by rule information associated with the header CMPO. For example, a user may have a subscription to a particular cable service, paid for in advance by the user. When a CMPS arrangement downloads a header CMPO from that cable service, the CMPS arrangement may store the user's identification in the header CMPO. The CMPS arrangement may then require that the updated header CMPO be included if the content is copied or transferred. The header CMPO could include a rule stating that, once the user information has been filled in, the associated content can only be viewed by that user, and/or by Commerce Appliances associated with that user. This would allow the user to make multiple copies of the work, and to display the work on multiple Commerce Appliances, but those copies could not be displayed or used by non-authorized users and/or on non-authorized Commerce Appliances. The header CMPO might also include a rule stating that the user information can only be changed by an authorized user (e.g., if user 1 transfers the work to user 2, user 2's CMPS arrangement can update the user information in the header CMPO, thereby allowing user 2 to view the work, but only if user 2 is also a subscriber to the cable channel).

(2) Identification of particular rules options governing use. Rule sets included in header CMPOs may include options. In certain cases, exercise of a particular option might preclude later exercise of a different option. For example, a user might be given the choice to view an unchanged work for one price, or to change a work and view the changed work for a higher price. Once the user decides to change the work and view the changed work, this choice is preferably stored in the header CMPO, since the option of viewing the original unchanged work at the lower price is no longer available. The user might have further acquired the right, or may now be presented with the option for the right, to further distribute the changed work at a markup in cost resulting in third party derived revenue and usage information flowing to both the user and the original work stakeholder(s).

(3) Historical usage information. The header CMPO may include information relating to the number and types of usages. For example, if the underlying work is copied, the header CMPO may be updated to reflect the fact that a copy has been made, since a rule associated with the work might allow only a single copy (e.g., for backup and/or timeshifting purposes). To take another example, a user might obtain the right to view a work one time, or for a certain number of times. The header CMPO would then be updated to reflect each such use.

Usage information may be used to determine if additional uses are authorized by rules associated with the header CMPO. Such information may also be used for audit purposes. Such information may also be provided as usage information exhaust, reported to an external server. For example, a rule may specify that a work may be viewed for free, but only if historical usage information is downloaded to a server.

Content Management Protection Objects (CMPO)

The Content Management and Protection Object ("CMPO") is a data structure which includes information used by the CMPS to govern use of certain content. A CMPO may be formatted as a data structure specified by a particular standard (e.g., an MPEG-4 ES), or may be formatted as a data structure not defined by the standard. If the CMPO is formatted as a data structure specified by the standard, it may be received in the channel utilized by the standard (e.g., as part of a composite MPEG-4 stream) or may be received through some other, side-band method. If the CMPO is formatted as a data structure not specified by the relevant standard, it is provided and decoded using some side-band method, which may include receipt through the same port as formatted content and/or may include receipt through a separate port.

Content may be controlled at virtually any level of granularity. Three exemplary levels will be discussed herein: "channel," "work," and "object."

A "channel" represents an aggregation of works. The works may be available for selection by the user (e.g., a web site, or a video library) or may be received serially (e.g., a cable television channel).

A "work" represents a single audio-visual, textual or other work, intended to be consumed (viewed, read, etc.) by a user as an integrated whole. A work may, for example, be a movie, a song, a magazine article, a multimedia product such, for example, as sophisticated videogame. A work may incorporate other works, as, for example, in a multimedia work which incorporates songs, video, text, etc. In such a case, rights may be associated An "object" represents a separately addressable portion of a work. An object may be, for example, an individual MPEG-4 AVO, a scene descriptor graph, an object descriptor, the soundtrack for a movie, a weapon in a videogame, or any other logically definable portion.

Content may be controlled at any of these levels (as well as intermediate levels not discussed herein). The preferred embodiment mechanism for such control is a CMPO or CMPO arrangement (which comprises one or more CMPOs, and if plural, then plural, cooperating CMPOs). CMPOs and CMPO arrangements may be organized hierarchically, with a Channel CMPO arrangement imposing rules applicable to all contained works, a MCMPO or an SGCMPO imposing rules applicable to all objects within a work, and a CMPO arrangement imposing rules applicable to a particular object.

Figure 27:
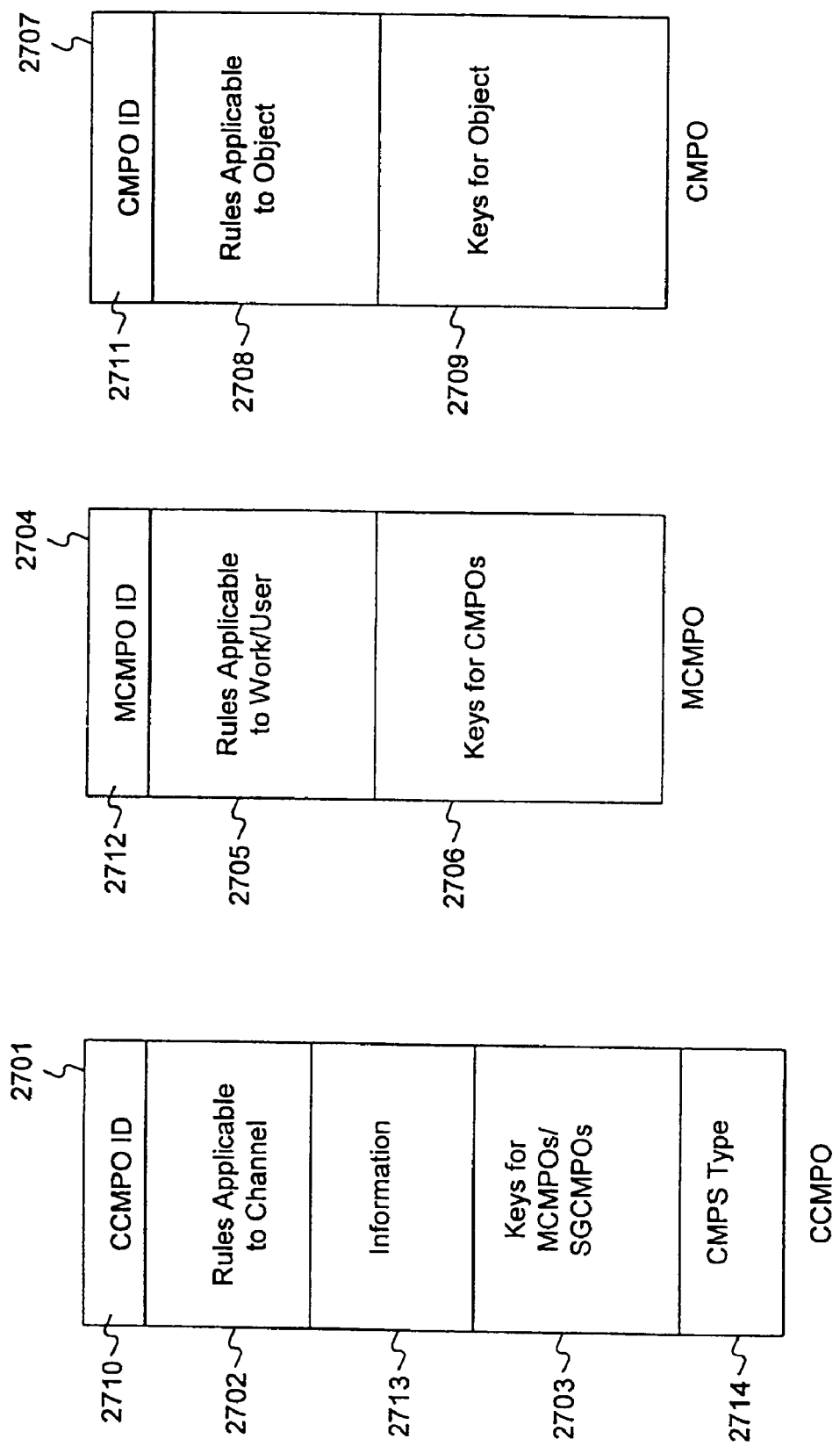
FIG. 27 shows exemplary Content Management Protection Objects consistent with the principles of the present invention.

In one embodiment, illustrated in FIG. 27, a CMPS may download CCMPO 2701. CCMPO 2701 may include one or more Rules 2702 applicable to all content in the channel, as well as one or more Keys 2703 used for decryption of one or more MCMPOs and/or SGCMPOs. MCMPO 2704 may include Rules 2705 applicable to a single work and/or works, one or more classes and/or more users and/or user classes, and may also include Keys 2706 used to decrypt CMPOs. CMPO 2707 may include Rules 2708 applicable to an individual object, as well as Key 2709 used to decrypt the object.

As long as all objects are subject to control at some level, there is no requirement that each object be individually controlled. For example, CCMPO 2701 could specify a single rule for viewing content contained in its channel (e.g., content can only be viewed by a subscriber, who is then might be free to redistribute the content with no further obligation to the content provider). In such a case, rules would not necessarily be used for MCMPOs (e.g. Rules 2705), SGCMPOs, or CMPOs (e.g., Rules 2708). In one embodiment, MCMPOs, SGCMPOs, and CMPOs could be dispensed with, and CCMPO 2701 could include all keys used to decrypt all content, or could specify a location where such keys could be located. In another embodiment, CCMPO 2701 would supply Key 2703 used to decrypt MCMPO 2704. MCMPO 2704 might include keys used to decrypt CMPOs (e.g., Keys 2706), but might include no additional Rules 2705. CMPO 2707 might include Key 2709 used to decrypt an object, but might include no additional Rules 2708. In certain embodiments, there may be no SGCMPOs.

A CMPO may be contained within a content data structure specified by a relevant standard (e.g., the CMPO may be part of a header in an MPEG-4 ES.) A CMPO may be contained within its own, dedicated data structure specified by a relevant standard (e.g., a CMPO ES). A CMPO may be contained within a data structure not specified by any content standard (e.g., a CMPO contained within a DigiBox).

A CCMPO may include the following elements:

(a) ID 2710. This may take the following form: <channel ID><CMPO type><CMPO ID><version number>. In the case of hierarchical CMPO organization (e.g., CCMPOs controlling MCMPOs controlling CMPOs), CMPO ID 2711 can include one field for each level of the hierarchy, thereby allowing CMPO ID 2711 to specify the location of any particular CMPO in the organization. ID 2710 for a CCMPO may, for example, be 123-000-000. ID 2712 for a MCMPO of a work within that channel may, for example, be 123-456-000, thereby allowing the specification of 1,000 MCMPOs as controlled by the CCMPO identified as "123." CMPO ID 2711 for a CMPO associated with an object within the particular work may, for example, be 123-456-789, thereby allowing the specification of 1,000 CMPOs as associated with each MCMPO.

This method of specifying CMPO IDs thereby conveys the exact location of any CMPO within a hierarchy of CMPOs. For cases in which higher levels of the hierarchy do not exist (e.g., a MCMPO with no associated CCMPO), the digits associated with that level of the hierarchy may be specified as zeroes.

(b) Rules 2702 applicable to all content in the channel. These may be self-contained rules, or may be pointers to rules obtainable elsewhere. Rules are optional at this level.

(c) Information 2713 designed for display in the event the user is unable to comply with the rules (e.g., an advertisement screen informing the user that a subscription is available at a certain cost, and including a list of content available on the channel).

(d) Keys 2703 for the decryption of each MCMPO controlled by this CCMPO. In one embodiment, the CCMPO includes one or more keys which decrypt all MCMPOs. In an alternate embodiment, the CCMPO includes one or more specific keys for each MCMPO.

(e) A specification of a CMPS Type (2714), or of hardware/software necessary or desirable to use the content associated with this channel.

The contents of a MCMPO may be similar to those of a CCMPO, except that the MCMPO may include rules applicable to a single work, and may identify CMPOs associated with each object.

The contents of each CMPO may be similar to those of the MCMPO, except that the CMPO may include rules and keys applicable to a single object.

The contents of an SGCMPO may be similar to those of the CCMPO, except that the MCMPO may include rules applicable to only certain one or more classes of rights, certain one or more classes of works, and/or to one or more certain classes of users and/or user arrangements (e.g. CMPO arrangements and/or their devices).

Figure 28:
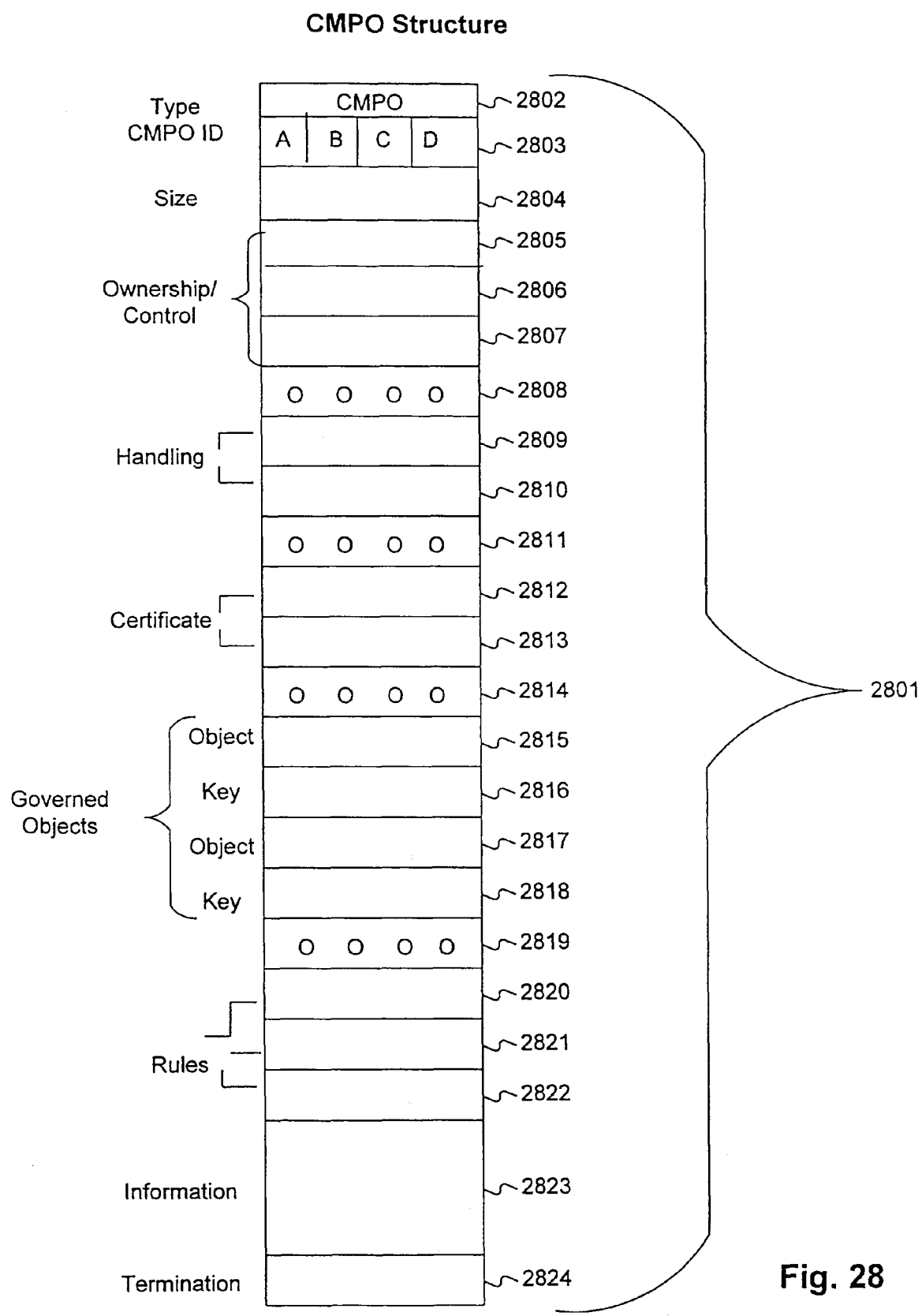
FIG. 28 shows an example of a CMPO Data Structure 2801 consistent with the present invention.

In another embodiment, shown in FIG. 28, CMPO Data Structure 2801 may be defined as follows:

CMPO Data Structure 2801 is made up of elements. Each element includes a self-contained item of information. The CMPS parses CMPO Data Structure, one element at a time.

Type Element 2802 identifies the data structure as a CMPO, thereby allowing the CMPS to distinguish it from a content ES. In an exemplary embodiment, this element may include 4 bits, each of which may be set to "1" to indicate that the data structure is a CMPO.

The second element is CMPO Identifier 2803, which is used to identify this particular CMPO and to convey whether the CMPO is part of a hierarchical organization of CMPOs and, if so, where this CMPO fits into that organization.

CMPO Identifier 2803 is divided into four sub-elements, each of three bits. These are shown as sub-elements A, B, C and D. The first sub-element (2803 A) identifies the CMPO type, and indicates whether the CMPO is governed or controlled by any other CMPO:

100: this is a top-level CMPO (associated with a channel or an aggregation of works) and is not controlled by any other CMPO.

010: this is a mid-level CMPO (associated with a particular work) and is not controlled by any other CMPO.

110: this is a mid-level CMPO, and is controlled by a top-level CMPO.

001: this is a low-level CMPO (associated with an object within a work) and is not controlled by any other CMPO. This case will be rare, since a low-level CMPO will ordinarily be controlled by at least one higher-level CMPO.

011: this is a low-level CMPO, and is controlled by a mid-level CMPO, but not by a top-level CMPO.

111: this is a low-level CMPO, and is controlled by a top-level CMPO and by a mid-level CMPO.

The second sub-element of CMPO ID 2803 (sub-element B) identifies a top-level CMPO. In the case of a top-level CMPO, this identifier is assigned by the creator of the CMPO.

In the case of a mid-level or low-level CMPO which is controlled by a top-level CMPO, this sub-element contains the identification of the top-level CMPO which performs such control. In the case of a mid-level or low-level CMPO which is not controlled by a top-level CMPO, this sub-element contains zeroes.

The third sub-element of CMPO ID 2803 (sub-element C) identifies a mid-level CMPO. In the case of a top-level CMPO, this sub-element contains zeroes. In the case of a mid-level CMPO, this sub-element contains the identification of the particular CMPO. In the case of a low-level CMPO which is controlled by a mid-level CMPO, this sub-element contains the identification of the mid-level CMPO which performs such control. In the case of a low-level CMPO which is not controlled by a mid-level CMPO, this sub-element contains zeroes.

The fourth sub-element of CMPO ID 2803 (sub-element D) identifies a low-level CMPO. In the case of a top-level or mid-level CMPO, this sub-element contains zeroes. In the case of a low-level CMPO, this sub-element contains the identification of the particular CMPO.

Following the identifier element is Size Element 2804 indicating the size of the CMPO data structure. This element contains the number of elements (or bytes) to the final element in the data structure. This element may be rewritten if alterations are made to the CMPO. The CMPS may use this size information to determine whether the element has been altered without permission, since such an alteration might result in a different size. For such purposes, the CMPS may store the information contained in this element in a protected database. This information can also be used to establish that the entire CMPO has been received and is available, prior to any attempt to proceed with processing.

Following Size Element 2804 are one or more Ownership/Control Elements containing ownership and chain of control information (e.g., Ownership/Control Elements 2805, 2806 and 2807). In the first such element (2805), the creator of the CMPO may include a specific identifier associated with that creator. Additional participants may also be identified in following elements (e.g., 2806, 2807). For example, Element 2805 could identify the creator of the CMPO, Element 2806 could identify the publisher of the associated work and Element 2807 could identify the author of the work.

A specific End Element 2808 sequence (e.g., 0000) indicates the end of the chain of ownership elements. If this sequence is encountered in the first element, this indicates that no chain of ownership information is present.

Chain of ownership information can be added, if rules associated with CMPO 2801 permit such additions. If, for example, a user purchases the work associated with CMPO 2801, the user's identification may be added as a new element in the chain of ownership elements (e.g., a new element following 2807, but before 2808). This may be done at the point of purchase, or may be accomplished by the CMPS once CMPO 2801 is encountered and the CMPS determines that the user has purchased the associated work. In such a case, the CMPS may obtain the user identifier from a data structure stored by the CMPS in NVRAM.

Following the ownership element chain are one or more Handling Elements (e.g., 2809, 2810) indicating chain of handling. These elements may contain the identification of any CMPS which has downloaded and decoded CMPO 2801, and/or may contain the identification of any user associated with any such CMPS. Such information may be used for audit purposes, to allow a trail of handling in the event a work is determined to have been circulated improperly. Such information may also be reported as exhaust to a clearinghouse or central server. Chain of handling information preferably remains persistent until reported. If the number of elements required for such information exceeds a specified amount (e.g., twenty separate user identifiers), a CMPS may refuse to allow any further processing of CMPO 2801 or the associated work until the CMPS has been connected to an external server and has reported the chain of handling information.

The last element in the chain of handling elements (e.g., 2811) indicates the end of this group of elements. The contents of this element may, for example, be all zeroes.

Following the chain of handling elements may be one or more Certificate Elements (e.g., 2812, 2813) containing or pointing to a digital certificate associated with this CMPO. Such a digital certificate may be used by the CMPS to authenticate the CMPO. The final element in the digital certificate chain is all zeroes (2814). If no digital certificate is present, a single element of all zeroes exists in this location.

Following the Certificate Elements may be a set of Governed Object Elements (e.g., 2815, 2816, 2817, 2818) specifying one or more content objects and/or CMPOs which may be governed by or associated with CMPO 2801. Each such governed object or CMPO is identified by a specific identifier and/or by a location where such object or CMPO may be found (e.g., these may be stored in locations 2815 and 2817). Following each such identifier may be one or more keys used to decrypt such CMPO or object (e.g., stored in locations 2816 and 2818). The set of identifiers/keys ends with a termination element made up of all zeroes (2819).

Following the set of elements specifying identifiers and/or keys may be a set of Rules Elements (e.g., 2820, 2821, 2822) specifying rules/controls and conditions associated with use of the content objects and/or CMPOs identified in the Governed Objects chain (e.g., locations 2815 and 2817). Exemplary rules are described below. Elements may contain explicit rules or may contain pointers to rules stored elsewhere. Conditions may include particular hardware resources necessary to use associated content objects or to satisfy certain rules, or particular types of CMPS's which are necessary or preferred for use of the associated content objects.

Following the rules/controls and conditions elements may be a set of Information Elements 2823 containing information specified by the creator of the CMPO. Among other contents, such information may include content, or pointers to content, programming, or pointers to programming.

The CMPO ends with Final Termination Element 2824.

In one embodiment, the rules contained in Rules Elements 2820-2822 of CMPO 2801 may include, for example, the following operations:

(1) Play. This operation allows the user to play the content (though not to copy it) without restriction.

(2) Navigate. This allows the user to perform certain types of navigation functions, including fast forward/rewind, stop and search. Search may be indexed or unindexed.

(3) Copy. Copy may be allowed once (e.g., time-shifting, archiving), may be allowed for a specified number of times and/or may be allowed for limited period of time, or may be allowed for an unlimited period of time, so long as other rules, including relevant budgets, are not violated or exceeded. A CMPS arrangement may be designed so that a Copy operation may cause an update to an associated CMPO (e.g., including an indication that the associated content has been copied, identifying the date of copying and the site responsible for making the copy), without causing any change to any applicable content object, and in particular without requiring that associated content objects be demuxed, decrypted or decompressed. In the case of MPEG-4, for example, this may require the following multi-stage demux process:

(i) the CMPS arrangement receives a Copy instruction from the user, or from a header CMPO.

(ii) CMPO ESs associated with the MPEG-4 stream which is to be copied are separated from the content stream in a first demux stage.

(iii) CMPOs are decrypted and updated by the CMPS arrangement. The CMPOs are then remuxed with the content ESs (which have never been demuxed from each other), and the entire stream is routed to the output port without further alteration.

This process allows a copy operation to take place without requiring that the content streams be demuxed and decrypted. It requires that the CMPS arrangement include two outputs: one output connected to the digital output port (e.g., FIG. 23 line 2316, connecting to Digital Output Port 2317), and one output connected to the MPEG-4 buffers (e.g., FIG. 23, lines 2310, 2311, 2312), with a switch designed to send content to one output or the other (or to both, if content is to be viewed and copied simultaneously) (e.g., Switch 2319). Switch 2319 can be the only path to Digital Output Port 2317, thereby allowing CMPS 2302 to exercise direct control over that port, and to ensure that content is never sent to that port unless authorized by a control. If Digital Output Port 2317 is also the connector to a digital display device, CMPS 2302 will also have to authorize content to be sent to that port even if no copy operation has been authorized.

In one example embodiment, the receiving device receiving the information through Digital Output Port 2317 may have to authenticate with the sending device (e.g., CMPS 2302). Authentication may be for any characteristic of the device and/or one or more CMPSs used in conjunction with that device. Thus, for example, a sending appliance may not transmit content to a storage device lacking a compatible CMPS.

In another non-limiting example, CMPS 2302 can incorporate session encryption functionality (e.g., the "five company arrangement") which establishes a secure channel from a sending interface to one or more external device interfaces (e.g., a digital monitor), and provided that the receiving interface has authenticated with the sending interface, encrypts the content so that it can only be decrypted by one or more authenticated 1394 device interfaces. In that case, CMPS 2302 would check for a suitable IEEE 1394 serial bus interface, and would allow content to flow to Digital Output Port 2317 only if (a) an authorized Play operation has been invoked, a secure channel has been established with the device and the content has been session-encrypted, or (b) an authorized Copy or Retransmit operation has been invoked, and the content has been treated as per the above description (i.e., the CMPO has been demuxed, changed and remuxed, the content has never been decrypted or demuxed).

This is only possible if CMPOs are separately identifiable at an early demux stage, which most likely requires that they be stored in separate CMPO ESs. If the CMPOs are stored as headers in content ESs, it may be impossible to identify the CMPOs prior to a full demux and decrypt operation on the entirety of the stream.

(4) Change. The user may be authorized to change the content.

(5) Delete. This command allows the user to delete content which is stored in the memory of the Consumer Appliance. This operation operates on the entire work. If the user wishes to delete a portion of a work, the Change operation must be used.

(6) Transfer. A user may be authorized to transfer a work to a third party. This differs from the Copy operation in that the user does not retain the content or any rights to the content. The Transfer operation may be carried out by combining a Copy operation and a Delete operation. Transfer may require alteration of the header CMPO associated with the work (e.g., adding or altering an Ownership/Control Element, such as Elements 2805-2807 of FIG. 28), so as to associate rights to the work with the third party.

These basic operations may be subject to modifications, which may include:

i. Payment. Operations may be conditioned on some type of user payment. Payment can take the form of cash payment to a provider (e.g., credit card, subtraction from a budget), or sending specified information to an external site (e.g., Nielson-type information).

ii. Quality of Service. Operations may specify particular quality of service parameters (e.g., by specifying a requested QoS in MPEG-4), including: requested level of decompression, requested/required types of display, rendering devices (e.g., higher quality loudspeakers, a particular type of game controller).

iii. Time. Operations may be conditioned such that the operation is only allowed after a particular time, or such that the price for the operation is tied to the time (e.g., real-time information at a price, delayed information at a lower price or free, e.g., allowing controlled copies but only after a particular date).

iv. Display of particular types of content. Operations may be conditioned on the user authorizing display of certain content (e.g., the play operation may be free if the user agrees to allow advertisements to be displayed).

In all of these cases, a rule may be modified by one or more other rules. A rule may specify that it can be modified by other rules or may specify that it is unmodifiable. If a rule is modifiable, it may be modified by rules sent from other sources. Those rules may be received separately by the user or may be aggregated and received together by the user.

Data types which may be used in an exemplary MPEG-4 embodiment may include the following:

a. CMP Data Stream.

The CMP-ds is a new elementary stream type that has all of the properties of an elementary stream including its own CMPO and a reference in the object descriptors. Each CMP-ds stream has a series of one or more CMP Messages. A CMP_Message has four parts:

1. Count: [1 . . . n] CMPS types supported by this IP ES. Multiple CMPS systems may be supported, each identified by a unique type. (There may have to be a central registry of types.)

2. CMPS_type_identifiers: [1 . . . n] identifiers, each with an offset in the stream and a length. The offset points to the byte in the CMPO where the data for that CMPS type is found. The length is the length in bytes of this data.

3. Data segments: One segment for each of the n CMPS types encoded in a format that is proprietary to the CMPS supplier.

4. CMP_Message_URL: That references another CMP_Message. (This is in keeping with the standard of using URLs to point to streams.)

b. CMPO.

The CMPO is a data structure used to attach detailed CMP control to individual elementary streams. Each CMPO contains:

1. CMPO_ID: An identifier for the content under control. This identifier must uniquely identify an elementary stream.
2. CMPO_count: [1 ... n] CMPS types supported by this CMPO.
3. CMPS_type_identifiers: [1 ... n] identifiers, each with an offset in the stream and a length. The offset points to the byte in the CMPO where the data for that CMPS type is found. The length is the length in bytes of this data.
4. Data segments: n data segments. Each data segment is in a format that is proprietary to the CMPS supplier.
5. CMPO_URL: An optional URL that references an additional CMPO that adds information to the information in this CMPO. (This is a way of dynamically adding support for new CMPSs.)

c. Feedback Event

The feedback events come in two forms: start and end. Each feedback event contains three pieces of information:
1. Elementary_stream_ID
2. Time: in presentation time
3. Object_instance_number User Interface.

Commerce Appliance 2301 may include User Interface 2304 designed to convey control-related information to the user and to receive commands and information from the user. This interface may include special purpose displays (e.g., a light which comes on if a current action requires payment), special purpose buttons (e.g., a button which accepts the payment or other terms required for display of content), and/or visual information presented on screen.

Example of Operation in an MPEG-4 Context

1. User selects a particular work or channel. The user may, for example, use a remote control device to tune a digital TV to a particular channel.
2. Selection of the channel is communicated to a CMPS arrangement, which uses the information to either download a CCMPO or to identify a previously downloaded CCMPO (e.g., if the CMPS arrangement is contained in a set-top box, the set-top box may automatically download CCMPOs for every channel potentially reachable by the box).
3. The CMPS arrangement uses the CCMPO to identify rules associated with all content found on the channel. For example, the CCMPO may specify that content may only be viewed by subscribers, and may specify that, if the user is not a subscriber, an advertisement screen should be put up inviting the user to subscribe.
4. Once rules specified by the CCMPO have been satisfied, the CCMPO specifies the location of a MCMPO associated with a particular work which is available on the channel. The channel CMPO may also supply one or more keys used for decryption of the MCMPO.
5. The CMPS arrangement downloads the MCMPO. In the case of an MPEG-4 embodiment, the MCMPO may be an Elementary Stream. This Elementary Stream must be identifiable at a relatively early stage in the MPEG-4 decoding process.
6. The CMPS arrangement decrypts the MCMPO, and determines the rules used to access and use the content. The CMPS arrangement presents the user with a set of options, including the ability to view for free with advertisements, or to view for a price without advertisements.
7. The user selects view for free with advertisements, e.g., by highlighting and selecting an option on the screen using a remote control device.
8. The CMPS arrangement acquires one or more keys from the MCMPO and uses those keys to decrypt the ESs associated with the video. The CMPS arrangement identifies two possible scene descriptor graphs, one with and one without advertisements. The CMPS arrangement passes the scene descriptor graph with advertisements through, and blocks the other scene descriptor graph.
9. The CMPS arrangement monitors the composite and render block, and checks to determine that the advertisement AVOs have actually been released for viewing. If the CMPS arrangement determines that those AVOs have not been released for viewing, it puts up an error or warning message, and terminates further decryption.

CMPS Rights Management in Provider and Distribution Chains

In addition to consumer arrangements, in other embodiments one or more CMPSs may be used in creating, capturing, modifying, augmenting, animating, editing, excerpting, extracting, embedding, enhancing, correcting, fingerprinting, watermarking, and/or rendering digital information to associate rules with digital information and to enforce those rules throughout creation, production, distribution, display and/or performance processes.

In one non-limiting example, a CMPS, a non-exhaustive example of which may include a least a secure portion of a VDE node as described in the aforementioned Ginter et al., patent specification, is incorporated in video and digital cameras, audio microphones, recording, playback, editing, and/or noise reduction devices and/or any other digital device. Images, video, and/or audio, or any other relevant digital information may be captured, recorded, and persistently protected using at least one CMPS and/or at least one CMPO. CMPSs may interact with compression/decompression, encryption/decryption, DSP, digital to analog, analog to digital, and communications hardware and/or software components of these devices as well.

In another non-exhaustive example, computer animation, special effects, digital editing, color correcting, noise reduction, and any other applications that create and/or use digital information may protect and/or manage rights associated with digital information using at least one CMPS and/or at least one CMPO.

Another example includes the use of CMPSs and/or CMPOs to manage digital assets in at least one digital library, asset store, film and/or audio libraries, digital vaults, and/or any other digital content storage and management means.

In accordance with the present applications, CMPSs and/or CMPOs may be used to manage rights in conjunction with the public display and/or performance of digital works. In one non-exhaustive example, flat panel screens, displays, monitors, TV projectors, LCD projectors, and/or any other means of displaying digital information, may incorporate at least one hardware and/or software CMPS instance that controls the use of digital works. A CMPS may allow use only in conjunction with one or more digital credentials, one example of which is a digital certificate, that warrant that use of the digital information will occur in a setting, location, and/or other context for public display and/or performance. Non-limiting examples of said contexts include theaters, bars, clubs, electronic billboards, electronic displays in public areas, or TVs in airplanes, ships, trains and/or other public conveyances. These credentials may be issued by trusted third parties such as certifying authorities, non-exhaustive examples of which are disclosed in the aforementioned Ginter '712 patent application.

Additional MPEG-4 Embodiment Information

This work is based on the MPEG-4 description in the version 1 Systems Committee Draft (CD), currently the most complete description of the evolving MPEG-4 standard.

This section presents the structural modifications to the MPEG-4 player architecture and discusses the data lines and the concomitant functional changes. FIG. 23 shows the functional components of the original MPEG-4 player. Content arrives at Player 2301 packaged into a serial stream (e.g., MPEG-4 Bit Stream 2314). It is demultiplexed via a sequence of three demultiplexing stages (e.g., Demux 2305) into elementary streams. There are three principle types of elementary streams: AV Objects (AVO), Scene Descriptor Graph (SDG), and Object Descriptor (OD). These streams are fed into respective processing elements (e.g., AVO Decode 2307, Scene Descriptor Graph 2306, Object Descriptors 2308). The AVOs are the multimedia content streams such as audio, video, synthetic graphics and so on. They are processed by the player's compression/coding subsystems. The scene descriptor graph stream is used to build the scene descriptor graph. This tells Composite and Render 2309 how to construct the scene and can be thought of as the "script." The object descriptors contain description information about the AVOs and the SD-graph updates.

To accommodate a CMPS (e.g., CMPS 2302) and to protect content effectively, the player structure must be modified in several ways:

Certain data paths must be rerouted to and from the CMPS

Certain buffers in the SDG, AVO decode and Object descriptor modules must be secured Feedback paths from the user and the composite and render units to the CMPS must be added In order for CMPS 2302 to communicate with the MPEG-4 unit, and for it to effectively manage content we must specify the CMPO structure and association protocols and we must define the communication protocols over the feedback systems (from the compositor and the user.)

The structural modifications to the player are shown in FIG. 23. The principal changes are:

All elementary streams are now routed through CMPS 2302.

Direct communication path between Demux 2305 and CMPS 2302.

A required "Content Release and Decrypt" Module 2315 in CMPS 2302.

The addition of a feedback loop (e.g., Line 2313) from Composite and Render 2309 to CMPS 2302.

Bi-directional user interaction directly with the CMPS 2302, through Line 2316.

Furthermore, for M4v2P, CMP-objects are preferably associated with all elementary streams. Elementary streams that the author chooses not to protect are still marked by an "unprotected content" CMPO. The CMPOs are the primary means of attaching rules information to the content. Content here not only refers to AVOs, but also to the scene descriptor graph. Scene Descriptor Graph may have great value and will thus need to be protected and managed by CMPS 2302.

The direct path from Demux 2305 to CMPS 2302 is used to pass a CMPS specific header, that potentially contains business model information, that communicates business model information at the beginning of user session. This header can be used to initiate user identification and authentication, communicate rules and consequences, and initiate up-front interaction with the rules (selection of quality-of-service (QoS), billing, etc.) The user's communication with CMPS 2302 is conducted through a non-standardized channel (e.g., Line 2316). The CMPS designer may provide an independent API for framing these interactions.

Feedback Path 2313 from Composite and Render block 2309 serves an important purpose. The path is used to cross check that the system actually presented the user with a given scene. Elementary streams that are processed by their respective modules may not necessarily be presented to the user. Furthermore, there are several fraud scenarios wherein an attacker could pay once and view multiple times. The feedback path here allows CMPS 2302 to cross check the rendering and thereby perform a more accurate accounting. This feedback is implemented by forcing the Composite and Render block 2309 to issue a start event that signals the initiation of a given object's rendering that is complemented by a stop event upon termination. The feedback signaling process may be made optional by providing a CMP-notification flag that may be toggled to indicate whether or not CMPS 2302 should be notified. All CMPOs would be required to carry this flag.

The final modification to the structure is to require that the clear text buffers in the AVO, SDG and Object Descriptor processors and in the Composite-and-Render block be secured. This is to prevent a pirate from stealing content in these buffers. As a practical matter, this may be difficult, since tampering with these structures may well destroy synchronization of the streams. However, a higher state of security would come from placing these buffers into a protected processing environment.

CMPS 2302 governs the functioning of Player 2301, consistent with the following:

Communication mechanism between CMPS 2302 and the MPEG-4 player (via CMPOs)

A content release and decryption subsystem

Version authentication subsystem

Sufficient performance so as not to interfere with the stream processing in the MPEG-4 components CMPS 2302 may have a bi-directional side-channel that is external to the MPEG-4 player that may also be used for the exchange of CMP information. Furthermore, the CMPS designer may choose to provide a user interface API that provides the user with the ability to communicate with the content and rights management side of the stream management (e.g., through Line 2316).

Encrypted content is decrypted and released by CMPS 2302 as a function of the rules associated with the protected content and the results of user interaction with CMPS 2302. Unencrypted content is passed through CMPS 2302 and is governed by associated rules and user interaction with CMPS 2302. As a consequence of these rules and user interaction, CMPS 2302 may need to transact with the SDG and AVO coding modules (e.g., 2310, 2311) to change scene structure and/or the QoS grade.

Ultimately, the CMPS designer may choose to have CMPS 2302 generate audit trail information that may be sent to a clearinghouse authority via CMPS Side Channel Port 2318 or as encrypted content that is packaged in the MPEG-4 bit stream.

The MPEG-4 v1 Systems CD uses the term "object" loosely. In this document, "object" is used to specifically mean a data structure that flows from one or more of the data paths in FIG. 23.

Using multiple SD-graph update streams, each with its own CMPO, allows an author to apply arbitrarily specific controls to the SD-graph. For example, each node in the SD-graph can be created or modified by a separate SD-graph update stream. Each of these streams will have a distinct CMPO and ID. Thus, the CMPS can release and decrypt the creation and modification of each node and receive feedback information for each node individually. The practical implications for controlling release and implementing consequences should be comparable to having a CMPO on each node of the SD-graph, without the costs of having a CMPO on each SD-graph node.

Principles consistent with the present invention may be illustrated using the following examples:

In the first example, there is a bilingual video with either an English or French soundtrack. The user can choose during playback to hear either the English or French. The basic presentation costs $1. If the French soundtrack is presented there is a $0.50 surcharge. If the user switches back and forth between French and English, during a single viewing of the presentation, the $0.50 surcharge will occur only once.

In this example, there will be four elementary streams:

The Scene Description Graph Update stream will have a CMPO. The CMPO will imply a $1.00 fee associated with the use of the content. The scene description graph displays the video, English audio and puts up a button that allows the user to switch to French. If the user clicks that button, the English stops, the French picks up from that point and the button changes to a switch-to-English button. (Optionally, there may be a little dialog at the beginning to allow the user to select the initial language. This is all easy to do in the SD graph.)

The Video Stream with the CMPO will say that it can only be released if the scene description graph update stream above is released.

The English Audio Stream will be similar to the Video stream.

The French Audio Stream will be similar to the Video stream but there is a $0.50 charge it if is seen in the feedback channel. (The CMPS must to not count twice if the user switches between the two in a single play of the presentation.)

An important requirement is that the ID for the SD-graph update stream appears in the feedback path (e.g., Feedback Path 2313). This is so CMPS 2302 knows when the presentation stops and ends so that CMPS 2302 can correctly bill for the French audio.

The rules governing the release of the video and audio streams may include some variations. The rules for these streams, for example, may state something like "if you don't see the id for the scene description graph update stream X in the feedback channel, halt release of this stream." If the main presentation is not on the display, then the video should not be. This ties the video to this one presentation. Using the video in some other presentation would require access to the original video, not just this protected version of it.

In a second example, an author wants to have a presentation with a free attract sequence or "trailer". If the user clicks the correct button the system moves into the for-fee presentation, which is organized as a set of "acts".

Multiple SD-graph update streams may update a scene description graph. Multiple SD-graph update streams may be open in parallel. The time stamps on the ALUs in the streams are used to synchronize and coordinate.

The trailer and each act are represented by a separate SD-graph update stream with a separate CMPO. There is likely an additional SD-graph update stream that creates a simple root node that is invisible and silent. This node brings in the other components of the presentation as needed.

Figure 29:
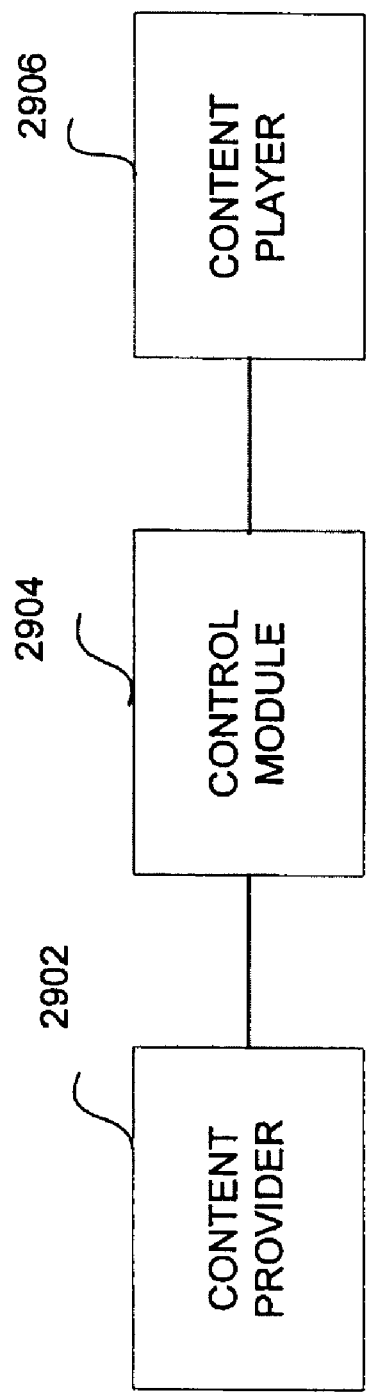
FIG. 29 discloses an illustrative environment for the secure distribution of digital content.

FIG. 29 discloses one exemplary environment for the secure distribution of digital content. As shown in FIG. 29, such an environment includes, for example, a content provider 2902, a control module 2904, and a streamed content appliance or player 2906. Content provider 2902 provides to control module 2904 a digital bit stream that includes content, which is encrypted at least in part, and a secure container including control information designed to control use of the content. The control information includes at least one key suitable for decryption of at least a portion of the content. Control module 2904 is a protected environment that can function within devices such as set-top boxes, PCs, or other devices for content input or storage, and includes the ability to manage and protect content, move content to and from content devices, appliances, and other players, and back up and archive data and other information. One illustrative control module includes a protected processing environment (PPE) as described in the Ginter '333 application. Streamed content player 2906 includes a port configured to accept a digital bit stream from an external source, such as control module 2904. One illustrative player is an existing MP3 player, modified in accordance with the architecture described herein. As discussed in detail below, content player 2906 additionally includes a means for opening secure containers and extracting cryptographic keys, and a means for decrypting encrypted portions of the content.

One exemplary embodiment of an architecture for distributing streamed content within the environment set forth in FIG. 29 includes at least two components: (1) a streamed content file format, described in detail below, for storing and protecting content, and associating protection rules with it; and (2) a secure protocol, also described in detail below, for exchanging security information among content providers, control modules, and players. Such an architecture enables protected interactions to, for example, download content from a control module to a content player; transfer content between players, and upload content from a player to a control module.

Figure 30:
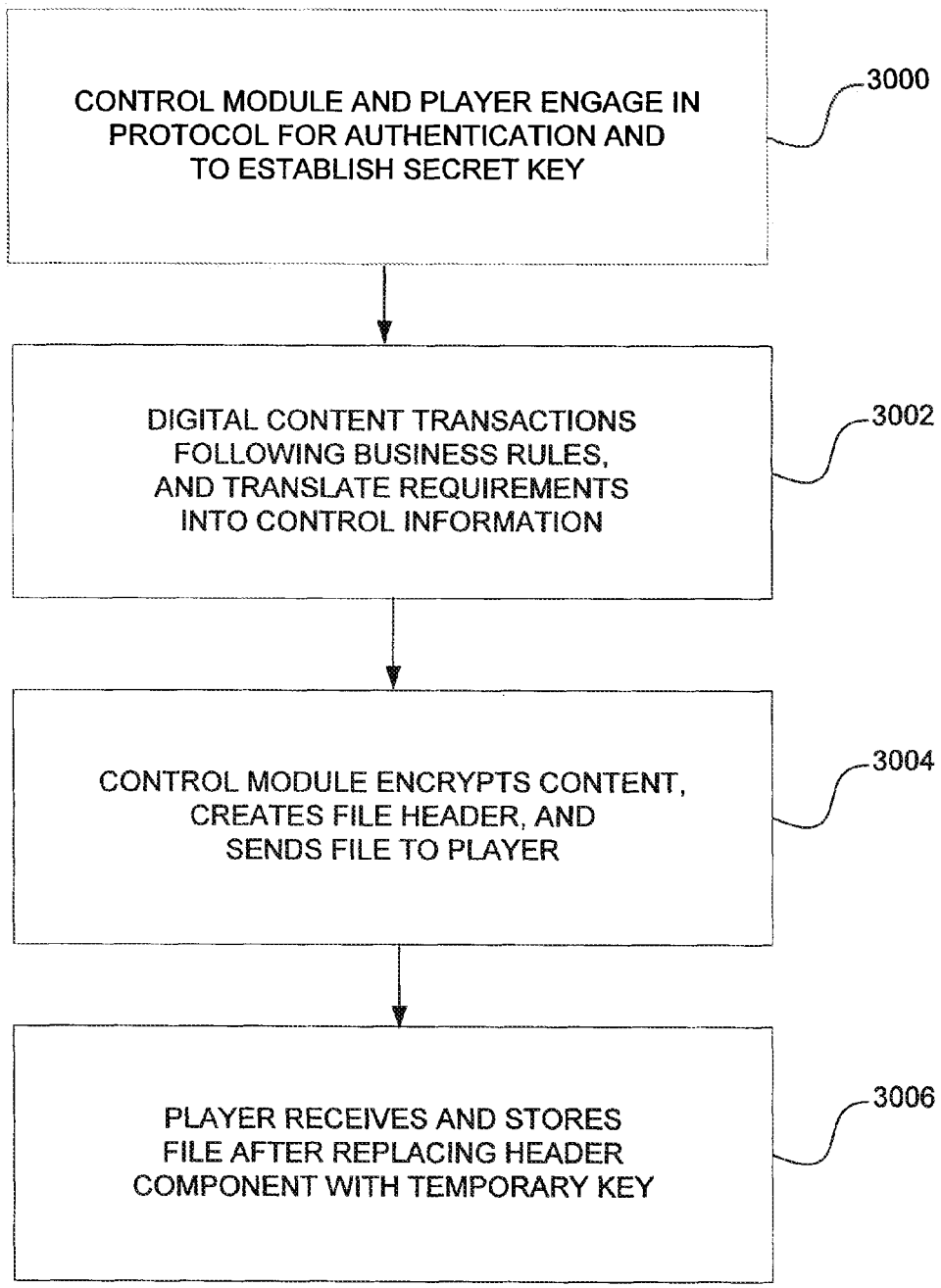
FIG. 30 shows one method for downloading digital or other content from a control module to a content player.

In accordance with the invention, FIG. 30 discloses one illustrative manner for downloading content from control module 2904 to content player 2906 utilizing the disclosed architecture. As shown in FIG. 30, the control module and player first engage in the streamed content protocol to authenticate each other and establish a secret key for content delivery (Step 3000). At Step 3002, control module 3004 performs a transaction to, for example, purchase digital content from content provider 3002 following whatever sophisticated business rules content provider 3002 requires, and then translates the resulting requirements into control information supported in the streamed content file format. The control module then creates a header for the file (protected with a negotiated key), encrypts or otherwise protects the content appropriately, and then sends the resulting file (a combination of a file header and protected content) to player 2906 (Step 3004). At Step 3006, the player receives the file and stores it locally, after replacing the header component that used the negotiated temporary key with an equivalent that uses a secret key known only to the player. This re-keying step is advantageous as it avoids exposure of a player's secret keys outside the player.

Using the architecture described herein, one skilled in the art will understand that transfers between two separate players, for example, will follow a similar path. In this context, however, the header can be modified to update limit counts or expiration times (e.g., to implement a check-in, check-out procedure), and the file can be re-keyed from the source player's internal key, to a negotiated temporary key, to the internal key of the destination player. One skilled in the art will similarly understand that the described architecture and file formats are not limited in their use to particular types of content, particular types of control modules, or particular types of players. For example, although object identifiers are carried within the illustrative file formats described below, the namespace for such identifiers is explicitly identified to accommodate multiple types of control modules. In addition, the disclosed file formats are lightweight binary formats that can be advantageously layered on top of any existing media format, for any type of existing media or content. Accordingly, while the format can be used in conjunction with, for example, MP3 files, it can be adapted for any other data format that is represented in a linear file (e.g., other compressed audio formats). Because the file format consists of a separate header and content object, the format is independent of any particular content format, and does not change the length or structure of the content object. One skilled in the art will appreciate that many features of the illustrative file formats and architectures defined herein are optional, and need not be implemented by specific players or appliances. Thus, as described herein, an explicit mechanism is provided to mark header components as optional or mandatory. One skilled in the art will appreciate that, in an exemplary embodiment of the invention, control module 2904 may be included with player 2906.

Compliance profiles that may be defined to promote interoperability among players and other appliances will now be described, followed by detailed descriptions of illustrative security approaches, file formats, header blocks, protocols, assigned values, and file processing methods that may be utilized in accordance with the present invention.

Compliance Profiles

Two compliance approaches, [cp1] and [cp2], are illustratively used in conjunction with the novel file formats and architectures of the present invention. The first illustrative compliance profile ([cp1]) has the following characteristics:

Intended for minimal player devices without support for cryptography.

Supported header components are only Identifier HB, Pad HB, Trailer HB, and SecurityHeaderV1 (all described in detail below), Non-cryptographic protection: supports only SecurityHeaderV1. Thus, no cryptographic algorithms are employed.

Minimal player rights management: in the Control Section of the Security Header, only the player ID and play limit controls are supported. Other limits (player class, upload, transfer, time-of-day) are not supported.

Transaction data is not required: the Transaction Section of the Security Header may be left empty, or may be filled in as desired by the downloading application.

A second compliance profile ([cp2]) may have the following characteristics:

Intended for minimal player devices, but includes support for cryptography.

Supported header components are only Identifier HB, Pad HB, and Trailer HB, Key HB, and SecurityHeaderV2, Provides cryptographic protection: supports only SecurityHeaderV2. Cryptographic algorithms used are CAST5_56_ECB, CAST5_56_CBC, and XOR_32.

Minimal player rights management: in the Control Section of the Security Header, only the appliance ID and play limit controls are supported. Other limits (player class, upload, transfer, time-of-day) are not supported (same as [cp1]).

Transaction data is not required: the Transaction Section of the Security Header may be left empty, or may be filled in as desired by the downloading application (same as [cp1]).

Supported header components are only Identifier HB, Key HB, SecurityHeaderV2, Pad HB, and Trailer HB.

The following is a description of the characteristics of the Secrecy and Integrity sections of the Security HeaderV2 (described in detail below) for [cp2].

The Secrecy Section of the SecurityHeaderV2 is supported, as described below.

The Integrity Section of the SecurityHeaderV2 is not supported. It may be filled in by the downloading application, but is ignored by the player device.

A single negotiated key is used for transfer of the file to the player device, and is used to protect a single Key HB block.

The key that protects the Key HB block may be identified as either (A) a temporary (negotiated) key, Key #1 in the Temporary Key namespace, or as (B) one of possibly several secret keys embedded in the appliance, Key #1-N in the Music player namespace.

The key that protects the Key HB block is a 56-bit (7 byte) key

The algorithm used for encrypting the Key HB block is CAST5_56_ECB (although DES, or any other suitable algorithm with 56-bit keys and an 8-byte blocksize, could be substituted for CAST5 in this Profile).

The Header Key that protects the Security Header is a 56-bit key that is randomly generated by the downloading application.

The IV for protecting the Security Header is an 8-byte value randomly generated by the downloading application.

The Security Header is encrypted using the CAST5_56_CBC algorithm.

The Content Key that protects the Critical Blocks is a 56-bit key that is randomly generated by the downloading application.

The IV for protecting the Critical Blocks is an 8-byte value randomly generated by the downloading application.

The algorithm for protecting Critical Blocks is CAST5_56_CBC.

The offset, blocksize, and stride for protecting Critical Blocks are determined by the application.

The mask seed for protecting the rest of the Data is a 32-byte string randomly generated by the downloading application.

The algorithm for masking the rest of the Data is XOR_32.

The data mask algorithm is never re-seeded (refresh interval is zero).

Security Approaches

Two levels of security may illustratively be used in conjunction with the novel file formats and architectures of the present invention. A first approach, referred to herein as a cryptographic security approach, employs two mechanisms:

1. It applies strong cryptography to a small fraction of the data (the "critical blocks"): on a regular basis, every $N_S$ bytes (the encryption stride), encrypt $N_{CB}$ bytes (the critical block size). An initial offset $N_O$ may also be specified to indicate where the first critical block is located. Alternatively, other techniques such as are described below, may be used to identify the critical blocks.

2. It applies a simple XOR mask or other lightweight cryptographic or masking function to every byte of the data. When using XOR, the mask has a fixed length, and is repeated sequentially as needed; for other algorithms, it may take the form of a cryptographic key or other initialization value. The mask is refreshed every $N_M$ bytes (the mask stride) by regenerating it using a cryptographic pseudo-random number generator, or using any other suitable refresh technique, such as those identified further below. This limits the exposure of plaintext under any particular mask value.

The cryptographic security approach may in addition employ other algorithms representing different points in the trade off between performance and security, so that one or more intermediate algorithms could be used on a greater fraction of the data than the most costly algorithm, but with less than complete coverage than the lightest weight algorithm.

The combination of these two mechanisms allows the computational cost of strong encryption to be minimized (only a small percentage of the data) while also ensuring that plain text content is never exposed directly (due to the mask). The keys for these two operations are carried in a Security Header, described in detail below, which itself is encrypted (and carried in a Security Header Block). The key for the Security Header is, in turn, encrypted in one or more Key Header Blocks, again as is described below. This two-level key management step ensures a unique key for the data in any file, and permits files to be efficiently re-keyed for different environments without also requiring re-encryption of the data.

Integrity protection is performed in a conventional way using keyed or unkeyed secure hash functions, and can be applied to any or all of three entities: the Security Header, the set of Header Blocks following the Security Header, and the Data itself. As described herein, the encryption process for critical blocks is completely independent of the format of the underlying data. If the format is known to have a fixed block size (e.g., MP3 frames), the offset $N_O$ and stride $N_S$ can be selected so that the critical blocks always include some specific component of the underlying data, such as the MP3 frame headers.

The cryptographic security approach may also define transaction and control attributes that permit a content object to be restricted to specific players, and that limit the number of operations (e.g., plays, uploads) that can be performed.

A second illustrative security approach, referred to herein as a non-cryptographic security approach, applies a 32-byte XOR mask, repeatedly, to the entire data object. This technique serves to obscure the data so it cannot be used directly, but is generally more open to attack than is the cryptographic security approach. The XOR mask is, typically, supplied by the intended recipient of the MPRM file through an additional interaction. The non-cryptographic security approach defines, however, the same transaction and control attributes as the cryptographic approach.

File Format 3100

Figure 31:
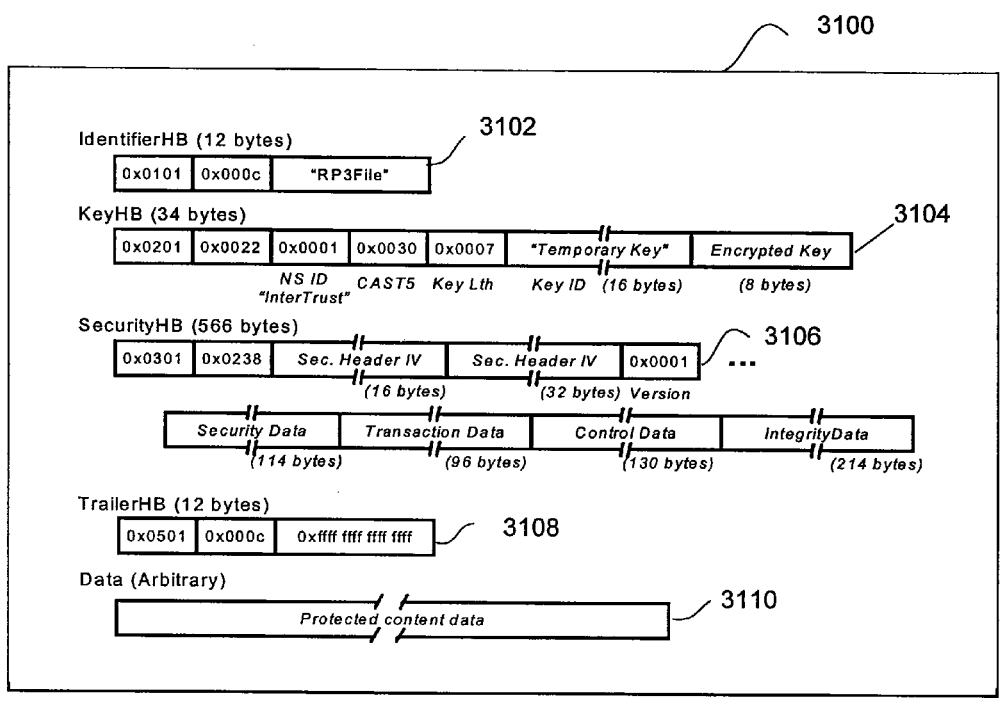
FIG. 31 sets forth, in accordance with the invention, one exemplary file format for distributing content.

FIG. 31 sets forth an illustrative file format 3100, employing the cryptographic security approach, for use in protecting content in the environment of FIG. 29. As shown in FIG. 31, file format 3100 comprises a sequence of several header blocks (HB), followed by a contiguous block of protected data. More specifically, file format 3100 comprises an Identification HB 3102 (which indicates that the file is in format 3100), a Key HB 3104, a Security HB 3106, a Trailer HB 3108 (which marks the end of the header and indicates the date size), and contiguous data 3110. It is to be understood, however, that while FIG. 31 discloses certain field sizes or byte lengths as examples of a possible embodiment, other specific field sizes may be used.

As also shown in FIG. 31, file format 3100 begins with Identification HB 3102, and ends with Trailer HB 3108. The data length specified in Trailer HB 3108 may either be the length in bytes of the data following the header, or may be all 0xff bytes, indicating that the data continues until the end of the input stream. File format 3100 additionally contains Security HB 3106. This block, described in detail below, explains how the file data is protected (including both secrecy protection, or encryption, and integrity protection). The contents of Security HB 3106, except for the type and length of the header block, are encrypted with a unique Header Key. Security HB 3106 also specifies how all the header blocks following it (including Trailer HB 3108) are protected.

File format 3100 additionally contains, following Identification HB 3102 but before Security HB 3106, at least one Key HB 3104 holding the encrypted Header Key with which the Security HB block data is encrypted. For files that are intended for use by multiple parties (e.g., personalized for several different players or devices), there may be multiple Key HBs. The data in the Key HB consists of identification values plus the encrypted Header Key. Non-cryptographic format files do not include any Key HBs.

Each Header Block within file format 3100 has the following structure:

| | |
|---|---|
| 2 bytes | Type of Header Block |
| 2 bytes | Size (bytes) of Header Block |
| (arbitrary) | Header data |

Accordingly, each header block is self-identifying. It has a 2-byte type and a 2-byte size, plus a predetermined amount of header data following. To ensure 4-byte alignment, the size of the header block must be a multiple of 4. In other words, its low-order two bits must be zero. The size includes the 4 bytes of identifying information, and has a maximum value of 0xFFFC. Thus, each header block is limited to 65528 bytes of data.

The low-order two bits of the length may be used to indicate a processing type for the Header Block, and are preferably masked off. In such an instance, the bits may illustratively be interpreted as follows:

0x0001 bit: If set, indicates that the HB is mandatory for use, and that a device which cannot interpret the HB is obliged to terminate processing on encountering it (and indicate an error). If clear, indicates that the HB is optional for use, and can be ignored by a device that does not understand it.

0x0002 bit: If set, indicates that the HB is mandatory for copying, and that a device is obliged to copy its contents unchanged whenever copying, transferring, or otherwise replicating the file, if the device cannot interpret the block. If clear, indicates that the HB should not be preserved on replication if the device cannot interpret the block. If the device can interpret the HB, the device is permitted to make an appropriate decision about whether to preserve it.

File format 3100 may additionally contain one or more Pad HBs (not shown in FIG. 31) which may be use to force other header blocks, or the data itself, to have a specific alignment with respect to the file origin. More specifically, padding can be used to ensure that the Data is aligned on an appropriate boundary, and likewise to align the Security Header to permit it to be efficiently re-written. Note, however, that to align the file data at a particular boundary, the final Pad HB block must come before Trailer HB 3108; in general, it would typically precede Security HB 3106 to facilitate protection of additional Header Blocks.

File format 3100 may additionally contain other types of header blocks, such as a Firmware HB, typically following Security HB 3106 (which can specify protection for the additional blocks), as well as other Header Blocks carrying information such as additional Rights Management information, digital signatures, and watermark control. These blocks should, however, be skipped over and not processed by any application that does not understand how to process that particular type. Firmware HB, Pad HB, as well as those header blocks set forth in FIGS. 31 and 32, may illustratively be defined as follows:

| | Identification HB |
|---|---|
| 0x0101 | HBTypeIdentificationV1 |
| 0x000c | Size of HB (4 + 8 bytes) |
| MPRFile\0 | Identification string |
| | Pad HB |
| 0x0401 | HBTypePadV1 |
| nnnn | Size of padding HB |
| (arbitrary) | nnnn-4 bytes of zeros |
| | TrailerHB |
| 0x0501 | HBTypeTrailerV1 |
| 0x000c | Size of HB (4 + 8 bytes) |
| (8 bytes) | Size of data immediately following |
| | KeyHB |
| 0x0201 | HBTypeKeyV1 |
| nnnn | Size |
| 0x0001 | Key namespace ID nnnn |
| | Algorithm identifier |
| nnnn | Size of encrypted HeaderKey |
| (16 bytes) | Key identifier for encryption |
| (arbitrary) | Encrypted HeaderKey |
| | Security HB (using the cryptographic security approach) |
| 0x0301 | HBTypeSecurityV1 |
| nnnn | Size |
| (arbitrary) | Unencrypted SecurityHeaderV1 |
| | SecurityHB (using the non-cryptographic security approach) |
| 0x0302 | HBTypeSecurityV2 |
| nnnn | Size |
| (arbitrary) | Encrypted SecurityHeaderV2 |
| | FirmwareHB |
| 0x0601 | HBFirmware |
| nnnn | Size |
| updatetype | Type of firmware update block (4 bytes) |
| (arbitrary) | Firmware update block (player-dependent) |

The above-listed header blocks will now be described in additional detail. Referring back to FIG. 31, Key HB 3102 contains, in encrypted form, the temporary key, or Header Key, that encrypts the encrypted Security Header. A single, uniquely generated Header Key is used for each file, but multiple Key HB blocks may be included, each of which uses different keys to protect the Header Key. Using a 16-byte key identifier and a 2-byte namespace identifier, Key HB 3102 also identifies the key that was used to encrypt the Header Key. It additionally specifies the algorithm used for the encryption, as well the namespace ID (for example, "music player", "InterTrust", or "temporary"), which defines how to interpret the key ID. An illustrative key identifier, in for example a music player namespace, can have three components: a 4-byte player class, a 4-byte key type, and an 8-byte player ID. The player class identifies the manufacturer and model of player, while the key types in the music player namespace define which of possibly several keys contained in the player are used. The player ID is the unique serial number of the player, which is initialized, for example, in the player's flash memory at the time of manufacture (along with, possibly, one or more secret "internal keys"). In the music player namespace, keys are typically 56-bit (7-byte) values stored in the flash memory of the player, while the encrypted key size is typically 8 bytes (one block for the algorithm, such as CAST5 or DES). A music player will typically process a Key HB in the music player namespace by validating the player class and key type in the key ID, then matching the player ID against its own player ID. If the two values match, it will use one of its internal keys (as specified) to decrypt the 8-byte block and recover the Header Key, which it then uses to decrypt the Security Header.

Security Header Block

Again referring back to FIG. 31, security HB 3106 includes type bytes, size bytes, and a Security Header. The Security Header defines both the protection (secrecy and integrity) mechanisms for the data and the rights management functions applying to use of the data. Logically, the Security Header may be divided into four parts:

Secrecy section, describing how the content data is encrypted;

Integrity section, describing how each of the Security Header, the rest of the protected header, and the content data is protected for integrity;

Control section, which describes the rules governing use of the file; and a

Transaction section, which describes the transaction that caused the particular file to be created.

Illustratively, two types of security headers may be utilized, which correspond to the two types of security approaches previously described:

SecurityHeaderV1, which provides minimal non-cryptographic protection for the data and specifies rules for use.

SecurityHeaderV2, which provides cryptographic protection for the data as well as specifying usage rules and transaction information.

The cryptographic (V2) security header is more complex, and is defined first. The non-cryptographic (V1) header is defined primarily in terms of the V2 header. Both versions define the same set of rights management functions. While these two illustrative security headers are described herein, one skilled in the art will readily appreciated that other versions of a Security Header can be defined to accommodate more sophisticated rights management functions than can be expressed in fixed-format control and transaction sections. Such versions may use additional Header Blocks (in the protected section of the header) to include additional rights management information (e.g., rules based on identity characteristics, membership, budget, prior activity).

The SecurityHeaderV2 specifies cryptographic protection and may contains the following items:

| 2 (bytes) | SecurityHeader algorithm (not encrypted) |
|---|---|
| 16 | SecurityHeader IV (not encrypted) |
| | Encrypted below here |
| 32 | SecurityHeader Integrity Result |
| | Integrity checked below here |
| 2 | SecurityHeader version (0x0002) |
| nnn | Secrecy Data |
| nnn | Transaction Data |
| nnn | Control Data |
| nnn | Integrity Data |

The V2 SecurityHeader version is illustratively 0x0002. The Security Header itself is encrypted with the Header Key (carried in the Key HBs). The Security Header IV is used to initialize the decryption algorithm. The data in all other Header Blocks following Security HB 3106 and up to but not including Trailer HB 3108 are also encrypted with the Header Key, and all use the same IV and algorithm as the Security Header. Because the data size may not be a multiple of the cryptographic block size, ciphertext-stealing may be used to make the lengths equal.

The Secrecy Data portion of the Security Header defines two items: the strong encryption that is applied to some parts of the Data, and the mask that is applied to all the data. It includes the encryption specification for the critical blocks and the masking specification for the remaining data. One skilled in the art will appreciate that the critical block encryption can happen before the data masking or after; that is, it can be either the ciphertext or the plaintext that gets masked. This has to be specified (or made an option) in advance, however, because correct results cannot be obtained without knowing. It is simply an issue of which order is more optimal for a particular appliance or player, and whether the masking operation is advantageously pushed into, for example, an audio decoder, rather than imposing such a burden on the CPU.

In accordance with one embodiment of the invention, critical block encryption may be specified by the following values (60 bytes total):

| | |
|---|---|
| 2 | Critical block encryption Algorithm ID |
| 32 | Critical block encryption Key |
| 16 | Critical block IV |
| 2 | Critical block size |
| 4 | Offset |
| 4 | Stride |

Critical block encryption is performed by encrypting regions whose length is specified by the critical block size. The first such region is located at the specified offset from the beginning of the data, and the later regions are located at the specified stride past the beginning of the previous region. The critical block size must be an integral multiple of the encryption algorithm's native block size. Illustrative values might be CAST5_56_CBC for the algorithm (with a native block size of 8 bytes), a critical block size of 32 bytes, an offset of zero, and a stride of 1600, ensuring that 2% of the Data is encrypted. If the algorithm specified operates in a chaining mode, the sequence of critical blocks may be treated as a contiguous sequence of plaintext (or ciphertext, as appropriate). The feedback from the last encryption in any given critical block region is used to initialize the encryption of the first block in the next region.

In one embodiment of the invention, data masking is specified by the following values (54 bytes total):

| | |
|---|---|
| 2 | Data Mask Algorithm ID |
| 32 | Mask seed |
| 2 | Mask refresh algorithm ID |
| 16 | Mask refresh key |
| 4 | Mask refresh interval |

Data masking is performed by executing the data mask algorithm repeatedly with the same mask. The mask algorithm has a native block size which determines the size of the repeats. If the mask refresh interval is zero, the mask is specified by the mask seed, and it is used without change for all the data. If the mask refresh interval is non-zero, the initial mask is the result of applying the specified mask refresh algorithm to the specified seed and key. This mask is used for all the data bytes in the refresh interval. When the refresh interval is reached, the refresh algorithm is executed again (using the current mask and key) to yield a new mask, which is used until the refresh interval is completed.

If mask refreshing is enabled, the cryptographic block sizes of the data mask algorithm and the mask refresh algorithm must be equal. The mask algorithm is illustratively exclusive-OR, with a size of 32 bytes (the maximum possible size for the mask seed).

The Transaction Data portion of the Security Header describes the transaction that caused the Data to be placed into the MPRF-format file, and may include the following items:

| | |
|---|---|
| 2 | Player Namespace ID |
| 8 | Player ID |
| 2 | Object Namespace ID |
| 16 | Data Object ID |
| 16 | Transaction ID |
| 10 | Transaction time |
| 2 | Transaction type |
| 40 | Comment |

The Transaction Data is filled in from information available during the transaction. Depending on how the transaction is performed, however, not all this information may be available. The player namespace ID defines how to interpret the player ID, which designates the player that was involved in the transaction that resulted in this file being created. The object namespace ID defines how to interpret the other transaction-related IDs, which represent the "source" of this file. The Data Object ID is the unique ID of the data in the file; it can identify the object's provider as well as the object. The Transaction ID is the unique ID of the transaction itself, which can be used to locate transaction records stored elsewhere. The transaction time specifies in, for example, BCD YYYY-MM-DD-HH-MM-SS-hh-ZZZZ format, the time (to the hundredth of a second) at which the transaction took place. BCD format may be used to ensure that the value can easily be displayed by a player of limited computational power. The time is stored in the user's time zone at the time of the transaction; the ZZZZ field indicates the offset, in minutes, of that time zone from UTC. A negative time zone offset may be indicated by a value in the range 4000 to 5159; subtract 4000 and negate to get the actual offset. The transaction type specifies the type of transaction that resulted in this file being created. The comment field is an ASCII string that may be used for any purpose by the application that created this file.

The Control Data portion of the Security Header specifies minimal rules for content management. It includes a series of flags indicating options, a player ID to which the content may be locked, and limitations on playing, uploading, and transferring (to another player). The Control Data portion may contain the following values:

| | |
|---|---|
| 2 | Flags (defined below) |
| 2 | Appliance Namespace ID |
| 80 | Player ID #1-#10 |
| 8 | Player Class |
| 2 | Maximum play count |
| 2 | Maximum upload count |
| 2 | Maximum transfer count |
| 6 | Activation time (BCD YYYY-MM-DD-HH-MM) |
| 6 | Expiration time (BCD YYYY-MM-DD-HH-MM) |
| 10 | Reserved for future use (must be zero) |

The flags are illustratively defined as follows, and they may be set to indicate that content:
0x8000—may be used only on the designated player;
0x4000—may be used only players of the specified class;
0x2000—may be used during the specified interval;
0x1000—is limited in number of plays;
0x0800—is limited in number of uploads;
0x0400—is limited in number of transfers;
0x03FF—(Reserved for future use, must be zero)

If a limit control flag is not set (zero), the corresponding operation is permitted without limitation. A limit value of 0xFFFF indicates that the corresponding operation may be performed any number of times. A limit value of 0x0000 can be used to indicate that the corresponding operation may not be performed; therefore, to prevent content from being uploaded, the 0x2000 flag would be set, and the upload limit would have the value 0x00000000.

If the designated player flag is set, the content may be used only on players with IDs that match one of the values in the list of player IDs. An all-zero element in the list of player IDs is ignored. If the player class flag is set, the content may be used only on players in the class specified by the player class ID. If the time limit restriction flag is set, the content may be used only between the specified activation and expiration times. The activation and expiration time is meaningful only on players or other appliances that have an internal clock. Time limits may be used to implement a "check-out, check-in" model. Not all players need be required to implement all control flags, nor to support non-zero limit values. If a control flag is found set that the player cannot understand or enforce, the content may not be used at all.

In one exemplary embodiment of the invention, the Security Header would be updated as limited operations are performed, decrementing the appropriate limit value. Thus, the Security Header would need to be rewritten each time such an operation is performed, and (if supported) its integrity check value would need to be recomputed. Updating the header in this manner ensures that if the file is subsequently uploaded or transferred, its header correctly indicates the number of operations remaining.

The Integrity Data portion of the Security Header provides values that allow the integrity of the Security Header, other Header Blocks, and the data to be verified. These values provide assurance that the relevant data has not been modified, but do not provide digital signature or proof of origin. Authentication capability may be provided by adding another Header Block (typically in the unchecked part of the header, before the Security HB block) containing a digital signature. The Integrity data may include the following items:

| Header Integrity (82 bytes total) | |
|---|---|
| 2 | Algorithm ID |
| 32 | Integrity key |
| 16 | IV |
| 32 | Result |
| Data Integrity (82 bytes total) | |
| 2 | Algorithm ID |
| 32 | Integrity key |
| 16 | IV |
| 32 | Result |
| SecurityHeader Integrity (50 bytes total) | |
| 2 | Algorithm ID |
| 32 | Integrity key |
| 16 | IV |

Note that the integrity result for the Security Header is part of the Security Header itself, and is placed at the very beginning of the Security Header block. That field is not included in the integrity calculation for the Security Header, and is filled in after the Security Header is otherwise completed. In turn, the other two integrity calculations must be performed, and results stored here, before the integrity result is calculated for the Security Header. The integrity check for the rest of the header is calculated on the encrypted Header Blocks following the Security Header, and also includes the Trailer HB (which is not encrypted). Thus, the entire header is generally constructed and encrypted before calculating this value. The integrity check for the data is also calculated on the encrypted representation of the data. Different types of integrity validation algorithms (e.g. secure hash, message authentication code) may require a key, an IV, both or neither.

File Format 3200

Figure 32:
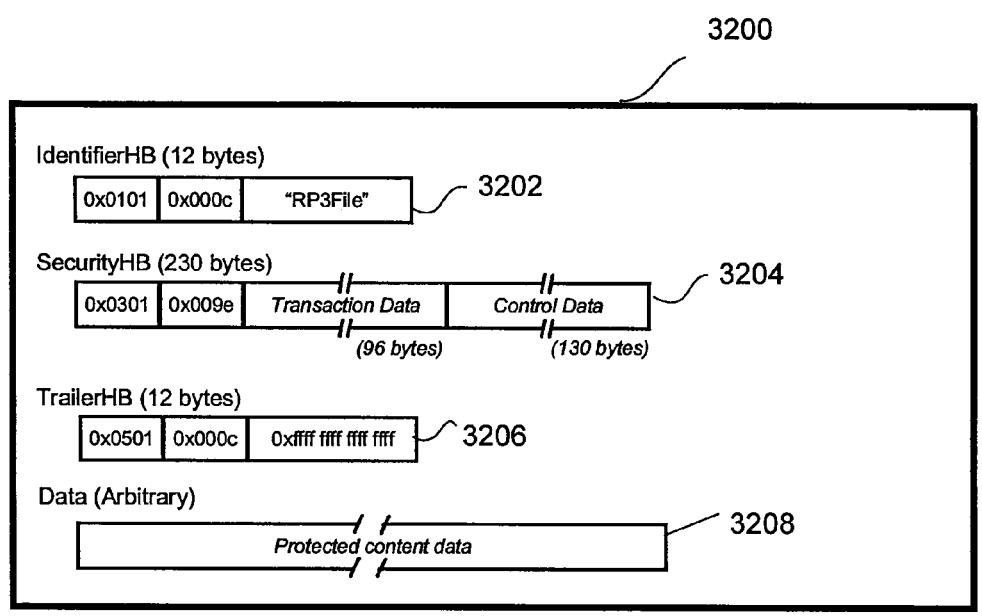
FIG. 32 sets forth yet another exemplary file format for distributing content.

FIG. 32 sets forth another illustrative file format 3200, employing the non-cryptographic security approach, for use in protecting content in the above-described environment. As shown in FIG. 32, file format 3200 comprises a sequence of several header blocks (HB), followed by a contiguous block of protected data. More specifically, file format 3200 comprises an Identification HB 3202, a Security HB 3204, a Trailer HB 3206, and contiguous data 3208. Identification HB 3202, Trailer HB 3206, and contiguous data 3208 may be identical in format to their counterparts described in conjunction with FIG. 31. The non-cryptographic (V1) security header of Security HB 3204 is more simple than its counterpart in Security HB 3106. In one embodiment of the invention, it provides no Integrity protection and no Secrecy protection, and contains the following items:

| 2 | SecurityHeaderV1 version (0x0001) |
|---|---|
| 96 | Transaction Data |
| 38 | Control Data |

The Transaction Data and Control Data are the same as for SecurityHeaderV2. However, s 32-byte value is applied to mask the data (except for the initial two bytes of version number) in the Security Header, and also to mask the entire data field. The mask is applied repeatedly by XORing with consecutive segments of the header or the data. The data mask is derived by XORing the 32-byte data mask seed obtained by means outside the scope of this standard (but which, for example, might be transferred from the receiving device to the originating device by a protocol interaction preceding the transfer of content) with a constant value embedded in the implementing components. Typically, the data mask seed will be obtained by requesting it from a receiving player (to which the file is to be delivered), which may either supply a constant value or a randomly-generated value. Typically a file using this approach will have a control flag set to restrict its use to the specified appliance. This approach ensures that files created for use by one device will be unusable by other appliances. The embedded constant ensures that if the data mask seed is delivered through an unsecured protocol, it will not be directly usable if disclosed. Alternatively, the mask seed could be delivered through a cryptographically secure protocol, and/or transformed through a strong cryptographic transformation (e.g., a block cipher or secure hash) instead of a simple XOR operation using a constant.

As discussed above, file format 3100 or 3200 may include a Firmware HB. A Firmware HB illustratively contains, in a player-dependent form, an update for a player's internal firmware. The firmware update type identifies what type of player is to respond to the firmware update; these numbers may be assigned on request by an external authority. A player encountering a Firmware HB should ignore it unless the update type matches the type(s) that the player understands. If a match is found, the player should examine the update contents to determine whether it needs to be applied (i.e., the update is a newer version than the player's existing firmware). If so, it should validate the update and install it.

Firmware updates are inherently player-specific. Consequently, whether, for example, the update is encrypted, how the update is validated, and how versions are compared are all issues that are similarly player-specific. What is preferable, however, is that an update have the appropriate matching type. Note that a single logical update may require multiple Firmware HBs because the size of the Firmware HB's data is limited to 65524 bytes. It is important to validate an update in a cryptographically protected way, entirely independently of the protection for the rest of the file. Because of this validation, the updates are typically placed in the unprotected portion of the header, from which they can easily be removed (or inserted) without affecting any other parts of the file. Firmware updates are typically included only in files downloaded to a player, rather than being stored at the player.

File Processing

Processing a file in file format 3100 or 3200 is inherently sequential. An application examines each Header Block, decides whether to process it, and moves on to the next Header Block until it encounters a Trailer HB, at which point it has located the Data and processes that. Because of the sequential nature of such file processing, there are certain ordering requirements for the relative position of the Header Blocks, which have been described herein. In addition, because of its sequential nature, a file formatted using file format 3100 or 3200 can be constructed from multiple sources concatenated together. It can also be modified by rearranging, inserting, or deleting Header Blocks, although care must be taken not to do so in a way that affects the protection of the protected Header Blocks following the Security Header.

To process the data in a cryptographically-protected file in file format 3100, an application may illustratively follows these steps:

Validate that the file begins with a valid Identification HB

Find a Key HB that specifies a key available to the application; if the Security HB (or the Trailer HB) is encountered before a suitable Key HB (or before any at all), the data cannot be accessed.

Validate the Key HB to locate the required key. If it is not available, look for another Key FIB.

Decrypt the encrypted Header Key using the key specified in the Key HB.

Having found a suitable Key HB block, find the Security HB. If the Trailer HB is found first, the file is invalid.

Decrypt the Security HB using the previously obtained Header Key, yielding the Security Header.

Interpret the Security Header contents to determine how the Data is protected.

Find the Trailer HB to locate the beginning of the data.

If header integrity checking is enabled, validate the headers following the Security HB through and including the Trailer HB.

Apply the keys and cryptographic specifications from the Security Header to decrypt and process the data.

During these steps, the application identifies and skips over any Pad HBs it encounters. If it encounters any other types of Header Blocks that it does understand, it processes them appropriately; otherwise it skips over them. Note that "appropriate" processing may include rejecting the file because it contains a Header Block that the application knows about, but is not capable of processing successfully—however, because Header Blocks are typically informational, rather than prescriptive, unfamiliar types can usually be skipped without processing.

A non-cryptographic file in, for example, file format 3200, is processed similarly, except that there are no Key HBs and no decryption operations.

What now follows is a discussion of illustratively assigned values for namespaces, transaction types, cryptographic algorithms, and other items.

Illustrative Assigned Values

The header block type field is a two-byte value. The first byte is normally used as a format identifier and the second byte as a version number, but application-defined types may apply different interpretations as necessary. As but one example, types may be assigned within the following ranges:

0x000 through 0x3FFF are reserved for definition as part of the standard architecture.

0x4000 through 0xBFFF are reserved for global defined types, and may be assigned by an agent governing the standard.

0xC000 through 0XFFFE are available for arbitrary application use.

0x0000 and 0xFFFF are invalid, and are never to be used.

The following Header Block types may illustratively be defined as follows:

0x0101—Identification block
0x0201—KeyHB block
0x0301—SecurityHeader block (non-cryptographic)
0x0302—SecurityHeader block (cryptographic)
0x0401—Padding block
0x0501—Trailer block
0x0601—Firmware Update block The following transaction types may illustratively be defined as follows:

0x0101—Transaction involved no exchange of value ("free")
0x0002—Outright purchase
0x0003—Limited transfer from other player or container Each cryptographic algorithm may be defined in terms of several parameters. For simplicity, all algorithms may have the same set of parameters, although some parameters may not be relevant to some algorithms:

Type. Type of algorithm: Encryption, Unkeyed Hash, Keyed Hash

Block Size. Algorithm's native size of operation. 16 bytes or less for encryption.

Key. Secret key used to run the algorithm. 32 bytes or less.

IV. Initialization vector, used on chaining encryption modes only. 16 bytes or less.

Result. Result of a hash or MAC calculation. 32 bytes or less.

If a value is smaller than the field allocated for it (e.g., an 8-byte DES key stored in a 32-byte field), the value is in the leftmost bytes and the remaining bytes are padded with 0x00 bytes. The following illustrative encryption algorithm IDs may be assigned; each of which is described in further detail below:

0x0000—Reserved, error
0x0001—Function not enabled (used for Key HB)
0x0002—No encryption (not used for Key HB)
0x0003—Implicit: key defines its own algorithm (reserved)
0x0010—XOR_8
0x0011—XOR_16

0x0012—XOR__32
0x0013—XOR__64
0x0014—XOR__128
0x0015—XOR__256
0x0020—DES__56_ECB
0x0021—DES__56_CBC
0x0022—DES__56_CBC_MAC
0x0030—CAST5__56_ECB
0x0031—CAST5__56_CBC
0x0032—CAST5__56_CBC_MAC

MPRF_ALG_NO_FUNCTION (0x0001)

This type indicates that the particular security function is not used or not applicable. It differs from MPRF_ALG_NONE in that it indicates there is no data to protect, rather than that the data is not encrypted.

| Type | Not applicable |
|---|---|
| Block size | Not applicable |
| Key | Not used |
| IV | Not used |
| Result | Not used |

MPRF_ALG_NONE (0x0002)

This type indicates that the data is not encrypted:

| Type | Encryption |
|---|---|
| Block size | Not applicable |
| Key | Not used |
| IV | Not used |
| Result | Not used |

MPRF_ALG_IMPLICIT (0x0003)

This type indicates that the algorithm is a function of the specified key.

| Type | Encryption |
|---|---|
| Block size | Not applicable |
| Key | Not used |
| IV | Not used |
| Result | Not used |

This type is generally only used in Key HB, and only for keys that have such information associated with them.

MPRF_ALG_XOR__8 (0x0010)

This is a masking function using repeated exclusive-OR with the same 8-bit key on successive data blocks:

| Type | Encryption |
|---|---|
| Block size | 1 byte |
| Key | 1 byte |
| IV | Not used |
| Result | Not used |

MPRF_ALG_XOR__16 (0x0011)

This is a masking function using repeated exclusive-OR with the same 16-bit key on successive data blocks (that is, it masks every byte with a constant value):

| Type | Encryption |
|---|---|
| Block size | 2 bytes |
| Key | 2 bytes |
| IV | Not used |
| Result | Not used |

MPRF_ALG_XOR__32 (0x0012)

This is a masking function using repeated exclusive-OR with the same 32-bit key on successive data blocks:

| Type | Encryption |
|---|---|
| Block size | 4 bytes |
| Key | 4 bytes |
| IV | Not used |
| Result | Not used |

MPRF_ALG_XOR__64 (0x0013)

This is a masking function using repeated exclusive-OR with the same 64-bit key on successive data blocks:

| Type | Encryption |
|---|---|
| Block size | 8 bytes |
| Key | 8 bytes |
| IV | Not used |
| Result | Not used |

MPRF_ALG_XOR__128 (0x0014)

This is a masking function using repeated exclusive-OR with the same 128-bit key on successive data blocks:

| Type | Encryption |
|---|---|
| Block size | 16 bytes |
| Key | 16 bytes |
| IV | Not used |
| Result | Not used |

MPRF_ALG_XOR__256 (0x0015)

This is a masking function using repeated exclusive-OR with the same 256-bit key on successive data blocks:

| Type | Encryption |
|---|---|
| Block size | 32 bytes |
| Key | 32 bytes |
| IV | Not used |
| Result | Not used |

MPRF_ALG_DES__56_ECB (0x0020)

This is the standard DES algorithm operating in Electronic Code Book mode:

| Type | Encryption |
|---|---|
| Block size | 8 bytes |
| Key | 8 bytes (DES format, with parity ignored) |
| IV | Not used |
| Result | Not used |

MPRF_ALG_DES_56_CBC (0x0021)

This is the standard DES algorithm operating in Cipher Block Chaining mode:

| Type | Encryption |
|---|---|
| Block size | 8 bytes |
| Key | 8 bytes (DES format, with parity ignored) |
| IV | 8 bytes |
| Result | Not used |

MPRF_ALG_DES_56_CBC_MAC (0x0022)

This is the standard DES algorithm operating in Cipher Block Chaining mode used to calculate a Message Authentication Code:

| Type | Keyed Hash |
|---|---|
| Block size | 8 bytes |
| Key | 8 bytes (DES format, with parity ignored) |
| IV | 8 bytes |
| Result | 8 bytes |

MPRF_ALG_CAST5_56_ECB (0x0030)

This is the standard CAST5 algorithm (see RFC-2144) operating in Electronic Code Book mode:

| Type | Encryption |
|---|---|
| Block size | 8 bytes |
| Key | 7 bytes, padded with 0x00 on right |
| IV | Not used |
| Result | Not used |

MPRF_ALG_CAST5_56_CBC (0x0031)

This is the standard CAST5 algorithm operating in Cipher Block Chaining mode:

| Type | Encryption |
|---|---|
| Block size | 8 bytes |
| Key | 7 bytes, padded with 0x00 on right |
| IV | 8 bytes |
| Result | Not used |

MPRF_ALG_CAST5_56_CBC_MAC (0x0032)

This is the standard CAST5 algorithm operating in Cipher Block Chaining mode used to calculate a Message Authentication Code:

| Type | Keyed Hash |
|---|---|
| Block size | 8 bytes |
| Key | 7 bytes, padded with 0x00 on right |
| IV | 8 bytes |
| Result | 8 bytes |

Low-Level Data Formats

The following low-level Data Formats may be used in accordance with the invention, although those skilled in the art will appreciate that many other data formats may be utilized in the architecture described herein. So, for example, all integers in the file formats may be stored "big endian", with the high-order byte at position zero and the low-order byte at the other end of the field. Except as noted elsewhere herein, all integer values may be unsigned. When a field (notably, a cryptographic value) is larger than the value it needs to hold, the value may be left-aligned in the field, and padded on the right with 0x00 bytes. When a value (e.g., an encrypted cryptographic key) is smaller than the cryptographic block size used to encrypt it, value may be left-aligned in the field, and padded on the right with 0x00 bytes before being encrypted. The zeros are ignored on decryption. Header Blocks (and thus data) may advantageously be required to be aligned on 4-byte boundaries within the file. This alignment ensures that storage for the type and length fields is always in a contiguous 4-byte unit, facilitating processing even if the file is stored in non-contiguous blocks. To implement this alignment restriction, the length field of a Header Block must be a multiple of 4; in the event that the data in the Header Block requires a length that is not a multiple of 4, that must be indicated by a length (or adjustment) field stored in the Header Block's data. In an alternative embodiment, the length field could have the value length/4, and require multiplication (shift) to determine the actual length. That would allow larger Header Blocks, but would complicate the basic processing loop somewhat because of the need to handle length values larger than are representable in 16 bits. Also alternatively, the low-order bits of the length could be used as flags, which would provide for an aesthetically pleasing implementation of the mandatory/optional processing option. BCD values (e.g., the Transaction Time field of the SecurityHeader) may also be stored "big endian", with the high-order digit of a pair in the high-order 4 bits of the bits.

Streamed Content Protocols

The following protocol is one embodiment of, consistent with the invention, a simple authentication and key negotiation protocol for use among, for example, control modules and content players. Each participant (module or player) has built into it the public (signature validation) key of a predetermined licensing agent or authority, for example. Each participant has its own public signature key, signed by the licensing authority, and a corresponding private (signing) key. Each participant also has built into it the global public key negotiation key.

The public key and key negotiation key should be constant for all devices with the architecture described herein; the device public key is unique to each device. The protocol may illustratively use signed Diffie-Hellman key exchange ("station-to-station protocol") to negotiate a session key that can be used for subsequent transfers of files in, for example, format 3100 or 3200. While this protocol is well suited for use with players of limited processing capability, because it uses fixed-format raw representations of keys and signatures rather than using X.509 certificates (it is to be understood that players can be initialized with data from such certificates), it may advantageously used with any player or appliance.

The protocol requires that each participant have several different instances of the various keys, to permit immediate response to key compromises. Player firmware updates can also be used to update keys over the longer term. There is only one level of public key infrastructure in this protocol, and all public keys may be signed directly by a predetermined licensing authority. A licensee can generate a large batch of key pairs, and send the public parts to the licensing authority for signing, or can simply request that the authority generate them and send the complete key pairs (and signatures) back. Either method may be used consistently with the present invention, although they have different security characteristics.

Yet another exemplary embodiment of a content-transfer protocol is as follows. In this embodiment, the assumption is made that the originating device, such as a media player device, has a file, protected with a secret key known only to that device, and that the receiving device has a similar secret key known to it. One device wishes to send the file to the other, without either device revealing their secret keys. In such an instance, the devices can exchange a file securely using the following process:

Negotiate a session key (using Diffie-Hellmann or a similar cryptographic protocol)

Optionally, each device may authenticate the other (using digital signatures or similar cryptographic techniques)

The sending device can re-key the file using the negotiated session key, by replacing or adding a Key HB in the file.

The sending device transmits the file to the receiving device;

because the file is cryptographically protected, the medium of transfer need not be protected.

The receiving device re-keys the file by replacing the KeyHB specifying the negotiated session key with a KeyHB using its own secret key.

The receiving device stores the file.

The file exchange process requires temporary storage only for the KeyHB that is used to hold the temporary key, not for the rest of the header or the file content. One skilled in the art will appreciate that the same file exchange protocol can be used to transfer a file between a device and a rights management system (as is described in the incorporated references.) The rights management system can additionally interpret rights management information at the originating end to specify rules and controls to be embedded in the file header. As a receiver, the rights management system can construct new rights management information from rules and controls in the received file.

When a rights management system includes rules and controls, and transaction information, in the header of a protected file, the controls can specify a subset of the originating object's rights management information. For example, the following can be specified:

A limitation on the number of times a protected media file may be played

A limitation on the number of times a protected file may be uploaded back out of the device to a host system A limitation on the number of times a protected file may be transferred from one device to another A limitation on the time period during which the protected file may be used (both beginning and end)

A constraint limiting use of the file to a particular device

A constraint limiting use of the file to a class of devices

A constraint limiting use of the file to devices owned by a particular person or, in general, any rule or set of rules as may be determined from a set of rights management information associated with the original object.

Controls and limits may be specified in multiples or in combination. Transaction information may be included to identify the rights management transaction that resulted in creating the file, and recorded in the header for auditing or tracking purposes. Such information may include:

Unique transaction ID

Transaction time

Originating object ID

User ID of transaction

Device ID of intended recipient device

Transaction price

Transaction type

Transaction report (audit) recipient(s)

or, in general, any other information that may serve an auditing or tracking purpose.

Consistent with the invention, various embodiments of a novel file format have been described. These formats are advantageous due to, inter alia, the following. They support strong cryptographic protection, while allowing for a small, fast runtime implementation. The format for carrying header information is highly efficient for processing by devices with limited processing resources. It allows an arbitrary sequence of self-identifying header components to be associated with a protected object, such that individual components can be located, inserted, removed, and rearranged with minimal cost. The format allows for integrity and secrecy protection of selected header components by dividing the components into two groups (protected, non-protected), and also ensures that transfer protocols need not understand the underlying content format. The format allows for padding to align any desired components, or the content data, on desired boundaries. The format allows for the header to be processed efficiently even if stored in discontiguous blocks, by guaranteeing that the type/length fields are always located in a contiguous 4-byte region. The protected file and/or its header may be protected for integrity by conventional cryptographic techniques (e.g., cryptographic hash, message authentication code). This protection is specified in the security-critical part of the header, and is facilitated by the header structure.

The multi-level keying scheme described herein is advantageous in that it uses a unique Content Key (and Content Mask) for protecting the content object. These keys are stored (and protected) in the Security Header, which is in turn protected by a unique Header Key. The Header Key, in turn, is stored in one or more Key HBs, which are protected by Transport Keys that are identified in the header (in the Key HBs), but not stored in the header. This scheme allows the file to be re-keyed by replacing (or adding) a new Key HB, without changing any other part of the header or the data. This scheme also allows the header to be re-keyed without changing the data, and allows the content to be re-keyed without changing or even knowing the keys that protect the Header Key in the Key HBs. Such re-keying may be appropriate or preferred as a standard part of redistribution. This scheme is additionally advantageous as it uses unique keys for the content and for the header to avoid exposure of long-term visible keys.

The cryptographic content security scheme described herein is advantageous as it employs two algorithms together: one, an expansive, strong algorithm (e.g., a block cipher such as DES or CAST5), encrypts only "critical blocks" of the content. The other, a low-cost but weaker algorithm (e.g., an XOR function or a fast stream cipher), encrypts or masks the entire content. Depending on the needs of the application, the low-cost step can take place before the stronger step (thus masking the plaintext before its critical blocks are encrypted), or can take place afterward. One skilled in the art will appreciate that the appropriate order may be governed by efficiency considerations in using the plaintext (as input to an audio decoder, for example). The critical blocks selected for strong encryption can be selected in a variety of ways, including but not limited to:

Starting at some specified offset into the content, and locating critical blocks at fixed intervals beginning from that offset;

Interpreting the content format, and locating specific data elements to be strongly encrypted, such as the headers for MP3 audio frames;

Using a pseudo-random number generator (not necessarily a secure one) to randomly select the locations of a certain percentage of blocks out of the content (possibly encrypting some blocks, or parts of blocks, multiple times, but reversing the multiple applications during decryption);

Using a pseudo-random number generator (as above) to determine intervals between the critical blocks, thus avoiding multiple encryption;

Starting by encrypting a block at a specified location, extract a value from each encrypted block (after encryption) as a pseudo-random number generator to specify an offset, interval, or other locator for the next critical block to be encrypted.

Chaining encryption modes can be employed by treating the sequence of critical blocks as a single contiguous sequence of plaintext, and carrying the feedback variable from the end of one such block to the beginning of another. The above methods leave the size of the content, and offset locations and alignment within it, unchanged. This is important for any sort of random access application (although certain methods make random access more difficult because the critical blocks are located by a pseudo-random process). It is also possible to modify the content by inserting additional information into the content that can specify critical block locations, protection parameters, or other information. The low-cost masking algorithm can always use the same key (mask), applying it repeatedly for the entire content object. The masking can also be re-keyed at intervals throughout the content, performing a relatively expensive re-keying operation (such as using a cryptographically secure pseudo-random number generator) only occasionally. Re-keying can be periodic, or determined on a pseudo-random basis using techniques like those for locating critical blocks.

One skilled in the art will appreciate that, utilizing the above-described architectures and file formats, and utilizing a protected processing environment (PPE) or other control module to govern content in accordance with rules, a secure content extraction method and apparatus can be implemented as follows.

Content with an identifying mark, such as CD music with an embedded identification means (e.g., a digitally attached or watermarked ISRC, or the content itself) may be input by a user into a secure content extractor or ripper (which is illustratively a version of a non-ripper, modified in accordance herewith, that extracts PCM samples from a compact disk onto a computer hard disk, and subsequently converts the samples into a compressed format such as MP3. The secure extractor examines the content and extracts the identification means. The extractor may then reference a database (which may be a secure database as is described in the Ginter '333 application) that lists or otherwise identifies all previously ripped or extracted content. If the content has been previously extracted, then this fact can be communicated back to the user, who may also be informed that the content cannot be ripped. This fact may be additionally communicated to third parties for the purpose of, for example, fraud detection.

If the content has not been previously extracted, then the extractor may obtain the content from its original format (such as a music CD), and secure it within a new content format. Secure formats include, for example, an MP3 audio file in file format 3100, file format 3200, or, more generally, a Digibox. The ripper may also communicate with the secure database to ensure that the newly-extracted content is logged as "extracted".

One skilled in the art will appreciate that the following protocol is also enabled by the novel architectures and file formats disclosed herein. As set forth in FIG. 29, a PPE or control module 2904 may be connected to one or more content players 2906. Because, content players 2906 may support one or more content formats (e.g., MP3), control module 2904 can be configured to maintain a list of associated player devices, and the formats they support.

Content, such as music, and rules may be securely provided to control module 2904 by content provider 2902 in, for example, a DigiBox. Utilizing its list of associated player devices, and the rules provided with the content, control module 2904 can determine: (a) if a particular player device supports the content format; and (b) if not, whether the rules allow for reformatting of the content to a supported format. If the rules permit reformatting, control module 2904 extracts the music content from the DigiBox and transforms the content into a supported format using, for example, a mask. Such masks may be, for example, resident in control module 2904 or delivered in a DigiBox from a predetermined mask clearinghouse.

The foregoing description of implementations of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the present invention may be implemented as a combination of hardware and software or in hardware alone. The invention may be implemented with both object-oriented and non-object-oriented programming systems. The scope of the invention is defined by the claims and their equivalents.

We claim:

1. A method of rendering a protected digital bit stream including:

receiving the protected digital bit stream;

receiving one or more rules controlling access to, or use of, said protected digital bit stream in which the one or more rules specify one or more authorized uses of the protected digital bit stream;

passing the protected digital bit stream to a media player, the media player reading first header information identifying a first plugin required to process the protected digital bit stream;

the media player calling the first plugin;

the media player passing the protected digital bit stream to the first plugin;

the first plugin applying the one or more rules to selectively determine whether to proceed with decrypting step and comparing a system identifier included in at least one rule with an identifier associated with the media player, the first plugin decrypting at least a portion of the protected digital bit stream to obtain a decrypted digital bit stream;

the first plugin reading second header information identifying a second plugin necessary in order to render the decrypted digital bit stream;

the first plugin calling the second plugin;

the first plugin passing the decrypted digital bit stream to the second plugin;

the second plugin processing the decrypted digital bit stream to obtain a decrypted and processed digital bit stream;

the second plugin passing the decrypted and processed digital bit stream to the media player; and the media player enabling rendering of the decrypted and processed bit stream.

2. The method of claim 1, in which said step of applying the one or more rules comprises determining whether a requested use of the protected digital bit corresponds to an authorized use of the protected digital bit stream specified in at least one rule.

3. The method of claim 1, wherein said one or more rules are included in said protected digital bit stream.

4. The method of claim 1, wherein said one or more rules are received separately from said protected digital bit stream.

5. A streaming media player providing content protection and digital rights management, the streaming media player including:

a port configured to receive at least:

a digital bit stream, the digital bit stream comprising at least two sub-streams that have been muxed together including:

digital content, one or more cryptographic keys configured to decrypt the digital content, and one or more rules configured for use in governing access to or other use of the digital content; and a control block including:

means for extracting the one or more cryptographic keys from the digital bit stream, means for decrypting the digital content using the one or more cryptographic keys, and means for governing access to or other use of the digital content in accordance with the one or more rules;

a demux configured to separate and route the sub-streams;

a decompression unit configured to decompress at least one of the sub-streams, the decompression unit and the demux being operatively connected by a pathway for the transmission of information;

a stream controller operatively connected to the decompression unit, the stream controller including decryption functionality configured to decrypt at least a portion of a sub-stream and pass the decrypted sub-stream to the decompression unit; and an output for presenting the digital content to a user of the streaming media player.

6. The streaming media player of claim 5, wherein said one or more rules are included in the digital bit stream.

7. The streaming media player of claim 5, wherein said one or more rules are included in a secure digital container that is separate from the digital bit stream.

8. The streaming media player of claim 5, in which the one or more rules include a rule specifying an authorized use of the digital content.

9. The streaming media player of claim 5, in which the one or more rules include a rule containing an identifier of a system authorized to use the digital content.

10. The streaming media player of claim 9, in which the control block is configured to:

perform a comparison between an identifier of the streaming media player and the identifier of the system authorized to use the digital content, and selectively permit use of the digital content based at least in part on the comparison.

11. The streaming media player of claim 5, in which the digital bit stream includes at least two sub-streams which have been multiplexed together, at least one of the sub-streams including compressed information; and wherein the streaming media player further includes:

a demultiplexer designed to separate and route the sub-streams;

a decompression unit configured to decompress at least one of the sub-streams, the decompression unit and the demultiplexer being connected by a pathway for the transmission of information; and a rendering unit designed to process decompressed digital content for rendering.

12. The streaming media player of claim 5, in which the control block is resistant to tampering by a user of the streaming media player.

13. The streaming media player of claim 11, in which the control block is resistant to tampering by a user of the streaming media player.

14. The streaming media player of claim 5, in which the control block further includes means for disabling rendering of the digital content by the streaming media player prior to or during transfer of the digital content to a second device.

* * * * *